(12) United States Patent
Tsusaka et al.

(10) Patent No.: US 8,170,719 B2
(45) Date of Patent: *May 1, 2012

(54) CONTROL APPARATUS AND CONTROL METHOD FOR ROBOT ARM, ROBOT, CONTROL PROGRAM FOR ROBOT ARM, AND INTEGRATED ELECTRONIC CIRCUIT FOR CONTROLLING ROBOT ARM

(75) Inventors: Yuko Tsusaka, Osaka (JP); Yasunao Okazaki, Shiga (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/073,027

(22) Filed: Mar. 28, 2011

(65) Prior Publication Data

US 2011/0178638 A1    Jul. 21, 2011

Related U.S. Application Data

(62) Division of application No. 12/863,475, filed as application No. PCT/JP2009/000783 on Feb. 24, 2009.

(30) Foreign Application Priority Data

Feb. 28, 2008 (JP) .................................. 2008-047375

(51) Int. Cl.
   *G05B 19/04* (2006.01)
   *G05B 19/18* (2006.01)
(52) U.S. Cl. ........................................................ 700/257
(58) Field of Classification Search .................. 700/245, 700/250, 253–254, 257–258, 260–261, 9–10, 700/33–34, 50; 901/1–4, 9–10, 33–34, 50; 318/568.1–568.19, 568.25

See application file for complete search history.

(56) References Cited

U.S. PATENT DOCUMENTS

| | | | |
|---|---|---|---|
| 6,353,814 B1 * | 3/2002 | Weng | 706/12 |
| 6,522,949 B1 * | 2/2003 | Ikeda et al. | 700/245 |
| 7,136,723 B2 * | 11/2006 | Hirayama et al. | 700/245 |
| 2005/0102066 A1 | 5/2005 | Watanabe et al. | |
| 2009/0125146 A1 * | 5/2009 | Zhang et al. | 700/253 |

FOREIGN PATENT DOCUMENTS

| | | |
|---|---|---|
| EP | 0 416 123 | 3/1991 |
| JP | 59-157715 | 9/1984 |
| JP | 01-146645 | 6/1989 |
| JP | 2-250782 | 10/1990 |
| JP | 5-303422 | 11/1993 |

(Continued)

OTHER PUBLICATIONS

International Search Report issued Jun. 9, 2009 in International (PCT) Application No. PCT/JP2009/000783.

(Continued)

*Primary Examiner* — Khoi Tran
*Assistant Examiner* — Harry Oh
(74) *Attorney, Agent, or Firm* — Wenderoth Lind & Ponack, L.L.P.

(57) ABSTRACT

A control apparatus for a robot arm includes an operation information database in which pieces of information relating to operations of the robot arm are stored, a force detection unit that detects a force of a person, and an operation correction unit that corrects the operation information of the operation information database in accordance with the force of the person.

9 Claims, 49 Drawing Sheets

FOREIGN PATENT DOCUMENTS

| | | |
|---|---|---|
| JP | 6-190753 | 7/1994 |
| JP | 7-084632 | 3/1995 |
| JP | 10-254527 | 9/1998 |
| JP | 2002-120174 | 4/2002 |
| JP | 2004-049731 | 2/2004 |
| JP | 2004049731 A * | 2/2004 |
| JP | 2004-148466 | 5/2004 |
| JP | 2004148466 A * | 5/2004 |
| JP | 2005-148789 | 6/2005 |
| JP | 2005-293098 | 10/2005 |

OTHER PUBLICATIONS

International Preliminary Report on Patentability (in English) issued Oct. 28, 2010 in PCT/JP2009/000783.

* cited by examiner

Fig.3

| JOB ID | OPERATION ID | POSITION AND ORIENTATION (m) (x,y,z,φ,θ,ψ) | FLAG (32 bits) | HAND | TIME (sec) | CORRECTION PARAMETER FLAG (32 bit) | PROGRESS INFORMATION |
|---|---|---|---|---|---|---|---|
| 1 | 1 | 0,0,0,0,0,0 | 18 bit:1 THE REST:0 | 1 | 3 | 1 | 0 |
| : | : | : | : | : | : | : | : |
| 3 | 1 | 0.1,0.1,0.4 0,0,0 | 0-5 bits:1 THE REST:0 | 1 | 0.37 | 3 | 1 |
| 3 | 2 | 0.1,0.2,0.4 0,0,0 | 0-5 bits:1 THE REST:0 | 1 | 0.37 | 3 | 0 |
| : | : | : | : | : | : | : | : |
| 3 | 7 | 0.2,0.2,0.4 0,0,0 | 0-5 bits:1 THE REST:0 | 1 | 0.37 | 3 | 0 |
| 3 | 8 | 0.2,0.1,0.4 0,0,0 | 0-5 bits:1 THE REST:0 | 1 | 0.37 | 3 | 0 |
| …. | …. | …. | …. | …. | …. | …. | …. |

| BIT NUMBER | 0 | 1 | 2 | 3 | 4 | 5 | 6 | 7 | 8 | 9 | 10 | 11 | 12 | 13 | 14 | 15 | 16 | 17 | 18 | ... | 31 |
|---|---|---|---|---|---|---|---|---|---|---|---|---|---|---|---|---|---|---|---|---|---|
| | x | y | z | φ | θ | ψ | | | | | | | | | | | | | | | |
| | POSITION-ORIENTATION | | | | | | | | | | | UNUSED | | | | | | | | | |
| VALUE | 1 | 1 | 1 | 0 | 0 | 0 | 0 | 0 | 0 | 0 | 0 | 0 | 0 | 0 | 0 | 0 | 0 | 0 | 0 | ... | 0 |

Fig.5

| | POSITION-ORIENTATION ||||| | | | | | | | | | | | | UNUSED ||||| | | | |
|---|---|---|---|---|---|---|---|---|---|---|---|---|---|---|---|---|---|---|---|---|---|---|
| | x | y | z | φ | θ | ψ | | | | | | | | | | | | | | | | |
| BIT NUMBER | 0 | 1 | 2 | 3 | 4 | 5 | 6 | 7 | 8 | 9 | 10 | 11 | 12 | 13 | 14 | 15 | 16 | 17 | 18 | ... | 31 |
| VALUE | x | 1 | 2 | 0 | 0 | 0 | 0 | 0 | 0 | 0 | 0 | 0 | 0 | 0 | 0 | 0 | 0 | 0 | 0 | ... | 0 |
| | 0 | 0 | 1 | 0 | 0 | 0 | 0 | 0 | 0 | 0 | 0 | 0 | 0 | 0 | 0 | 0 | 0 | 0 | 0 | ... | 0 |

Fig.6

| TIME (h:m:s) | HAND POSITION (x, y, z, $\phi$, $\theta$, $\psi$) (m) |
|---|---|
| 00:00:40 | (0.5,0.2,0.3,0.2,0.3,0.4) |
| 00:01:02 | (0.5,0.3,0.35,0.2,0.3,0.4) |
| 00:01:20 | (0.5,0.4,0.35,0.2,0.3,0.4) |
| | |

Fig.15

| JOB ID | OPERATION ID | POSITION AND ORIENTATION (m) (x,y,z,φ,θ,ψ) | FORCE | FLAG (32 bits) | HAND | TIME (sec) | CORRECTION PARAMETER FLAG (32 bit) | PROGRESS INFORMATION |
|---|---|---|---|---|---|---|---|---|
| .... | .... | .... | .... | .... | .... | .... | .... | .... |
| 4 | 1 | 0.1,0.1,0, 0,0,0 | 0,0,5,0,0,0 | 0,1,3,4,5,8 bits:1 | 1 | 0.37 | 3 | 1 |
| 4 | 2 | 0.1,0.2,0, 0,0,0 | 0,0,5,0,0,0 | 0,1,3,4,5,8 bits:1 | 1 | 0.37 | 3 | 0 |
| : | : | : | : | : | : | : | : | : |
| 4 | 7 | 0.2,0.2,0, 0,0,0 | 0,0,5,0,0,0 | 0,1,3,4,5,8 bits:1 | 1 | 0.37 | 3 | 0 |
| 4 | 8 | 0.2,0.1,0, 0,0,0 | 0,0,5,0,0,0 | 0,1,3,4,5,8 bits:1 | 1 | 0.37 | 3 | 0 |
| .... | .... | .... | .... | .... | .... | .... | .... | .... |

| BIT NUMBER | 0 | 1 | 2 | 3 | 4 | 5 | 6 | 7 | 8 | 9 | 10 | 11 | 12 | 13 | 14 | 15 | 16 | 17 | 18 | ... | 31 |
|---|---|---|---|---|---|---|---|---|---|---|---|---|---|---|---|---|---|---|---|---|---|
|  | x | y | z | φ | θ | ψ | fx | fy | fz | fφ | fθ | fψ |  |  |  |  |  |  |  |  |  |
| VALUE | 1 | 1 | 0 | 1 | 1 | 1 | 0 | 0 | 1 | 0 | 0 | 0 | 0 | 0 | 0 | 0 |  |  |  | ... | 0 |

Bits 0–5: POSITION-ORIENTATION
Bits 6–11: FORCE
Bits 12–31: UNUSED

Fig.17

| BIT NUMBER | 31 | ... | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|
| | | | | UNUSED | | | | | | fψ | fθ | fφ | fz | fy | fx | ψ | θ | φ | z | y | x |
| VALUE | 0 | ... | 0 | 0 | 0 | 0 | 0 | 0 | 0 | 0 | 0 | 0 | 1 | 0 | 0 | 1 | 1 | 1 | 0 | 1 | 1 |

Columns 0–5: POSITION-ORIENTATION
Columns 6–11: FORCE

| JOB ID | OPERATION ID | POSITION AND ORIENTATION (m) (x,y,z,φ,θ,ψ) | OPERATION TEMPLATE ID | FLAG (32 bits) | HAND | TIME (sec) | ENVIRONMENT INFORMATION ID | | CORRECTION PARAMETER ID | PROGRESS INFORMATION |
|---|---|---|---|---|---|---|---|---|---|---|
| | | | | | | | PERIPHERAL ENVIRONMENT | GRABBED OBJECT | | |
| 1 | 1 | 0,0,0,0,0,0 | 1 | 6 bit:1 THE REST:0 | 1 | 3 | 1 | 4 | 1 | 0 |
| : | : | : | : | : | : | : | : | : | : | : |
| 3 | 1 | 0.1,0.1,0.4, 0,0,0 | 1 | 0-5 bits:1 THE REST:0 | 1 | 0.37 | 1 | 4 | 3 | 1 |
| 3 | 2 | 0.1,0.2,0.4, 0,0,0 | 1 | 0-5 bits:1 THE REST:0 | 1 | 0.37 | 1 | 4 | 3 | 0 |
| : | : | : | : | : | : | : | : | : | : | : |
| 3 | 7 | 0.2,0.2,0.4, 0,0,0 | 1 | 0-5 bits:1 THE REST:0 | 1 | 0.37 | 1 | 4 | 3 | 0 |
| 3 | 8 | 0.2,0.1,0.4, 0,0,0 | 1 | 0-5 bits:1 THE REST:0 | 1 | 0.37 | 1 | 4 | 3 | 0 |
| .... | .... | .... | .... | .... | .... | .... | .... | .... | .... | .... |

REFER TO OPERATION TEMPLATE ID OF FIG. 27

FLAG OF FIG. 25A

REFER TO ENVIRONMENT INFORMATION ID OF FIG. 28A

REFER TO CORRECTION PARAMETER ID OF FIG. 29

*Fig.25A*

| OPERATION TEMPLATE ID | TYPE | TYPE ID | |
|---|---|---|---|
| 1 | 1 | 1 | → FIG. 25B |
| 2 | 2 | 1 | → FIG. 25C |
| 3 | 3 | 1 | → FIG. 25D |
| | ⋮ | ⋮ | |

*Fig.25B*

| IN THE CASE OF TYPE 1 | | |
|---|---|---|
| TYPE ID | CENTER COORDINATE (m) | RADIUS (r)(m) |
| 1 | $(x_{b1}, y_{b1}, z_{b1})$ | $r_{b1}$ |
| 2 | $(x_{b2}, y_{b2}, z_{b2})$ | $r_{b2}$ |

*Fig.25C*

| IN THE CASE OF TYPE 2 | | |
|---|---|---|
| TYPE ID | CENTER COORDINATE (m) | RADIUS (r)(m) |
| 1 | $(x_{c1}, y_{c1}, z_{c1})$ | $r_{c1}$ |
| 2 | $(x_{c2}, y_{c2}, z_{c2})$ | $r_{c2}$ |

IN THE CASE OF TYPE 3

| TYPE ID | COORDINATE 1 (m) | COORDINATE 2 (m) | COORDINATE 3 (m) | COORDINATE 4 (m) |
|---|---|---|---|---|
| 1 | $(x_{d1}, y_{d1}, z_{d1})$ | $(x_{d2}, y_{d2}, z_{d2})$ | $(x_{d3}, y_{d3}, z_{d3})$ | $(x_{d4}, y_{d4}, z_{d4})$ |
| 2 | $(x_{d5}, y_{d5}, z_{d5})$ | $(x_{d6}, y_{d6}, z_{d6})$ | $(x_{d7}, y_{d7}, z_{d7})$ | $(x_{d8}, y_{d8}, z_{d8})$ |

Fig.27

| BIT NUMBER | 31 | ... | 18 | 17 | 16 | 15 | 14 | 13 | 12 | 11 | 10 | 9 | 8 | 7 | 6 | $\psi$ | $\theta$ | $\phi$ | z | y | x |
|---|---|---|---|---|---|---|---|---|---|---|---|---|---|---|---|---|---|---|---|---|---|
| | | | | | | | | | | | | | | | | 5 | 4 | 3 | 2 | 1 | 0 |
| VALUE | 0 | ... | 0 | 0 | 0 | 0 | 0 | 0 | 0 | 0 | 0 | 0 | 0 | 0 | 0 | 0 | 0 | 0 | 1 | 1 | 1 |

Columns 6–31: UNUSED
Columns 0–5 ($\psi,\theta,\phi,z,y,x$): POSITION-ORIENTATION
All columns form: OPERATION TEMPLATE

*Fig.28A*

| ENVIRONMENT INFORMATION ID | TYPE | TYPE ID | |
|---|---|---|---|
| 1 | 1 | 1 | → FIG. 28B |
| 2 | 2 | 1 | → FIG. 28C |
| 3 | 3 | 1 | → FIG. 28D |
| 4 | 1 | 2 | → FIG. 28B |
| ⋮ | ⋮ | ⋮ | |

*Fig.28B*

| IN THE CASE OF TYPE 1 | | | |
|---|---|---|---|
| TYPE ID | CENTER COORDINATE (m) | RADIUS (r) (m) | HEIGHT (h) (m) |
| 1 | (0.1,0.1,0.1) | 0.2 | 0.3 |
| 2 | (0.1,0.1,0) | 0.01 | 0.2 |

*Fig.28C*

| IN THE CASE OF TYPE 2 | | |
|---|---|---|
| TYPE ID | CENTER COORDINATE (m) | RADIUS (r) (m) |
| 1 | (xc1,yc1,zc1) | rc1 |
| 2 | (xc2,yc2,zc2) | rc2 |

*Fig.28D*

| IN THE CASE OF TYPE 3 | | | | |
|---|---|---|---|---|
| TYPE ID | COORDINATE 1 (m) | COORDINATE 2 (m) | COORDINATE 3 (m) | HEIGHT (m) |
| 1 | (xd1,yd1,zd1) | (xd2,yd2,zd2) | (xd3,yd3,zd3) | hd1 |
| 2 | (xd5,yd5,zd5) | (xd6,yd6,zd6) | (xd7,yd7,zd7) | hd2 |

Fig.29

| CORRECTION PARAMETER ID | OPERATION INFORMATION FLAG (32 bits) | ENVIRONMENT INFORMATION FLAG (32 bits) | OPERATION TEMPLATE FLAG (32 bits) |
|---|---|---|---|
| 1 | 0 | 0 | 12 bit:1 |
| 2 | 2 bit:1 | 0 | 0 |
| 3 | 0-5 bits:1 | 1,2,12,13 bits:1 | 1,2,12 bits:1 |
| 4 | 0 | 0 | 3~8 bits:1 |
| 5 | 0-5 bits:1 | 1,2,12,13 bits:1 | 0-1 bits:1 |
| .... | .... | .... | .... |

FLAG OF FIG. 27    FLAG OF FIG. 30    FLAG OF FIG. 30

Fig.30

| BIT NUMBER | 0 | 1 | 2 | 3 | 4 | 5 | 6 | 7 | 8 | 9 | 10 | 11 | 12 | 13 | 14 | 15 | 16 | 17 | 18 | ... | 31 |
|---|---|---|---|---|---|---|---|---|---|---|---|---|---|---|---|---|---|---|---|---|---|
| | x1 | y1 | z1 | x2 | y2 | z2 | x3 | y3 | z3 | x4 | y4 | z4 | r | h | \multicolumn{7}{c}{UNUSED} | | | | | | |
| VALUE | 1 | 1 | 1 | 0 | 0 | 0 | 0 | 0 | 0 | 0 | 0 | 0 | 0 | 0 | 0 | 0 | 0 | 0 | 0 | ... | 0 |

- x1, y1, z1 : COORDINATE 1
- x2, y2, z2 : COORDINATE 2
- x3, y3, z3 : COORDINATE 3
- x4, y4, z4 : COORDINATE 4
- r : RADIUS
- h : HEIGHT

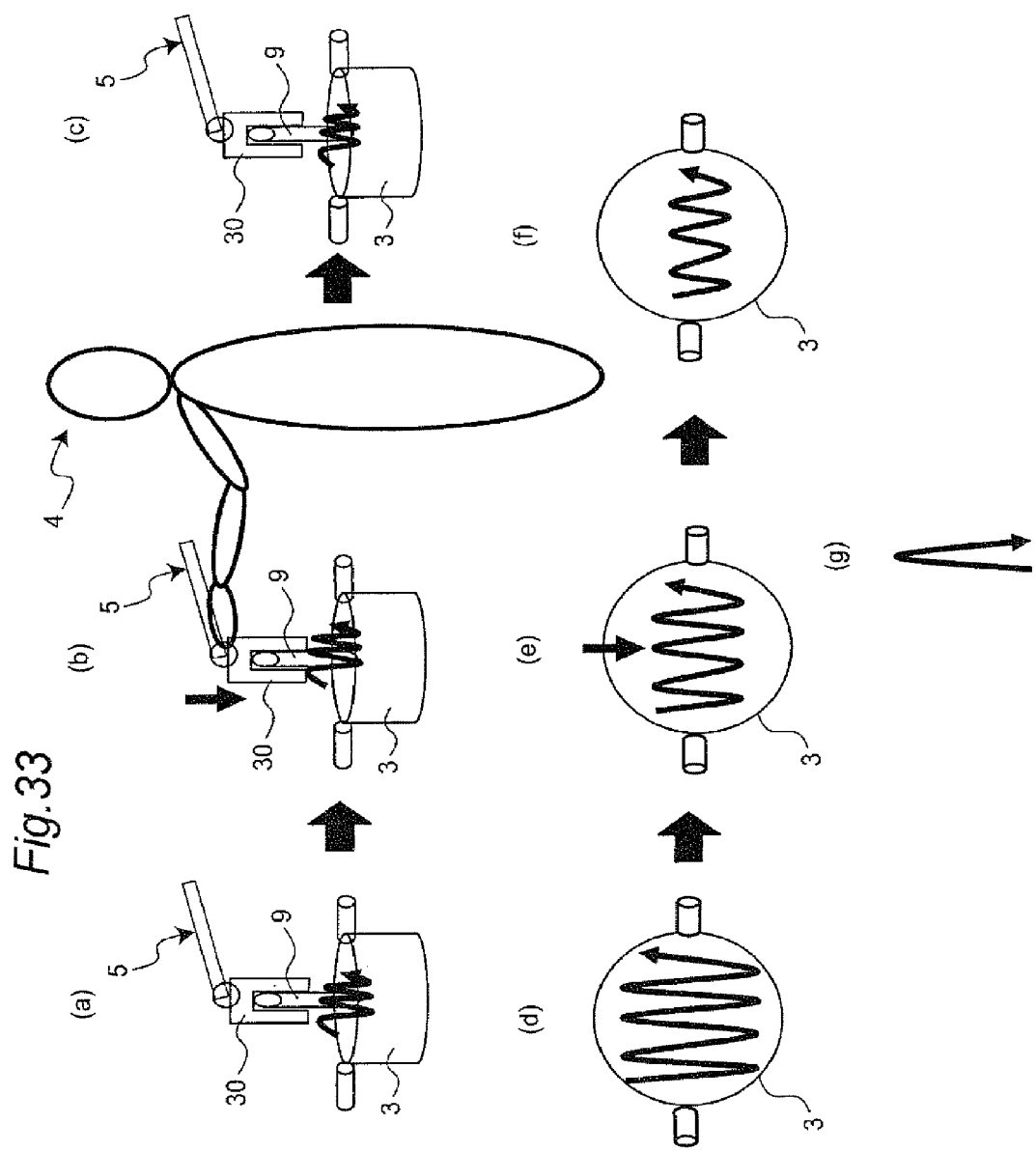

| JOB ID | OPERATION ID | POSITION AND ORIENTATION (m) (x,y,z,φ,θ,ψ) | OPERATION TEMPLATE ID | FLAG (32 bits) | HAND | TIME (sec) | ENVIRONMENT INFORMATION ID | | CORRECTION PARAMETER ID | PROGRESS INFORMATION |
|---|---|---|---|---|---|---|---|---|---|---|
| | | | | | | | PERIPHERAL ENVIRONMENT | GRABBED OBJECT | | |
| 1 | 1 | 0,0,0,0,0,0 | 3 | 6 bit:1 THE REST:0 | 1 | 3 | 1 | 4 | 4 | 0 |
| : | : | : | : | : | : | : | : | : | : | : |
| 4 | 1 | 0.1,0.1,0.4, 0,0,0 | 3 | 0-5 bits:1 THE REST:0 | 1 | 0.75 | 1 | 4 | 5 | 1 |
| 4 | 2 | 0.1,0.2,0.4, 0,0,0 | 3 | 0-5 bits:1 THE REST:0 | 1 | 1.5 | 1 | 4 | 5 | 0 |
| : | : | : | : | : | : | : | : | : | : | : |
| 4 | 8 | 0.2,0.2,0.4, 0,0,0 | 3 | 0-5 bits:1 THE REST:0 | 1 | 1.5 | 1 | 4 | 5 | 0 |
| 4 | 9 | 0.2,0.1,0.4, 0,0,0 | 3 | 0-5 bits:1 THE REST:0 | 1 | 0.75 | 1 | 4 | 5 | 0 |
| .... | .... | .... | .... | .... | .... | .... | .... | .... | .... | .... |

REFER TO OPERATION TEMPLATE ID OF FIG. 29

FLAG OF FIG. 27

REFER TO OPERATION TEMPLATE ID OF FIG. 25A

REFER TO ENVIRONMENT INFORMATION ID OF FIG. 28A

REFER TO CORRECTION PARAMETER ID OF FIG. 29

Fig.37

| JOB ID | OPERATION ID | OPERATION INFORMATION ||||||| COOKING APPARATUS INFORMATION ||
| --- | --- | --- | --- | --- | --- | --- | --- | --- | --- |
| | | POSITION AND ORIENTATION (m) (x,y,z,φ,θ,ψ) | FLAG (32 bits) | HAND | TIME (sec) | CORRECTION PARAMETER FLAG (32 bit) | PROGRESS INFORMATION | APPARATUS ID | CONTROL ID |
| 1 | 1 | 0,0,0,0,0,0 | 18 bit:1 THE REST:0 | 1 | 3 | 1 | 0 | 1 | 1001 |
| : | : | : | : | : | : | : | : | : | : |
| 3 | 1 | 0.1,0.1,0.1,0.4, 0,0,0 | 0-5 bits:1 THE REST:0 | 1 | 0.37 | 3 | 1 | 1 | 1001 |
| 3 | 2 | 0.1,0.2,0.2,0.4, 0,0,0 | 0-5 bits:1 THE REST:0 | 1 | 0.37 | 3 | 0 | 1 | 1002 |
| : | : | : | : | : | : | : | : | : | : |
| 3 | 7 | 0.2,0.2,0.2,0.4, 0,0,0 | 0-5 bits:1 THE REST:0 | 1 | 0.37 | 3 | 0 | 1 | 1002 |
| 3 | 8 | 0.2,0.1,0.2,0.4, 0,0,0 | 0-5 bits:1 THE REST:0 | 1 | 0.37 | 3 | 0 | 1 | 1003 |
| .... | .... | .... | .... | .... | .... | .... | .... | .... | .... |

17D (Operation Information); 63 (Cooking Apparatus Information)

Fig.38A
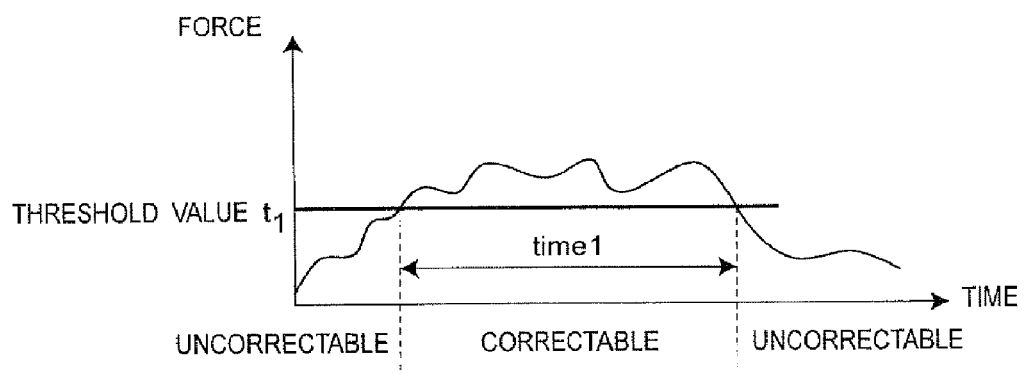
Fig.38B
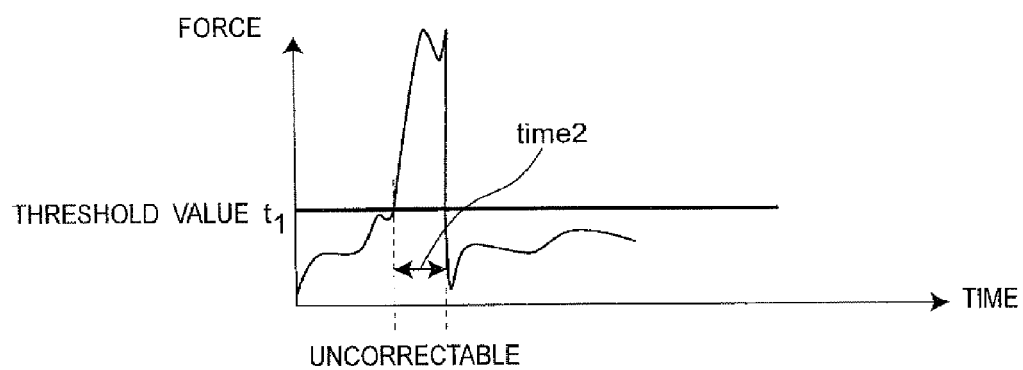
Fig.39
| MODE | FLAG |
|---|---|
| PRESENCE OR ABSENCE OF CORRECTION | 1 |
| AFTER CORRECTION, CORRECTED OPERATION OR ORIGINAL OPERATION ? | 0 |
| OVERWRITE OR INSERTION | 1 |
| LOW SPEED OR NOT | 1 |

Fig. 42

| JOB ID | OPERATION ID | POSITION AND ORIENTATION (m) (x,y,z,φ,θ,ψ) | FORCE (N) | FLAG (32 bits) | HAND | TIME (sec) | ENVIRONMENT INFORMATION ID - PERIPHERAL ENVIRONMENT | ENVIRONMENT INFORMATION ID - GRABBED OBJECT | CORRECTION PARAMETER FLAG (32 bit) | PROGRESS INFORMATION |
|---|---|---|---|---|---|---|---|---|---|---|
| 1 | 1 | 0,0,0,0,0,0 | 0,0,5,0,0,0 | 6 bit:1 THE REST:0 | 1 | 3 | 1 | 4 | 1 | 0 |
| : | : | : | : | : | : | : | : | : | : | : |
| 3 | 1 | 0.1,0.1,0.4,0,0,0 | 0,0,5,0,0,0 | 0-5 bits:1 THE REST:0 | 1 | 0.37 | 1 | 4 | 3 | 1 |
| 3 | 2 | 0.1,0.2,0.4,0,0,0 | 0,0,5,0,0,0 | 0-5 bits:1 THE REST:0 | 1 | 0.37 | 1 | 4 | 3 | 0 |
| : | : | : | : | : | : | : | : | : | : | : |
| 3 | 7 | 0.2,0.2,0.4,0,0,0 | 0,0,5,0,0,0 | 0-5 bits:1 THE REST:0 | 1 | 0.37 | 1 | 4 | 3 | 0 |
| 3 | 8 | 0.2,0.1,0.4,0,0,0 | 0,0,5,0,0,0 | 0-5 bits:1 THE REST:0 | 1 | 0.37 | 1 | 4 | 3 | 0 |
| .... | .... | .... | .... | .... | .... | .... | .... | .... | .... | .... |

FLAG OF FIG. 16

REFER TO ENVIRONMENT INFORMATION ID OF FIG. 43A

REFER TO CORRECTION PARAMETER ID OF FIG. 17

| ENVIRONMENT INFORMATION ID | TYPE | TYPE ID |
|---|---|---|
| 1 | 1 | 1 |
| 2 | 2 | 1 |
| 3 | 3 | 1 |
| 4 | 1 | 2 |
| ⋮ | ⋮ | ⋮ |

→ IN THE CASE OF TYPE 1 AND TYPE ID 1 OF FIG. 43B
→ IN THE CASE OF TYPE 2 OF FIG. 43D
→ IN THE CASE OF TYPE 3 OF FIG. 43F
→ IN THE CASE OF TYPE 1 AND TYPE ID 2 OF FIG. 43B

IN THE CASE OF TYPE 1

| TYPE ID | CENTER COORDINATE $C_1$ (m) | RADIUS $(r_1)$ (m) | HEIGHT $(h_1)$ (m) | CENTER COORDINATE $C_2$ (m) | RADIUS $(r_2)$ (m) | HEIGHT $(h_2)$ (m) |
|---|---|---|---|---|---|---|
| 1 | (0.1,0.1,0.1) | 0.02 | 0.005 | (0.1,0.1,0.1) | 0.01 | 0.007 |
| 2 | (0.1,0.1,0) | 0.01 | 0.005 | (0.1,0.1,0) | 0.01 | 0.007 |

Fig.43D
IN THE CASE OF TYPE 2
| TYPE ID | COORDINATE 1 (m) | COORDINATE 2 (m) | COORDINATE 3 (m) | HEIGHT (m) |
|---|---|---|---|---|
| 1 | $(x_{d1}, y_{d1}, z_{d1})$ | $(x_{d2}, y_{d2}, z_{d2})$ | $(x_{d3}, y_{d3}, z_{d3})$ | $H_{d1}$ |
| 2 | $(x_{d5}, y_{d5}, z_{d5})$ | $(x_{d6}, y_{d6}, z_{d6})$ | $(x_{d7}, y_{d7}, z_{d7})$ | $H_{d2}$ |
Fig.43E
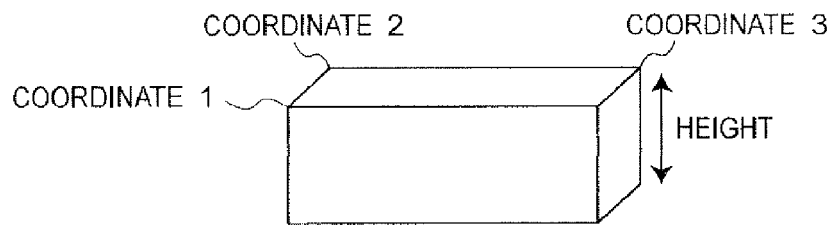
Fig.43F
IN THE CASE OF TYPE 3
| TYPE ID | CENTER COORDINATE (m) | RADIUS (r) (m) |
|---|---|---|
| 1 | $(x_{c1}, y_{c1}, z_{c1})$ | $r_{c1}$ |
| 2 | $(x_{c2}, y_{c2}, z_{c2})$ | $r_{c2}$ |
Fig.43G
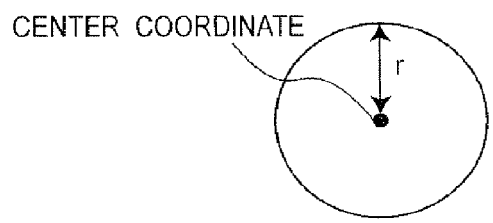

CONTROL APPARATUS AND CONTROL METHOD FOR ROBOT ARM, ROBOT, CONTROL PROGRAM FOR ROBOT ARM, AND INTEGRATED ELECTRONIC CIRCUIT FOR CONTROLLING ROBOT ARM

This application is a divisional application of application Ser. No. 12/863,475, which is the U.S. national stage of International Application PCT/JP2009/000783, filed Feb. 24, 2009.

BACKGROUND OF THE INVENTION

1. Technical Field

The present invention relates to a control apparatus and a control method for a robot arm, used for generating operations of a robot as well as for teaching the operations to the robot, a robot provided with the control apparatus for a robot arm, a program of a robot arm and an integrated electronic circuit for controlling a robot arm.

2. Background Art

In recent years, house-service robots, such as nursing robots or housekeeping support robots, have been vigorously developed. Different from an industrial robot, the house-service robot is manipulated by amateurs in home; therefore, it is necessary to easily teach operations to the robot. Moreover, since there are various operation environments in which the robot carries out a job depending on homes, it is necessary for the robot to flexibly adjust to the corresponding home environment.

For example, a teaching method for the robot device has been proposed in which a force sensor is attached to a wrist or the like of a robot, and a teaching person directly grabs a handle attached to a tip of the force sensor, and directs the robot to teaching points so that teaching processes for positions of the robot are carried out (see Patent Document 1 and Patent Document 2).

Patent Document 1: JP-A No. 59-157715
Patent Document 2: JP-A No. 7-84632

ISSUES TO BE SOLVED BY THE INVENTION

In Patent Document 1, however, since all teaching points need to be taught by a teaching person, a teaching process takes long time, resulting in time-consuming troublesome tasks. Moreover, in the industrial field, upon revising one portion of taught movements, the revision needs to be made through a programming process by using a remote control apparatus called a teaching pendant, or all the operations need to be taught all over again from the beginning, failing to provide an efficient process.

In particular, in the case of a house-service robot, the teaching time needs to be made as short as possible. Moreover, a combined use of the programming process by the remote control apparatus such as the teaching pendant causes an increase in operation steps, and learning of programming languages is required, with the result that this method becomes very difficult for amateurs at home.

Moreover, as described in Patent Document 2, in the industrial robot, a teaching job for teaching operations to the robot and a main job actually carried out by the robot are clearly divided and carried out respectively. However, upon executing the taught job at home, since the taught environment is frequently varied into a different environment, even when the taught operation, as it is, is carried out, the robot tends to stop, or tends to carry out an erroneous job, due to a varied environment. It is difficult to estimate all the varied environments in advance and to carry out the corresponding teaching processes. These issues are not limited to the house-service robot, and tend to occur also in the industrial robot, under an environment that is frequently varied into a different environment.

The present invention has been devised in view of these issues, and an objective thereof is to provide a control apparatus and a control method for a robot arm, which allows the robot arm to adopt to an environment in which the robot arm is operated, and by which a robot controlling process that allows an operator to easily carry out teaching processes on the robot arm in a short period of time, and also to prepare a robot, a control program for a robot arm and an integrated electronic circuit for controlling a robot arm.

SUMMARY OF THE INVENTION

In order to achieve the above-mentioned object, the present invention has the following structures.

According to a first aspect of the present invention, there is provided a control apparatus for a robot arm, which controls an operation of the robot arm, comprising:

an information acquiring unit configured to acquire operation information corresponding to the operation, from an operation information database in which at least one or more factors among a position, an orientation, and a speed of the robot arm are stored in a time-sequential manner as pieces of operation information, as well as to acquire correction operation information including at least one or more factors among a position, an orientation, and a speed of the robot arm to be used when a person manipulates the robot arm so as to correct the operation of the robot arm;

a position control unit configured to control the robot arm to be shifted based upon the operation information; and an operation correction unit configured to correct the operation information, midway during the shift of the robot arm while being controlled by the position control unit, in accordance with the correction operation information at each of points of time acquired by the information acquiring unit, wherein, based upon the operation information corrected by the operation correction unit, the operation of the robot arm is controlled.

According to a 26th aspect of the present invention, there is provided a control method for a robot arm, which controls an operation of the robot arm, comprising:

acquiring operation information corresponding to the operation, from an operation information database in which at least one or more factors among a position, an orientation, and a speed of the robot arm are stored in a time-sequential manner as pieces of operation information, by using an information acquiring unit, as well as acquiring correction operation information including at least one or more factors among a position, an orientation, and a speed of the robot arm to be used when a person manipulates the robot arm so as to correct the operation of the robot arm, by using the information acquiring unit;

controlling the robot arm to be shifted based upon the operation information, by using a position control unit; and correcting the operation information, midway during the shift of the robot arm while being controlled by the position control unit, by using an operation correction unit, in accordance with the correction operation information at each of points of time acquired by the information acquiring unit, wherein, based upon the operation information corrected by the operation correction unit, the operation of the robot arm is controlled.

According to a 27th aspect of the present invention, there is provided a robot comprising:

a robot arm; and the control apparatus for a robot arm used for controlling the robot arm, according to any one of a first to 25th aspects.

According to a 28th aspect of the present invention, there is provided a control program for a robot arm used for controlling an operation of the robot arm, allowing a computer to execute steps of:

acquiring operation information corresponding to the operation, from an operation information database in which at least one or more factors among a position, an orientation, and a speed of the robot arm are stored in a time-sequential manner as pieces of operation information, by using an information acquiring unit, as well as acquiring correction operation information including at least one or more factors among a position, an orientation, and a speed of the robot arm to be used when a person manipulates the robot arm so as to correct the operation of the robot arm, by using the information acquiring unit;

controlling the robot arm to be shifted based upon the operation information, by using a position control unit; and correcting the operation information, midway during the shift of the robot arm while being controlled by the position control unit, by using an operation correction unit, in accordance with the correction operation information at each of points of time acquired by the information acquiring unit, wherein, based upon the operation information corrected by the operation correction unit, the controlling steps of operations of the robot arm are executed.

According to a 29th aspect of the present invention, there is provided an integrated electronic circuit for controlling an operation of a robot arm, comprising:

an information acquiring unit configured to acquire operation information corresponding to the operation, from an operation information database in which at least one or more factors among a position, an orientation, and a speed of the robot arm are stored in a time-sequential manner as pieces of operation information, as well as to acquire correction operation information including at least one or more factors among a position, an orientation, and a speed of the robot arm to be used when a person manipulates the robot arm so as to correct the operation of the robot arm;

a position control unit configured to control the robot arm to be shifted based upon the operation information; and an operation correction unit configured to correct the operation information, midway during the shift of the robot arm while being controlled by the position control unit, in accordance with the correction operation information at each of points of time acquired by the information acquiring unit, wherein, based upon the operation information corrected by the operation correction unit, the operation of the robot arm is controlled.

As described above, in accordance with a control apparatus for a robot arm and a robot provided with the control apparatus for a robot arm of the present invention, since an operation information database, a force detection unit, and an operation correction unit are prepared, it is possible to carry out a controlling operation of the robot arm by which the operation of the robot arm described as operation information can be easily corrected in response to a force applied by a person.

Moreover, since the control apparatus of the robot arm is further provided with template information for operations, environment information, correction parameter information, and the like, operations of the robot arm can be easily generated, and in addition, only the parameter specified by the correction parameter can be corrected.

Furthermore, in accordance with a control method for a robot arm, the control program for a robot arm and an integrated electronic circuit for controlling a robot arm of the present invention, it is possible to carry out a controlling operation of the robot arm by which the operation of the robot arm described as operation information can be easily corrected in response to a force applied by a person.

BRIEF DESCRIPTION OF THE DRAWINGS

These and other objects and features of the present invention will be made clearer by the following description relating to preferred embodiments with reference to the accompanying drawings, in which:

FIG. 3 is a view illustrating a list of operation information of an operation information database of the control apparatus for a robot arm in the first embodiment;

FIG. 4 is a view illustrating information of flags of the operation information database of the control apparatus for a robot arm in the first embodiment;

FIG. 5 is a view illustrating information of correction parameter flags of the operation information database of the control apparatus for a robot arm in the first embodiment;

FIG. 6 is a view illustrating a list of information to be stored in an operation selecting unit in the robot arm control apparatus in the first embodiment;

FIG. 15 is a view illustrating information of flags and the like of an operation information database of the control apparatus for a robot arm in the second embodiment of the present invention;

FIG. 16 is a view illustrating information of flags of the operation information database of the control apparatus for a robot arm in the second embodiment of the present invention;

FIG. 17 is a view illustrating information of correction parameter flags of the operation information database of the control apparatus for a robot arm in the second embodiment of the present invention;

FIG. 24 is an explanatory view showing operation information in a list format of an operation information database;

FIG. 25A is a view illustrating a list of operation template information of the third embodiment of the present invention;

FIG. 25B is a view in a list format that indicates center coordinates and a radius of an operation template relating to a state in which the operation template ID is "1" and the type is "1" in the list of FIG. 25A;

FIG. 25C is a view in a list format that indicates center coordinates and a radius of an operation template relating to a state in which the operation template ID is "2" and the type is "2" in the list of FIG. 25A;

FIG. 27 is a view illustrating information of flags in the operation information database in the third embodiment of the present invention;

FIG. 28A is a view illustrating a list of environmental information of an environmental information database in the third embodiment of the present invention;

FIG. 28B is an explanatory view illustrating, in a list format, environmental information of the environmental information database in the third embodiment of the present invention;

FIG. 28C is an explanatory view illustrating, in a list format, environmental information of the environmental information database in the third embodiment of the present invention;

FIG. 28D is an explanatory view illustrating, in a list format, environmental information of the environmental information database in the third embodiment of the present invention;

FIG. 29 is a view illustrating a list of correction parameters of a correction parameter database in the third embodiment of the present invention;

FIG. 30 is a view illustrating information relating to flags of the correction parameters in the third embodiment of the present invention;

FIG. 33 is an explanatory view including (a) to (g) views respectively illustrating operating states of a robot arm a control apparatus for a robot arm and manipulating states by a person in a fourth embodiment of the present invention;

FIG. 34 is a view illustrating a list of operation information of operation information database of the control apparatus for a robot arm in the fourth embodiment of the present invention;

FIG. 37 is a view illustrating a list of operation information of an operation information database and cooking apparatus information of a cooking apparatus information database of the robot system in the fifth embodiment of the present invention;

FIG. 38A is a view showing a relationship between a force applied by a person and applied time of the force in a sixth embodiment of the present invention;

FIG. 38B is a view showing a relationship between a force applied by a person and applied time of the force in the sixth embodiment of the present invention;

FIG. 39 is a view illustrating a list of information to be set in a correction method setting unit in the sixth embodiment of the present invention;

FIG. 42 is an explanatory view in a list format showing operation information of an operation information database;

FIG. 43D is a view illustrating a list of environmental information of an environmental information database in the seventh embodiment of the present invention;

FIG. 43E is a view showing an object indicated by the environmental information of the environmental information database of FIG. 43D in the seventh embodiment of the present invention;

FIG. 43F is a view illustrating a list of environmental information of an environmental information database in the seventh embodiment of the present invention; and FIG. 43G is a view showing a circle indicated by the environmental information of the environmental information database of FIG. 43F in the seventh embodiment of the present invention.

DETAILED DESCRIPTION OF THE INVENTION

Figure 1:
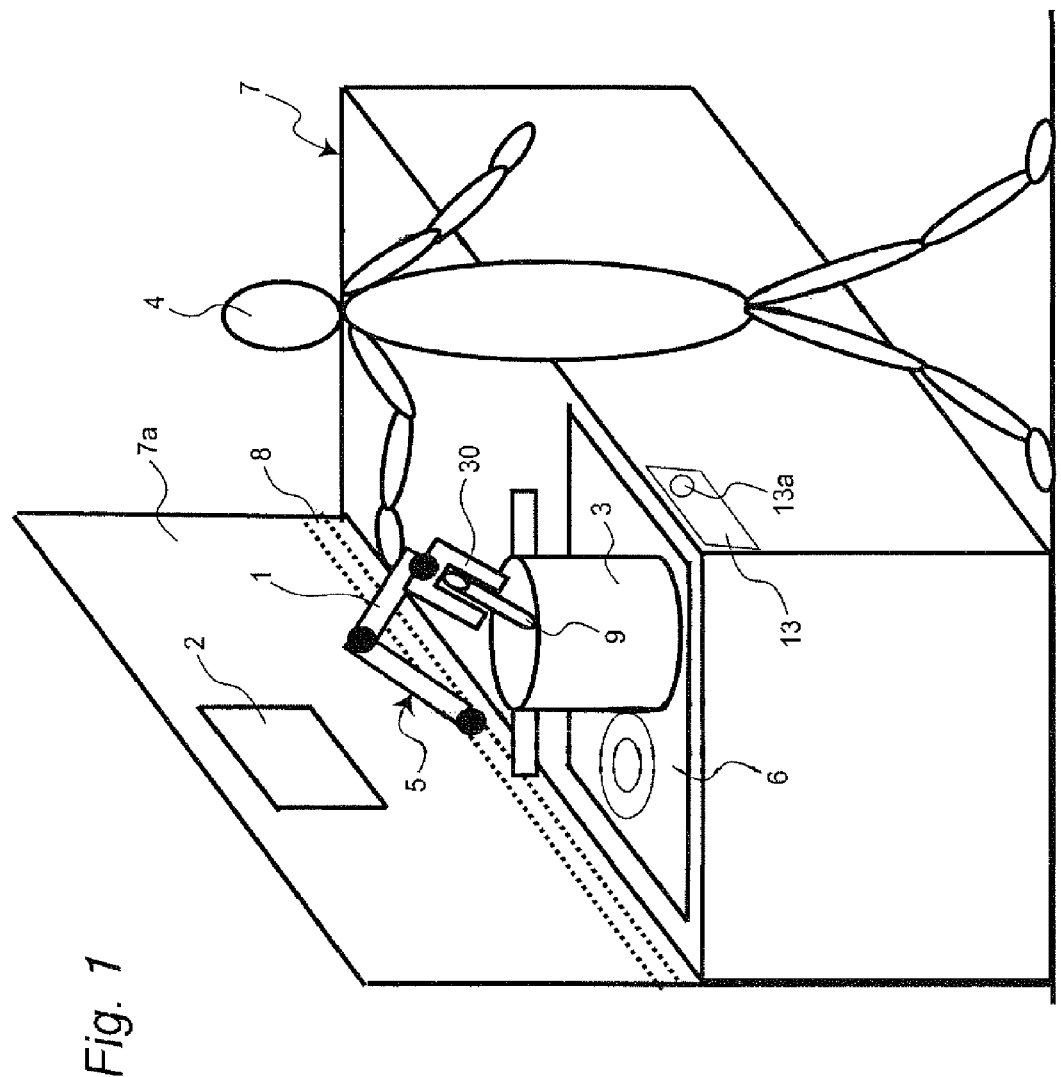
FIG. 1 is a view showing schematic structures of a control apparatus for a robot arm and the robot arm to be controlled that form a robot system in a first embodiment of the present invention.

Hereinafter, embodiments of the present invention will be described in detail with reference to the drawings.

Before describing the embodiments of the present invention in detail with reference to the drawings, various modes of the present invention will be described.

According to a first aspect of the present invention, there is provided a control apparatus for a robot arm, which controls an operation of the robot arm, comprising:

an information acquiring unit configured to acquire operation information corresponding to the operation, from an operation information database in which at least one or more factors among a position, an orientation, and a speed of the robot arm are stored in a time-sequential manner as pieces of operation information, as well as to acquire correction operation information including at least one or more factors among a position, an orientation, and a speed of the robot arm to be used when a person manipulates the robot arm so as to correct the operation of the robot arm;

a position control unit configured to control the robot arm to be shifted based upon the operation information; and an operation correction unit configured to correct the operation information, midway during the shift of the robot arm while being controlled by the position control unit, in accordance with the correction operation information at each of points of time acquired by the information acquiring unit, wherein, based upon the operation information corrected by the operation correction unit, the operation of the robot arm is controlled.

With this structure, it is possible to correct the operation information in accordance with a force applied by the person.

According to a second aspect of the present invention, there is provided a control apparatus for a robot arm, which controls an operation of the robot arm, comprising:

an information acquiring unit configured to acquire operation information corresponding to the operation, from an operation information database in which a force to be applied to an object by the robot arm is stored as time-sequential operation information, as well as to acquire correction operation information relating to the force to be applied by the robot arm when a person manipulates the robot arm so as to correct the operation of the robot arm;

a force control unit configured to control the robot arm, with the object being pressed by the force of the operation information; and an operation correction unit configured to correct the operation information, midway during the controlling operation by the force control unit, in accordance with the correction operation information at each of points of time acquired by the information acquiring unit, wherein, based upon the operation information corrected by the operation correction unit, the operation of the robot arm is controlled.

With this structure, it is possible to correct the information of the position and force in accordance with the force applied by the person.

According to a third aspect of the present invention, there is provided the control apparatus for a robot arm according to the first or second aspect, further comprising:

a force detection unit configured to detect a force of the person applied to the robot arm, wherein the information acquiring unit acquires the correction operation information in accordance with the force of the person detected by the force detection unit.

According to a fourth aspect of the present invention, there is provided the control apparatus for a robot arm according to the first or third aspect, wherein the operation information acquired by the information acquiring unit includes template information of a geometrical operation, used for generating the operation of the robot arm, the control apparatus further comprising:

an environment information acquiring unit configured to acquire environment information relating to an environment in which the robot arm is operated; and an operation information developing unit configured to generate the operation information of the robot arm from the template information of the operation contained in the operation information, based upon the environment information, wherein, based upon the correction operation information at each of points of time acquired by the information acquiring unit midway during the shift of the robot arm while being controlled by the position control unit, in accordance with the operation information developed by the operation information developing unit, the information acquiring unit corrects the template information of the operation, and based upon the operation information generated by the operation information developing unit in accordance with the template information corrected by the operation correction unit, the operation of the robot arm is controlled.

With this structure, it is possible to correct the operation information based upon the environment information, and further correct the operation information in the operation information database in accordance with the force applied by the person.

According to a fifth aspect of the present invention, there is provided the control apparatus for a robot arm according to any one of the first to fourth aspects, further comprising:

a correction method setting unit configured to set a method for correcting the operation information by the operation correction unit, wherein, in accordance with the correction method set by the correction method setting unit, the operation information is corrected by the operation correction unit.

With this structure, a setting process can be carried out on the operation method.

According to a sixth aspect of the present invention, there is provided the control apparatus for a robot arm according to the fifth aspect, wherein the correction method setting unit sets information relating to presence or absence of correction indicating whether or not the operation information is corrected;

in a case where, referring to the information relating to the presence or absence of correction set by the correction method setting unit, by the operation correction unit, the information relating to the presence or absence of correction of the operation information indicates that the correction is required, the operation information is corrected by the operation correction unit, while, when the information relating to the presence or absence of correction set by the correction method setting unit indicates that no correction is required, the operation information is not corrected.

With this structure, it is possible to make a switch as to whether or not the operation information is corrected based upon the force of the person.

According to a seventh aspect of the present invention, there is provided the control apparatus for a robot arm according to the fifth aspect, wherein in a case where, after the correction in the operation correction unit, the force of the person detected by the force detection unit becomes smaller than a threshold value, the correction method setting unit sets a correction method as to whether the corrected operation is carried out or the operation is returned to a previous operation before the correction, and in a case where, after the correction by the operation correction unit referring to the correction method set by the correction method setting unit, the force of the person detected by the force detection unit becomes smaller than the threshold value, the correction method setting unit switches operation as to whether the corrected operation is carried out or the operation is returned to the previous operation before the correction, and in a case where, after the correction in the operation correction unit carried out by controlling the operation of the robot arm based upon the operation information corrected by the operation correction unit, the force of the person detected by the force detection unit becomes smaller than the threshold value, the operation of the robot arm is controlled in accordance with the operation switched by the correction method set in the correction method setting unit.

With this structure, in the case where, after the correction in the operation correction unit, the force of the person becomes smaller than the threshold value, it is possible to make a switch as to whether the corrected operation is carried out or the operation is returned to the previous operation before the correction.

According to an eighth aspect of the present invention, there is provided the control apparatus for a robot arm according to the sixth aspect, wherein in a case where, after the correction in the operation correction unit based upon the setting that the correction of the operation information is required, a setting is made so that the correction of the operation information is not required, the correction method setting unit sets a correction method as to whether the corrected operation is carried out or the operation is returned to a previous operation before the correction, and in a case where, after the correction in the operation correction unit based upon the setting that the correction of the operation information is required, referring to the correction method set by the correction method setting unit, a setting is made so that the correction of the operation information is not required, the correction method setting unit switches operation as to whether the corrected operation is carried out or the operation is returned to the previous operation before the correction, and in a case where, after the correction in the operation correction unit carried out by controlling the operation of the robot arm based upon the operation information corrected by the operation correction unit, a setting is made so that the correction of the operation information is not required, the operation of the robot arm is controlled in accordance with the operation switched by the correction method set in the correction method setting unit.

With this structure, even in the case where, after having been set that the operation information should be corrected, and after the correction has been made by the operation correction unit, a setting process is made so that the operation information is not corrected, it is possible to make a switch as to whether the corrected operation is carried out or the operation is returned to the previous operation before the correction.

According to a ninth aspect of the present invention, there is provided the control apparatus for a robot arm according to the fifth aspect, wherein the correction method setting unit sets a method for correction as to whether an operation after corrected by the operation correction unit is operated after having been overwritten on the previous operation before the correction or the operation after corrected by the operation correction unit is operated after having been inserted, and referring to the correction method set by the correction method setting unit, the correction method setting unit switches an operation as to whether the operation after corrected by the operation correction unit is operated after having been overwritten on the previous operation before the correction or the operation after corrected thereby is operated after having been inserted, after the correction in the operation correction unit carried out by controlling the operation of the robot arm based upon the operation information corrected by the operation correction unit, the operation of the robot arm is controlled by the operation switched by the correction method set by the correction method setting unit.

With this structure, the correction method setting unit is allowed to make a switch as to whether the operation after corrected by the operation correction unit is operated after having been overwritten on the previous operation before the correction or the operation after having been inserted is operated.

According to a tenth aspect of the present invention, there is provided the control apparatus for a robot arm according to the ninth aspect, wherein in a case where the setting is made in the correction method in the correction method setting unit so that the operation after corrected by the operation correction unit is carried out after having been overwritten on the previous operation before the correction, upon inserting the operation information after the correction to the operation information before the correction, the operation correction unit corrects the operation at a connected portion between the operations before and after the correction in such a manner so that the connected portion after the correction is carried out at a lower speed than a portion other than the connected portion or so as to be stopped.

According to an 11th aspect of the present invention, there is provided the control apparatus for a robot arm according to the fifth aspect, wherein when a person directly grabs the robot arm and manipulates the robot arm so as to switch the operation to a corrected operation, the correction method setting unit sets a method for correction as to whether or not the operation is carried out at a speed lower than a speed of the operation before the switching;

when the person directly grabs the robot arm and operates the robot arm, the switching is made as to whether or not the operation of the robot arm is carried out at a speed lower than a speed of the operation before the manipulation, referring to the correction method set in the correction method setting unit, by the operation correction unit; and upon controlling the operation of the robot arm based upon the operation information corrected by the operation correction unit, the operation of the robot arm is controlled by the operation switched by the correction method set by the correction method setting unit, when the person directly grabs the robot arm and manipulates the robot arm.

With this structure, the correction method setting unit is allowed to make a switch as to whether or not the operation speed of the operation information is altered in response to the force of the person.

According to a 12th aspect of the present invention, there is provided the control apparatus for a robot arm according to the first aspect, further comprising:

a correction parameter type acquiring unit configured to acquire a type of a parameter to be corrected, the type of a parameter to be corrected being defined as the type based on which at least one or more of types among the position, the orientation, and the speed of the robot arm of the operation information are determined in respective directions differently upon correcting the operation information, and in a case where the operation correction unit corrects the operation information of the operation information database, referring to the type of the parameter to be corrected acquired by the correction parameter acquiring unit, the operation correction unit corrects only the correction parameter determined by the type of the parameter to be corrected. With this structure, it is possible to correct only the type specified by the correction parameter.

According to a 13th aspect of the present invention, there is provided the control apparatus for a robot arm according to the first aspect, further comprising:

a correction parameter type acquiring unit configured to acquire a type of a parameter to be corrected, the type of a parameter to be corrected being defined as the type based on which at least one or more of types among the position, the orientation, and the speed of the operation information are determined in respective directions differently upon correcting the operation information, and in a case where the operation correction unit corrects the operation information of the operation information database, referring to the type of the parameter to be corrected acquired by the correction parameter acquiring unit, the operation correction unit corrects only the correction parameter determined by the type of the parameter to be corrected.

According to a 14th aspect of the present invention, there is provided the control apparatus for a robot arm according to the second aspect, further comprising:

a correction parameter type acquiring unit configured to acquire a type of a parameter to be corrected, the type of a parameter to be corrected being defined as the type based on which information relating to the force of the operation information is determined in respective directions differently upon correcting the operation information, and in a case where the operation correction unit corrects the operation information of the operation information database, referring to the type of the parameter to be corrected acquired by the correction parameter acquiring unit, the operation correction unit corrects only the correction parameter determined by the type of the parameter to be corrected.

According to a 15th aspect of the present invention, there is provided the control apparatus for a robot arm according to the fourth aspect, further comprising:

a correction parameter type acquiring unit configured to acquire a type of a parameter to be corrected, the type of a parameter to be corrected being used for determining respective types of individual parameters forming the template information of the operation of the operation information upon correcting the operation information, and in a case where the operation correction unit corrects the operation information of the operation information database, referring to the type of the parameter to be corrected acquired by the correction parameter acquiring unit, the operation correction unit corrects only the correction parameter determined by the type of the parameter to be corrected.

According to a 16th aspect of the present invention, there is provided the control apparatus for a robot arm according to any one of the 13th to 15th aspects, wherein the operation correction unit corrects the operation information of the operation information database so as to constrain the operation of the robot arm in response to the force of the person detected by the force detection unit, in accordance with the type of the correction parameter. With this structure, in accordance with the type of the correction parameter, the operation of the robot arm can be constrained in response to the force applied by the person.

According to a 17th aspect of the present invention, there is provided the control apparatus for a robot arm according to any one of the 13th to 15th aspects, further comprising:

an information generation unit configured to generate the operation information in association with the type of the correction parameter.

With this structure, the operation information and the type of the correction parameter can be prepared in association with each other.

According to an 18th aspect of the present invention, there is provided the control apparatus for a robot arm according to any one of the 13th to 15th aspects, further comprising:

a display unit configured to, upon an operation correction by the operation correction unit, display the correction parameter. With this structure, the correction parameter can be displayed.

According to a 19th aspect of the present invention, there is provided the control apparatus for a robot arm according to the second aspect, further comprising:

a control unit configured to, when a person directly grabs the robot arm and manipulates the robot arm, switch modes to a high-rigidity position control mode in which the robot arm is prevented from being shifted by the operation of the person and being brought in contact with another object, wherein, when the operation correction unit corrects the information of the force among pieces of operation information, the operation correction unit changes modes from a mode for carrying out a controlling process, with the object being pressed by the force based upon the operation information, to the high-rigidity position control mode so that the information of the force among the pieces of operation information is corrected.

With this structure, during an operation in the position control mode as well as in the impedance control mode, based upon the information in the operation information database, the operation information in the operation information database can be corrected under a position control mode with low rigidity in response to the force of the person.

According to a 20th aspect of the present invention, there is provided control apparatus for a robot arm according to the first or fourth aspect, wherein upon carrying out the correction of the operation information, midway during the shift of the robot arm while being controlled by the position control unit, the operation correction unit switches modes to a control mode in which the robot arm is shifted by the manipulation of the person, so as to carry out the correcting operation. With this structure, during an operation in the position control mode based upon the information in the operation information database, the operation correction unit can correct the operation information in the operation information database in the impedance control mode in response to the force of the person.

According to a 21st aspect of the present invention, there is provided the control apparatus for a robot arm according to any one of the first to fourth aspects, further comprising:

an operation storage unit configured to store the operation corrected by the operation correction unit, wherein the operation storage unit starts a storing process in the operation storage unit after a lapse of a certain period of time from start of the correcting operation.

With this structure, the operation storage unit can start a storing process after a lapse of a certain period of time from the start of the correction.

According to a 22nd aspect of the present invention, there is provided the control apparatus for a robot arm according to the third aspect, further comprising:

an operation storage unit configured to store the operation corrected by the operation correction unit, wherein the operation storage unit starts a storing process in the operation storage unit when the force of the person detected by the force detection unit has reached a certain threshold value or more.

With this structure, the storage starting time in the operation storage unit can be determined in accordance with the force of the person.

According to a 23rd aspect of the present invention, there is provided the control apparatus for a robot arm according to the third aspect, wherein the operation information acquiring unit acquires a plurality of pieces of the operation information, and the control apparatus further comprises an operation selecting unit configured to select operation information among the plurality of pieces of operation information acquired by the operation information acquiring unit, in accordance with the force of the person detected by the force detection unit, wherein the operation correction unit corrects the operation information selected by the operation selecting unit.

With this structure, the person is allowed to easily select operation information to be desirably selected, by actually manipulating the robot arm.

According to a 24th aspect of the present invention, there is provided the control apparatus for a robot arm according to the third aspect, wherein the correction method setting unit determines a switching process as to whether or not the operation information is corrected, based upon the force of the person detected by the force detection unit. With this structure, it is possible to easily set a switching process as to whether or not the operation information is corrected.

According to a 25th aspect of the present invention, there is provided the control apparatus for a robot arm according to the first or second aspect, further comprising:

another peripheral apparatus located on a periphery of the robot arm; and a peripheral apparatus information acquiring unit configured to acquire peripheral apparatus information as information relating to the peripheral apparatus, wherein the operation correction unit controls the peripheral apparatus upon correcting the operation information.

With this structure, the peripheral apparatus can be controlled during the correction of the operation information.

According to a 26th aspect of the present invention, there is provided a control method for a robot arm, which controls an operation of the robot arm, comprising:

acquiring operation information corresponding to the operation, from an operation information database in which at least one or more factors among a position, an orientation, and a speed of the robot arm are stored in a time-sequential manner as pieces of operation information, by using an information acquiring unit, as well as acquiring correction operation information including at least one or more factors among a position, an orientation, and a speed of the robot arm to be used when a person manipulates the robot arm so as to correct the operation of the robot arm, by using the information acquiring unit;

controlling the robot arm to be shifted based upon the operation information, by using a position control unit; and correcting the operation information, midway during the shift of the robot arm while being controlled by the position control unit, by using an operation correction unit, in accordance with the correction operation information at each of points of time acquired by the information acquiring unit, wherein, based upon the operation information corrected by the operation correction unit, the operation of the robot arm is controlled.

With this structure, as the control method for a robot arm, it is possible to provide a method in which operation information corresponding to information relating to the operation of the robot arm is stored, and by detecting a force applied by the person, the operation information is corrected in accordance with the force of the person.

According to a 27th aspect of the present invention, there is provided a robot comprising:

a robot arm; and the control apparatus for a robot arm used for controlling the robot arm, according to any one of the first to 25th aspects.

According to a 28th aspect of the present invention, there is provided a control program for a robot arm used for controlling an operation of the robot arm, allowing a computer to execute steps of:

acquiring operation information corresponding to the operation, from an operation information database in which at least one or more factors among a position, an orientation, and a speed of the robot arm are stored in a time-sequential manner as pieces of operation information, by using an information acquiring unit, as well as acquiring correction operation information including at least one or more factors among a position, an orientation, and a speed of the robot arm to be used when a person manipulates the robot arm so as to correct the operation of the robot arm, by using the information acquiring unit;

controlling the robot arm to be shifted based upon the operation information, by using a position control unit; and correcting the operation information, midway during the shift of the robot arm while being controlled by the position control unit, by using an operation correction unit, in accordance with the correction operation information at each of points of time acquired by the information acquiring unit, wherein, based upon the operation information corrected by the operation correction unit, the controlling steps of operations of the robot arm are executed.

With this structure, it is possible to provide a control program for a robot arm characterized by including a step in which, by using the operation information database that stores information relating to the operation of the robot arm, the operation information of the operation information database is corrected in accordance with a detected force of the person.

According to a 29th aspect of the present invention, there is provided an integrated electronic circuit for controlling an operation of a robot arm, comprising:

an information acquiring unit configured to acquire operation information corresponding to the operation, from an operation information database in which at least one or more factors among a position, an orientation, and a speed of the robot arm are stored in a time-sequential manner as pieces of operation information, as well as to acquire correction operation information including at least one or more factors among a position, an orientation, and a speed of the robot arm to be used when a person manipulates the robot arm so as to correct the operation of the robot arm;

a position control unit configured to control the robot arm to be shifted based upon the operation information; and an operation correction unit configured to correct the operation information, midway during the shift of the robot arm while being controlled by the position control unit, in accordance with the correction operation information at each of points of time acquired by the information acquiring unit, wherein, based upon the operation information corrected by the operation correction unit, the operation of the robot arm is controlled. With this structure, it is possible to provide an integrated electronic circuit for controlling a robot arm characterized by having an operation information database in which information relating to operations of the robot arm is stored and an operation correction unit that corrects the operation information of the operation information database in response to the force of a person detected by the force detection unit.

Referring to the drawings, the following description will discuss embodiments of the present invention in detail.

(First Embodiment)

First, the following description will discuss a structure of a robot system 1 provided with a robot arm control apparatus in accordance with a first embodiment of the present invention. FIG. 1 is a view that schematically shows the robot system 1 provided with a robot arm 5 and its control apparatus 70 in the first embodiment of the present invention.

As shown in FIG. 1, the robot arm 5 of the robot system 1 is attached to a wall surface 7a of a kitchen in a home, or a work bench 7 such as a table, and a base end of the robot arm 5 is shiftably supported on a rail 8 secured onto the wall surface 7a so that the robot arm 5 is allowed to move on the rail 8 in lateral directions, for example, in horizontal directions, along the rail 8, by a force of a person 4.

The robot system 1 is a robot system for carrying out a job in a home that is executed by the robot arm 5 and the person 4 in cooperation with each other, for example, a job for stirring cooking materials in a pot 3 by using the robot arm 5 or a job for wiping off stains in the kitchen by using the robot arm 5. FIG. 1 shows examples of a sequence of processes of a job by the robot system 1, such as the stirring job for the cooking materials in the pot 3 by the robot system 1, or a wiping job for a top plate of an IH cooking heater by the robot system 1.

First, the person 4 directly grabs or pushes the robot arm 5 of the robot system 1 so that the person 4 applies a force to the robot arm 5. Thus, by the force applied to the robot arm 5 from the person 4, the robot arm 5 of the robot system 1 is allowed to move along the rail 8 so that the robot arm 5 is directed to the vicinity of the tool 3.

Next, the person 4 attaches a tool 9, such as a ladle for use in the stirring job, or a tool 46 (see FIG. 14A in a second embodiment) for use in the wiping job, to the tip unit, that is, a hand 30 of the tip of the robot arm 5, of the robot system 1.

Next, the person 4, for example, pushes button(s) 13a of an operation panel 13 of the robot system 1, placed on a side surface or the like of a cooking apparatus 6, such as an IH cooking heater or a gas heater, so as to use a data input IF 26 so that the robot arm 5 is activated, and a preliminarily selected job, that is, the stirring job or the wiping job, is started. The following description will discuss, for example, the stirring job carried out by the robot arm 5.

Next, when the robot arm 5 is carrying out the stirring process in the pot 3 by using the ladle 9 grabbed by the hand 30, the person 4 confirms the state of the cooking materials inside the pot 3, and the person 4 adds a force to the robot arm 5 so as to allow the robot arm 5 to carry out a stirring operation. By utilizing information stored in the operation information database 17 by the operation storage unit 15, an operation selecting unit 27, which will be described later, is allowed to select an optimal stirring method. In accordance with a correction sequence displayed on the display unit 2 which will be described later, the person 4 directly grabs or pushes the robot arm 5 of the robot system 1 so that a force is applied to the robot arm 5 in a desired correcting direction, and the operation of the robot arm 5 of the robot system 1 is subsequently corrected.

In this case, the rail 8 is disposed on the wall surface 7a of the work bench 7; however, in the case of an island kitchen without wall surfaces, the rail 8 may be attached to a suitable place for a job, such as a ceiling surface or a side surface of a top plate of the island kitchen.

Moreover, although the operation panel 13 is secured to a side surface of the cooking apparatus 6, a remote control unit capable of carrying out remote manipulations may be used in place of the operation panel 13.

Figure 2A:
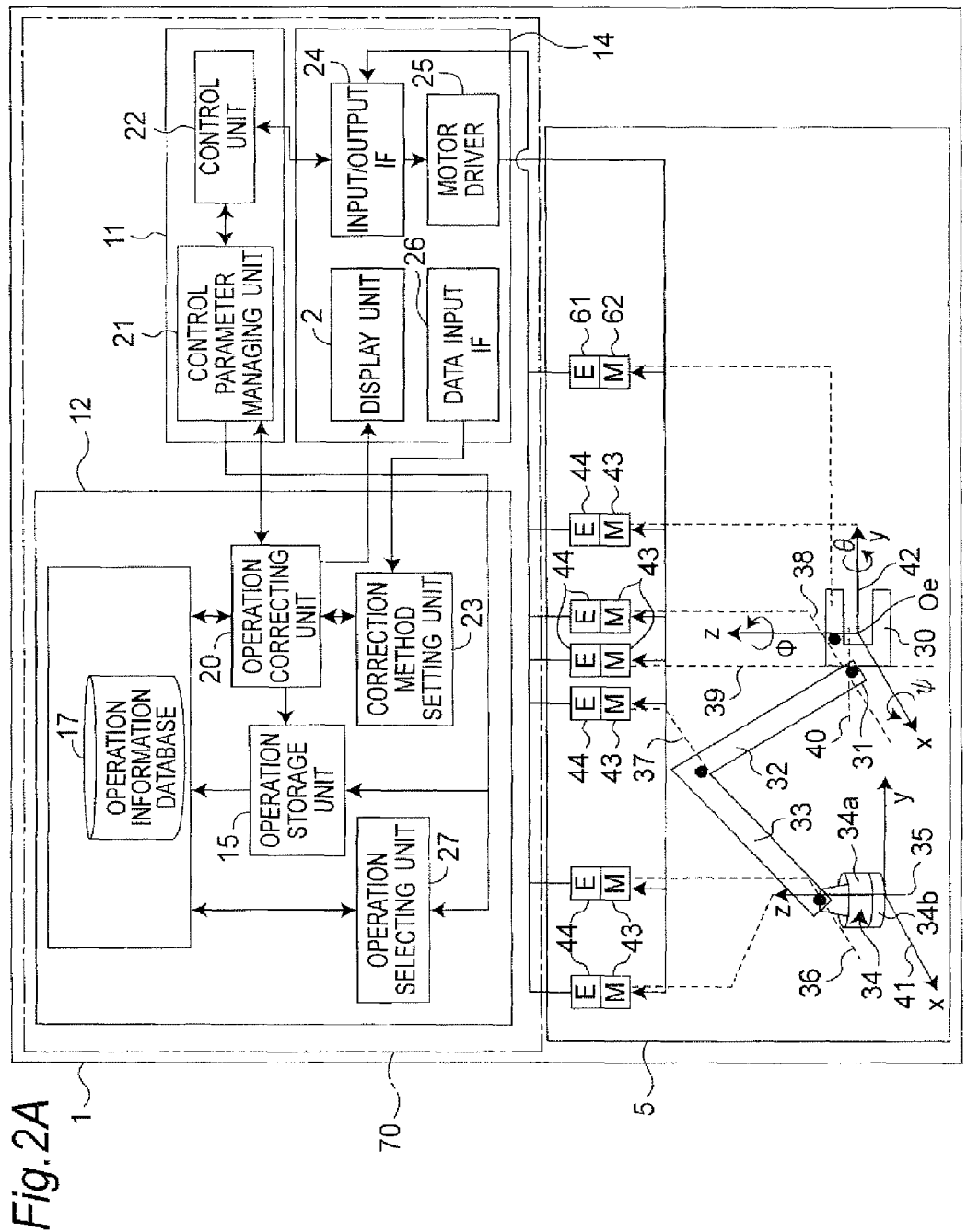
FIG. 2A is a view showing detailed structures of the control apparatus for a robot arm and the robot arm to be controlled that form the robot system in the first embodiment of the present invention.
Figure 2B:
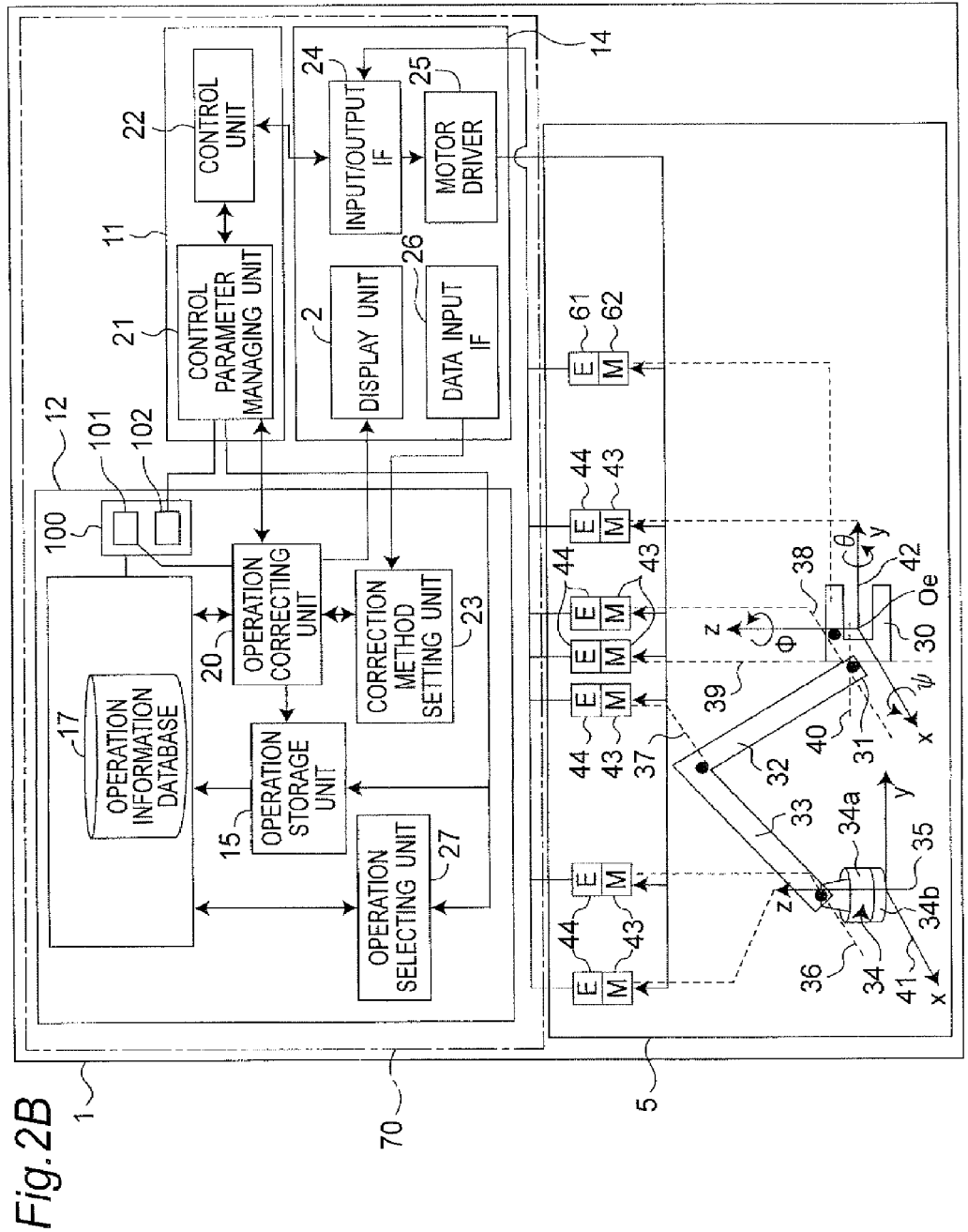
FIG. 2B is a view showing detailed structures of a control apparatus for a robot arm and the robot arm to be controlled that form a robot system in a modified example of the first embodiment of the present invention.

FIGS. 2A and 2B are views that show detailed structures of the robot arm 5 to be controlled and the control apparatus 70 for the robot arm 5 that form the robot system 1. As shown in detail in FIGS. 2A and 2B, the control apparatus 70 of the robot arm 5 is provided with a control apparatus main body unit 11, an operation generating device 12 for generating operations of the robot arm 5, and a peripheral apparatus 14.

For example, the control apparatus main body unit 11, the operation generating device 12 and the peripheral apparatus 14 are respectively constituted by generally-used personal computers.

The control apparatus main body unit 11 is designed to have a control parameter managing unit 21 and a control unit 22. Tip unit positions and information of force or the like of the robot arm 5 are inputted and outputted to and from each other between the control unit 22 and the control parameter managing unit 21.

The operation generating device 12 is designed to have an operation information database 17, an operation selecting unit 27, an operation correction unit 20, a correction method setting unit 23 and an operation storage unit 15. Between the operation correction unit 20 and the control parameter managing unit 21, tip unit positions and orientations of the robot arm 5, and information of a force applied by the person 4, operation instructions and the like are inputted and outputted to and from each other, and from the control parameter managing unit 21, the tip unit positions and orientations of the robot arm 5, the information of the force applied by the person 4 and the like are outputted to the operation storage unit 15, and the tip unit positions and orientations of the robot arm 5, the information of force applied by the person 4 and the like are outputted to the operation selecting unit 27.

The operation correction unit 20 shown in FIG. 2A has a function for acquiring operation information selected by the operation selecting unit 27 from the operation information database 17, as will be described later; however, the present invention is not limited thereto, and this function may be independently separated from the operation correction unit 20 to be prepared as a first information acquiring unit 101.

Moreover, the control parameter managing unit 21 shown in FIG. 2A has a function for acquiring pieces of operation information, such as the tip unit positions and orientations of the robot arm 5, information of the force applied by the person 4 and the like, as will be described later; however, the present invention is not limited thereto, and this function may be independently separated from the control parameter managing unit 21 to be prepared as a second information acquiring unit 102. In this case, in addition to a structure in which the first information acquiring unit 101 and the second information acquiring unit 102 are separately installed, the first information acquiring unit 101 and the second information acquiring unit 102 may be installed in a single information acquiring unit 100, as shown in FIG. 2B. The structure of FIG. 2B is only different from that of FIG. 2A in that the information acquiring function is prepared, and the functions thereof are the same; therefore, the following description will discuss the structure of FIG. 2A as a typical example.

The peripheral apparatus 14 is designed to have a data input IF (interface) 26, an input/output IF (interface) 24, a motor driver 25 and a display unit 2. Control information such as control signals is outputted from the control unit 22 to the input/output IF 24. Correcting information, such as a correcting parameter or the like stored in the operation information database 17, and an image, a photograph or a text corresponding to an operation ID are outputted from the operation correction unit 20 to the display unit 2 so that the image, photograph or text of the operation of the robot arm 5, described in the operation information, is displayed on the display unit 2.

The input/output IF 24 is designed to have, for example, a D/A board, an A/D board and a counter board that are connected to an expansion slot, such as a PCI bus of a personal computer. To the input/output IF 24, respective pieces of joint angle information outputted from encoders 44, which will be described later, of the respective joint portions of the robot arm 5, and angle information outputted from an encoder 61 of the hand 30 are inputted, and the input/output IF 24 inputs these to the control unit 22, while control information, such as control signals, is inputted to the input/output IF 24 from the control unit 22, and the input/output IF 24 outputs control information, such as a control instruction value, to the motor driver 25. The motor driver 25 outputs control information, such as control instruction values, to a motor 43 and a motor 62 of the hand 30, which will be described later, of each of the joint portions of the robot arm 5.

In order to control operations of the robot arm 5, respective operations of the operation generating device 12, the control apparatus main body unit 11 and the peripheral apparatus 14 are executed so that pieces of information of the respective joint angles, outputted from the encoders 44 to be described later of the respective joint portions of the robot arm 5, are acquired by the control apparatus main body unit 11 through counter boards of the input/output IF 24. Based upon the respective pieces of joint angle information thus acquired, the control apparatus main body unit 11 calculates control instruction values for rotating operations of the respective joint portions. The respective control instruction values, thus calculated, are given to the motor driver 25 used for drive-controlling the respective joint portions of the robot arm 5 through the D/A board of the input/output IF 24, and based upon the respective control instruction values sent from the motor driver 25, the motors 43 of the respective joint portions of the robot arm 5 are driven. Moreover, a hand driving motor 62, as one example of a hand driving device drive-controlled by the motor driver 25, and an encoder 61 used for detecting a rotation phase angle of a rotation axis of the hand driving motor 62 are further installed in the hand 30. The rotation angle information, detected by the encoder 61, is acquired by the control apparatus main body unit 11 through the counter board of the input/output IF 24, and based upon the rotation angle information thus acquired, control instruction values in open/close operations of the hand 30 are calculated by a hand control unit 54 (shown in FIG. 12) of the control unit 22 of the control apparatus main body unit 11. The control instruction values, thus calculated, are given to the motor driver 25 that also carries out open/close driving operations of the hand 30 through a D/A board of the input/output IF 24, and the rotations of the motor 62 are drive-controlled in accordance with the respective control instruction values sent from the motor driver 25 so that the rotation axis of the hand driving motor 62 is forwardly and reversely rotated to open and close the hand 30.

For example, the robot arm 5, which is a multi-joint robot arm serving as a multi-link manipulator having six degrees of freedom, is provided with the hand 30, a fore-arm link 32 with a wrist portion 31 to which the hand 30 is attached formed on its tip, an upper-arm link 33 having its tip rotatably coupled to the base end of the fore-arm link 32, and a base portion 34 to which the base end of the upper-arm link 33 is rotatably coupled and supported thereon. The base portion 34 is shiftably coupled to the rail 8; however, the base portion 34 may be secured to a fixed position. The wrist portion 31 has three rotation axes relating to a fourth joint portion 38, a fifth joint portion 39 and a sixth joint portion 40 so that the relative orientation (direction) of the hand 30 to the fore-arm link 32 can be changed. That is, in FIG. 2A, the fourth joint portion 38 makes it possible to change the relative orientation of the hand 30 to the wrist portion 31 around the lateral axis. The fifth joint portion 39 makes it possible to change the relative orientation of the hand 30 to the wrist portion 31 around the longitudinal axis that is orthogonal to the lateral axis of the fourth joint portion 38. The sixth joint portion 40 makes it possible to change the relative orientation of the hand 30 to the wrist portion 31 around the lateral axis that is respectively orthogonal to the lateral axis of the fourth joint portion 38 and the longitudinal axis of the fifth joint portion 39. The other end of the fore-arm link 32 is allowed to rotate around a third joint portion 37 relative to the tip of the upper-arm link 33, that is, around a lateral axis in parallel with the lateral axis of the fourth joint portion 38. The other end of the upper-arm link 33 is allowed to rotate around a second joint portion 36 relative to the base portion 34, that is, around a lateral axis in parallel with the lateral axis of the fourth joint portion 38. Moreover, an upper movable portion 34a of the base portion 34 is allowed to rotate around a first joint portion 35 relative to a lower-side fixed portion 34b of the base portion 34, that is, around a longitudinal axis in parallel with the longitudinal axis of the fifth joint portion 39.

As a result, the robot arm 5 is allowed to rotate around the total six axes to form the multi-link manipulator having six degrees of freedom.

Each of the joint portions forming the rotation portions of the respective axes is provided with a rotation driving device, such as a motor 43, and an encoder 44 used for detecting a rotation phase angle (that is, a joint angle) of the rotation axis of the motor 43 (which is actually installed in the inside of each of the joint portions of the robot arm 5). The motor 43 (which is actually installed in the inside of each of the joint portions of the robot arm 5) is drive-controlled by the motor driver 25, which will be described later, installed in one of paired members forming each of the joint portions (for example, a rotation-side member and a support-side member that supports the rotation-side member). The rotation axis of the motor 43 that is installed in one of the members of each joint portion is coupled to the other member of each joint portion, and the rotation axis is forwardly and reversely rotated so that the other member is allowed to rotate around each of the axes relative to the one of the members.

Reference numeral 41 represents an absolute coordinate system in which the relative positional relationship is secured to the lower-side securing unit 34b of the base portion 34, and 42 represents a tip-unit coordinate system in which the positional relationship is fixed relative to the hand 30. An origin position $O_e$ (x, y, z) of the tip-unit coordinate system 42 viewed from the absolute coordinate system 41 is defined as a tip unit position of the robot arm 5, and the orientation of the tip-unit coordinate system 42, viewed from the absolute coordinate system 41, is represented by coordinates ($\Phi$, $\theta$, $\phi$), using a roll angle, a pitch angle and a yaw angle, and defined as the tip-unit orientation of the robot arm 5, and the tip-unit position and orientation vectors are defined as vectors r=[x, y, z, $\Phi$, $\theta$, $\phi$]$^T$. Therefore, for example, the longitudinal axis of the first joint portion 35 is preferably set in parallel with the z-axis of the absolute coordinate system 41, and the lateral axis of the second joint portion 36 is preferably positioned in parallel with the x-axis. Moreover, preferably, the lateral axis of the sixth joint portion 40 can be positioned in parallel with the x-axis of the tip-unit coordinate system 42, the lateral axis of the fourth joint portion 38 can be positioned in parallel with the y-axis thereof, and the longitudinal axis of the fifth joint portion 39 can be positioned in parallel with the z-axis thereof. In this case, the rotation angle relative to the x-axis of the tip-unit coordinate system 42 is defined as the yaw angle $\phi$, the rotation angle relative to the y-axis thereof is defined as the pitch angle $\theta$, and the rotation angle relative to the z-axis thereof is defined as the roll angle $\Phi$. Upon controlling the tip position and orientation of the robot arm 5, the tip position and orientation vectors r are made to follow tip position and orientation target vectors $r_d$ generated in a target track generating unit 55, which will be described later.

Reference numeral 26 represents an input IF (interface) through which the person 4 inputs correction method setting information used for inputting or changing operation information or a type of parameter to be corrected, which will be described later, to a correction method setting unit 23, by using an input device, such as a keyboard or a mouse or a microphone. Moreover, the data input IF 26 may be designed to allow the correction method setting unit 23 to receive an instruction for starting and completing the controlling operation from the person 4, by using an input device, such as a button 13a on the operation panel 13 in FIG. 1. As the button 13a, for example, by using a toggle switch, the start of the controlling operation and the completion of the controlling operation may be respectively inputted by the single button, or a start button for the controlling operation and a completion button for the controlling operation may be prepared separately.

Reference numeral 2 represents a display unit that corresponds to a display device installed, for example, on a side surface of the robot arm 5 or the work bench 7, which displays operation information or a type of parameter to be corrected, which will be described later.

The operation information database 17 has information (operation information) relating to operations, such as the tip position and orientation of the robot arm 5 at a certain point of time, stored by the operation storage unit 15. Therefore, operation information is inputted and outputted to and from the operation information database 17 through the operation selecting unit 27, while operation information is also inputted and outputted to and from the operation information database 17 through the operation correction unit 20, so that various pieces of operation information are inputted thereto and stored therein by the operation storage unit 15.

The following description will discuss the operation information database 17 in detail.

In the operation information database 17, for example, pieces of information relating to operations of the robot arm 5, shown in FIG. 3, are stored by the operation storage unit 15. Specific examples of the pieces of information relating to the operations include job ID numbers used for identifying jobs (refer to a column of "job ID" in FIG. 3); operation ID numbers used for identifying individual operations in each job (refer to a column of "operation ID" in FIG. 3); information relating to the tip unit position and orientation of the robot arm 5 in the corresponding operation (refer to a column of "position-orientation" in FIG. 3); information relating to a flag indicating which piece of information, a tip-unit position parameter or an orientation parameter of the robot arm 5, is effective (refer to a column of "flag" in FIG. 3); information indicating a hand open/close state, that is, whether the hand 30 is opened or closed (refer to a column of "hand" in FIG. 3); information relating to periods of time during which the respective operations are carried out (refer to a column of "time" in FIG. 3); information relating to a type of a parameter to be corrected, upon correcting operation information of the operation information database 17 by the operation correction unit 20, which will be described later (refer to a column of "correction parameter" in FIG. 3); and progress information indicating whether or not the operation of the robot arm 5 selected by the operation selecting unit 27 to be described later is being currently executed (refer to a column of "progress information" in FIG. 3). In this case, the job ID is a code used for identifying information relating to the corresponding job, and the operation ID is a code used for identifying information relating to the corresponding operation.

The "position-orientation" in the operation information database 17 of FIG. 3, that is, the information relating to the tip unit position and orientation, represents the tip unit position and orientation of the robot arm 5, and is indicated by (x, y, z, $\Phi$, $\theta$, $\phi$) based upon the coordinates of the origin position $O_e$ and the orientation.

The information relating to "flag" of the operation information database of FIG. 3 gives a value that indicates which piece of information, the tip-unit position or the orientation of the robot arm 5 based upon the operation information given by the respective "operation IDs", is valid, and, more specifically, is indicated by a numeric value of 32 bits, shown in FIG. 4. In FIG. 4, in the case where the respective values of the tip unit position and orientation are valid in the respective bits, "1" is given to the bits, while in the case where the respective values of the tip unit position and orientation are invalid, "0" is given thereto. For example, in the 0th bit, when the value of the x-coordinate of the tip-unit position of the robot arm 5 is valid, "1" is given thereto, while when the value of the x-coordinate of the tip-unit position is invalid, "0" is given thereto; in the 1st bit, when the value of the y-coordinate of the tip-unit position of the robot arm 5 is valid, "1" is given thereto, while when the value of the y-coordinate of the tip-unit position is invalid, "0" is given thereto; in the 2nd bit, when the value of the z-coordinate of the tip-unit position of the robot arm 5 is valid, "1" is given thereto, while when the value of the z-coordinate of the tip-unit position is invalid, "0" is given thereto; and successively, in the 3rd, 4th and 5th bits, the validity of each of parameters $\Phi$, $\theta$, $\phi$ of the orientation is indicated (that is, "1" is given thereto when it is valid, while "0" is given thereto when it is invalid). Moreover, with respect to the information relating to "flag", since more bits (32 bits) are prepared for expansion in the future, bits from the 7th bit to the 31st bit are not used so that "0" is given to each of the bits in this example. However, the flag may be prepared as a variable having only the 6 bits to be stored. In FIG. 4, of the operation information, since bits from the 0th bit to the 2nd bit are "1", it is indicated that only pieces of information x, y, z are valid, and since bits from the 3rd bit to 5th bit are "0", it is indicated that whatever value is stored as each of values of $\Phi$, $\theta$, $\phi$, it is invalid.

With respect to the information relating to "hand" as to whether the hand 30 is opened or closed in the operation information database 17 in FIG. 3, "flag" is given to show the open/close state of the hand 30 during operations of the robot arm 5, and "0" is given thereto when the hand 30 is opened and "1" is given thereto when the hand 30 is closed.

Information relating to "time" in the operation information database 17 in FIG. 3 indicates a period of time during which each of the operations of the robot arm 5 is executed, and it is indicated that each of the operations stored in "operation ID" is carried out in a period of time stored as the information relating to "time". That is, "time" represents not the absolute time, but the relative time from the previous operation. In other words, it represents time required for the hand 30 of the robot arm 5 to move to the position and orientation indicated by "operation ID".

Information relating to "correction parameter flag" in the operation information database 17 in FIG. 3 indicates which parameter should be corrected in the operation correction unit 20, which will be described later. More specifically, the information is given by a numeric value of 32 bits shown in FIG. 5. In FIG. 5, in the case where the respective values of the tip unit position and orientation can be corrected in the respective bits, "1" is given to the bits, while in the case where the respective values of the tip unit position and orientation are not correctable, "0" is given thereto. For example, in the 0th bit, when the value of the x-coordinate of the tip-unit position is correctable, "1" is given thereto, while when the value of the x-coordinate of the tip-unit position is not correctable, "0" is given thereto; in the 1st bit, when the value of the y-coordinate of the tip-unit position is correctable, "1" is given thereto, while when the value of the y-coordinate of the tip-unit position is not correctable, "0" is given thereto; in the 2nd bit, when the value of the z-coordinate of the tip-unit position is correctable, "1" is given thereto, while when the value of the z-coordinate of the tip-unit position is not correctable, "0" is given thereto; and successively, in the 3rd, 4th and 5th bits, the correctablity of each of parameters $\Phi$, $\theta$, $\phi$ of the orientation is indicated (that is, "1" is given thereto when it is correctable, while "0" is given thereto when it is not correctable). Moreover, with respect to the correction parameter flag, only the parameter whose "flag" in the operation information database 17 is valid is regarded as valid, and with respect to those parameters whose "flags" in the operation information database are invalid, that is, those parameters having "0" set in their flags, in the case where "1" is set in the correction parameter flag, this state is regarded as "0" being set therein. Moreover, since more bits (32 bits) are prepared as the correction parameter flag for expansion in the future, bits from the 7th bit to the 31st bit are not used so that "0" is given to each of the bits in this example; however, the flag may be prepared as a variable having only the 6 bits to be stored.

"Progress information" corresponds to information flag indicating whether or not the operation of the robot arm 5 is being currently executed, and in the case where the corresponding operation is being currently executed, "1" is stored in the operation information database 17 by the operation storage unit 15, while in the case where the corresponding operation is not being currently executed, "0" is stored therein by the operation storage unit 15. More specifically, in order to allow the robot arm 5 to execute a desired operation of the robot arm 5 to be selected, the person 4 selects a desired job to be executed, by using the operation selecting unit 27 based upon information stored in the operation information database 17 by the operation storage unit 15. When the selected job is started, of the respective operations of the job, "1" is stored in the operation information database 17 by the operation storage unit 15, with respect to the operation that is being currently executed, and "0" is stored in the operation information database 17 by the operation storage unit 15, with respect to the operation that is not being currently executed.

Reference numeral 27 in FIG. 2A represents the operation selecting unit, and upon application of a force to the robot arm 5 by the person, based upon the tip unit position and the corresponding point of time of the robot arm 5, this unit is designed to select an operation that the person 4 tries to make the robot arm 5 execute from the operations in the operation control database 17, by extracting an operation that is coincident with the tip unit position and the corresponding point of time of the robot arm 5 or a similar operation thereto (although not completely coincident therewith, an operation that has a difference therebetween within a permissible range) among the operations stored in the operation control database 17. For this reason, to the operation selecting unit 27, the tip unit position and orientation of the robot arm 5, information relating to a force applied by the person 4 and the like are inputted from the control parameter managing unit 21, and the operation selecting unit 27 outputs and receives the information of the tip unit position and orientation of the robot arm 5 or the like to and from the operation control database 17. From the job list of the operation information database 17, a job including the selected operation is selected by the operation selecting unit 27 so that, among the selected jobs, "1" is given to "progress information" relating to the "operation ID" relating to the operation currently being executed by the operation selecting unit 27, while, with respect to the "operation IDs" relating to operations other than the corresponding operation, "0" is set thereto by the operation selecting unit 27. More specifically, the movement the person 4 wishes to be carried out is executed by directly grabbing the robot arm 5 and allowing the robot arm 5 to move correspondingly, and at this time, as shown in FIG. 6, the tip unit position and the corresponding point of time of the robot arm 5 upon application of a force to the robot arm 5 by the person 4 are stored in the operation information database 17 by the operation storage unit 15, in association with each other. Next, pieces of information relating to the tip unit position and orientation of the robot arm 5 that have been preliminarily stored in the operation information database 17, and are related to all the operations of the robot arm 5, and pieces information of the tip unit position and orientation of the robot arm 5 stored in the operation information database 17 as shown in FIG. 6 upon application of a force by the person 4 are compared with each other respectively in a time-sequential manner, by the operation selecting unit 27, and in the case where the pieces of information of the tip unit position and orientation of the robot arm 5 upon application of a force by the person 4 have a difference from pieces of information of the tip unit position and orientation of the robot arm 5 relating to a certain operation of the robot arm 5, preliminarily stored in the operation information database 17, within a certain preliminarily set error range, the operation selecting unit 27 determines that the two are coincident with each other, and the operation selecting unit 27 selects the job constituted by the operation that has been determined as being coincident, as a job that the person 4 wishes the robot arm 5 to execute. In contrast, in the case where the operation selecting unit 27 determines that no coincidence is found, the operation selecting unit 27 selects a default jot (for example, a job having "1" in its number of "job ID". All the operations of the job of "job IDs" selected by the operation selecting unit 27 are executed in succession from the smaller number in the numbers of "operation IDs", and when the operation of the last number has been executed, the process returns to the operation of the leading "operation ID" of the "operation IDs" so that the sequence of operations are executed repeatedly.

Figure 7:
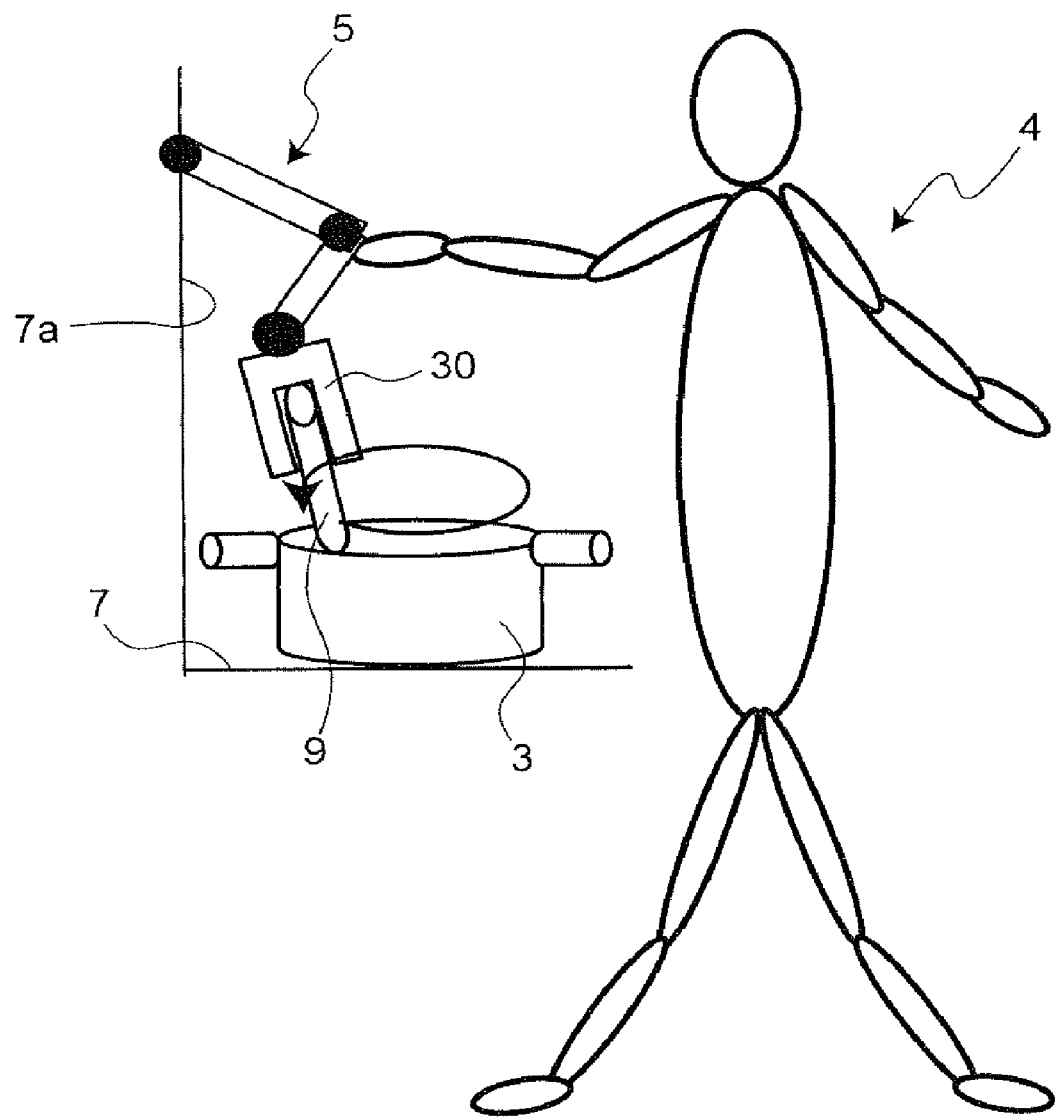
FIG. 7 is an explanatory view illustrating an operating state of the control apparatus for a robot arm and a manipulating state by a person in the first embodiment of the present invention.

Pieces of information of the position, orientation and time in the operation information database 17 are formed through processes in which, for example, as shown in FIG. 7, the person 4 directly grabs the robot arm 5, and the robot arm 5 is moved by the person 4 in an impedance control mode, which will be described later, so that during its movement, pieces of information of the tip unit position and orientation of the robot arm 5 are acquired every certain period of time (for example, every 0.2 msec) so that these pieces of information are stored in the operation information database 17 by the operation storage unit 15 in association with time.

Reference numeral 23 represents a correcting method setting unit, which sets a method for correcting operation information of the robot arm 5 by the operation correction unit 20, which will be described later. To the correcting method setting unit 23, setting information of the correcting method or the like is inputted from the data input IF 26 so that information relating to the presence or absence of correction (for example, flag relating to the presence or absence of correction) is inputted or outputted to or from each other, between the operation correction unit 20 and the correcting method setting unit 23. Correcting information relating to the operation information, such as correction parameters, is outputted to the display unit 2 from the operation correction unit 20. More specifically, upon application of a force by the person 4 to the robot arm 5, information relating to the presence or absence of correction, that is, as to whether or not the operation of the robot arm 5 is corrected (for example, flag relating to the presence or absence of correction), is set by the correction method setting unit 23 through the data input IF 26. That is, in the case where a correction is made, the flag relating to the presence or absence of correction is set to "1" by the correction method setting unit 23, while in the case where no correction is made, the flag relating to the presence or absence of correction is set to "0" thereby. With this setting, even in the case where the person 4 erroneously applies a force to the robot arm 5 during the operation of the robot arm 5, since the flag relating to the presence or absence of correction is set to "0" by the correction method setting unit 23, the operation of the robot arm 5 is not corrected erroneously when the robot arm 5 is operated in a position control mode, which will be described later, and the operation of the robot arm 5 can be continued properly.

With respect to the respective settings, the person 4 may directly input pieces of setting information, such as information relating to the presence or absence of correction, like the flag relating to the presence or absence of correction, through the data input IF 26, or the manufacturer or the like may preliminarily set the information relating to the presence or absence of correction, like the flag relating to the presence or absence of correction, upon shipment of the robot system.

Reference numeral 20 represents the operation correction unit, and the operation correction unit 20 has a function for correcting the operation information of the robot arm 5 in the operation information database 17, by allowing the person 4 to apply a force to the robot arm 5 during an operation of the robot arm 5, in a position control mode, which will be described later, based upon the pieces of information relating to the position, orientation and time in the operation information database 17.

The following description will discuss functions of the operation correction unit 20.

As described earlier, the person 4 selects a job that is desirably executed by the robot arm 5 among "operation IDs" of the operation information database 17 by the operation selecting unit 27, and gives an instruction for starting the operation through the operation correction unit 20. That is, the operation correction unit 20 gives an instruction to the control parameter managing unit 21 to be described later so as to operate the operation information (more specifically, the information of position, the information of orientation and the information of time) of the job of the "job ID" selected from the operation information database 17 in a position control mode, which will be described later. When, upon receipt of the instruction from the operation correction unit 20, the control parameter managing unit 21 gives an instruction to the control unit 22 so as to carry out a stirring operation in the position control mode, the robot arm 5 starts the stirring operation as shown in FIG. 8(a), under the control of the control unit 22.

The following description will discuss a correcting operation by exemplifying a state in which, in the case where the operation of the robot arm 5 is corrected, when the stirring operation is being carried out in a portion on the upper side of the pot 3 by using the robot arm 5, the person 4 confirms the state of cooking materials in the pot 3, and wants to stir a portion on the bottom side in the pot 3 in a manner so as to rub the bottom of the pot 3 slightly, as shown in FIG. 8(c).

The person 4 changes the flag relating to the presence or absence of correction concerning the corresponding operation from "0" to "1", in the operation information database 17, by using the correction method setting unit 23 through the data input IF 26, by inputting information relating to the presence of correction thereto through a keyboard or the like.

Next, upon receipt of the information of the flag "1" relating to the presence or absence of correction outputted from the correction method setting unit 23, the operation correction unit 20 gives an instruction to the control parameter managing unit 21 so as to carry out an operation in a hybrid impedance control mode, which will be described later (a mode in which, while being moved in the position control mode, a shift is made in the impedance control in a direction of the human force detected by a force detection unit 53). Upon receipt of the instruction for the operation in the hybrid impedance control mode from the control parameter managing unit 21, the control unit 22 allows a control instruction value to be inputted to the motors 43 and 62 from the motor driver 25 through the input/output IF 24 so that the robot arm 5 starts an operation in the hybrid impedance control mode.

Next, in order to correct the operation of the robot arm 5, when the person 4 directly grabs the robot arm 5, and applies a force to the robot arm 5 in a downward direction, as shown in FIG. 8(b), so as to carry out not an operation for stirring a portion in the upper side of the pot 3 by the ladle 9 grabbed by the hand 30 of the robot arm 5, but an operation for stirring a portion in the bottom side of the pot 3 by the ladle 9, the force detection unit 53, which will be described later, detects the force of the person 4, by the hybrid impedance control mode, while the robot arm 5 is being operated in the position control mode, so that the robot arm 5 is moved in the direction of the applied force to the robot arm 5 by the person 4, that is, in the z-axis direction in the impedance control; thus, the stirring operation can be corrected as shown in FIG. 8(c).

In this example, since the operation of the robot arm 5 is desirably corrected only in the z-axis direction, by outputting such an instruction as to set only the 2nd bit of the correction parameter flag stored in the operation information database 17 and shown in FIG. 5 to "1" to the control parameter managing unit 21 from the operation correction unit 20 through the data input IF 26 and the correction method setting unit 23, the robot arm 5 can be set by the impedance control so as to move only in the z-axis direction.

As described above, in the case where the person 4 grabs the robot arm 5, and applies a force in a downward direction to the robot arm 5 so that the robot arm 5 is moved in the z-axis direction by a value corresponding to $\Delta z$, the value of $\Delta z$ is transmitted to the operation correction unit 20 through the control unit 22 and the control parameter managing unit 21 as a correction value in the z-axis direction. In the case where the flag relating to the presence or absence of correction inputted to the operation correction unit 20 from the correction method setting unit 23 is "1", the operation correction unit 20 subtracts $\Delta z$ from each of the values in the z-coordinate of the operation information of the job of the selected "job ID", and the operation information thus corrected is transmitted to the control parameter managing unit 21 from the operation correction unit 20. The control parameter managing unit 21 gives an instruction to the control unit 22 so that an operation is carried out by using coordinates corrected by a value corresponding to $\Delta z$. Thus, the operation is corrected to a bottom stirring operation of the pot 3 as shown in FIG. 8(c). Next, the operation information subtracted by the value corresponding to $\Delta z$ is sent to the operation storage unit 15 to be described later, from the operation correction unit 20, and stored in the operation information database 17 by the operation storage unit 15.

As described above, with the operation being executed in the position control mode, the operation correction unit 20 switches the mode to the hybrid impedance control mode, based upon the information of the position, orientation and time in the operation information database 17, so that, by allowing the person 4 to apply a force to the robot arm 5, the previously given position and orientation can be corrected in the respective directions separately (for example, in three directions that are orthogonal to one another (for example, x-, y-, and z-axis directions) separately).

Figure 9:
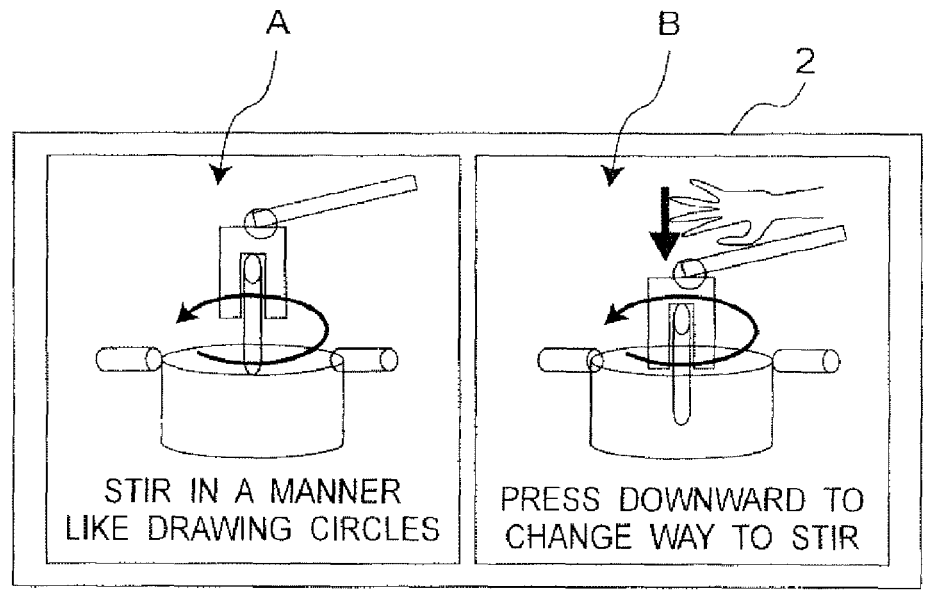
FIG. 9 is a view illustrating a display unit of a peripheral apparatus of the robot system in the first embodiment of the present invention.

Moreover, the display unit 2 provides images on two divided right and left screens of the display unit 2, as shown in A and B of FIG. 9, and an image, or a photograph, or a text of the operation of the robot arm 5 described in the operation information is displayed on the screen on the left side (see A in FIG. 9). Moreover, on the screen on the right side (see B in FIG. 9), an image, or a photograph, or a text is displayed so as to show which parameter can be corrected. In this example, since the robot arm 5 is set by the correction parameter flag so as to move only in the z-axis direction, an image or a photograph showing a state in which a force is applied to the robot arm 5 by the hand from above to correct the operation of the robot arm 5 is displayed. Moreover, when the job is switched by the operation selecting unit 27, the display unit 2 switches the contents to be displayed, in response to the switched job. Note that, in this example, an image, or a photograph, or a text is displayed; however, a voice or the like that describes the operation may be used.

Figure 10:
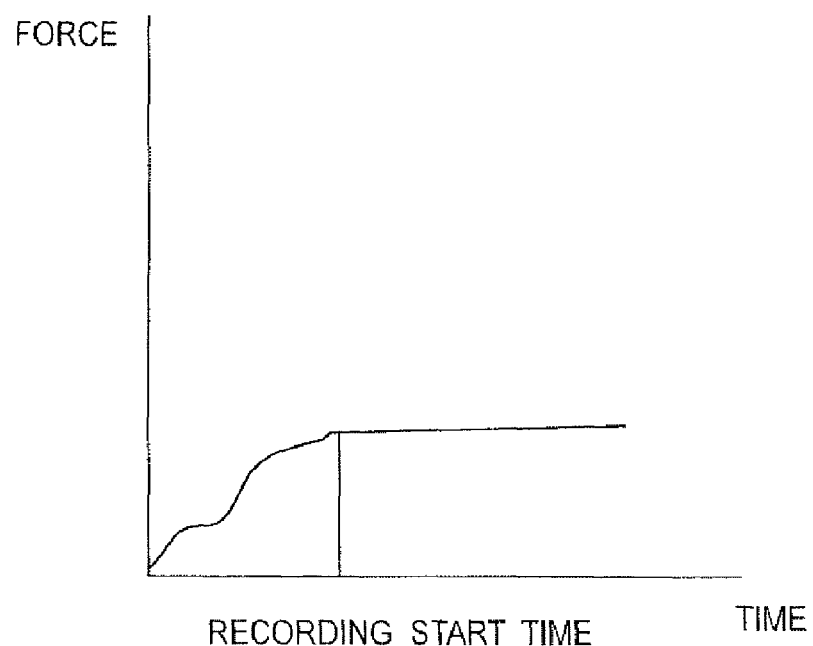
FIG. 10 is a graph showing a relationship between a force applied by the person and applied time of the force in the first embodiment.

Reference numeral 15 represents the operation storage unit that stores correction operation information in the operation information database 17. To the operation storage unit 15, the correction operation information is inputted from the operation correction unit 20, and pieces of information of the tip unit position and orientation of the robot arm 5 and a force applied by the person 4 are also inputted from the control parameter managing unit 21. As described earlier, the operation correction unit 20 allows the person 4 to grab the robot arm 5 and apply a force to the robot arm 5 so that the operation of the robot arm 5 is corrected; however, a certain fixed period of time is required from the start of the application of a force by the person 4 to the robot arm 5 until the operation of the robot arm 5 is stabilized. For this reason, the operation storage unit 15 stores operations of the robot arm 5 from a point of time after a lapse of certain fixed period of time (for example, after 3 seconds) (this time is referred to as "storage starting time") from the start of the power application by the person 4 to the robot arm 5 until the flag relating to the presence or absence of correction to be inputted from the correction method setting unit 23 to the operation storage unit 15 is switched to "0", or until, under the application of the force to the robot arm 5 by the person 4, the value of the force detected by the force detection unit 53 has become a threshold value or less. The storage starting time may be a constant value, or may be prepared as a point of time at which, in a graph on which the force applied to the robot arm 5 by the person 4 is plotted on the axis of ordinates, with time being plotted on the axis of abscissas, as shown in FIG. 10, the force being applied to the robot arm 5 by the person 4 becomes constant.

The following description will discuss the control parameter managing unit 21 in detail.

The control parameter managing unit 21 carries out a setting by which operation modes of the robot arm 5 are switched among three modes, that is, a position control mode, an impedance control mode and a hybrid impedance control mode, a setting of mechanical impedance setting values at the time of the impedance control mode as well as at the time of the hybrid impedance control mode, a setting of the tip unit position and the orientation target correcting output $r_{d\Delta}$ to be outputted by the hybrid impedance calculation unit 51, which will be described later, and a setting of operation information to be sent to the target track generating unit 55. Moreover, the tip-unit position and force information of the robot arm 5, inputted from the control unit 22 to the control parameter managing unit 21 and the like, are transferred from the control parameter managing unit 21 to the operation correction unit 20.

The position control mode is a mode in which the robot arm 5 is operated based upon the tip unit position and the orientation target vector instruction of the target track generation unit 55, which will be described later, more specifically, a mode in which the robot arm 5 is operated during a job such as a stirring job or a wiping job.

The impedance control mode corresponds to a mode in which the robot arm 5 is operated in response to a force that is detected by the force detection unit 53 and applied to the robot arm 5 by the person 4, and, for example, as shown in FIG. 7, in this mode, the person 4 directly holds the robot arm 5, and directs the robot arm 5 to a work place so that the robot arm 5 is operated.

The hybrid impedance control mode is a mode in which, while the robot arm 5 is being operated in the position control mode, a force applied to the robot arm 5 from the person 4 or the like is detected by the force detection unit 53 so that the robot arm 5 is operated in response to the force detected by the force detection unit 53, and in this mode, when, for example, during a job such as a stirring job, the person 4 directly holds the robot arm 5 and corrects the operation of the robot arm 5, the robot arm 5 is operated correspondingly.

Figure 8:
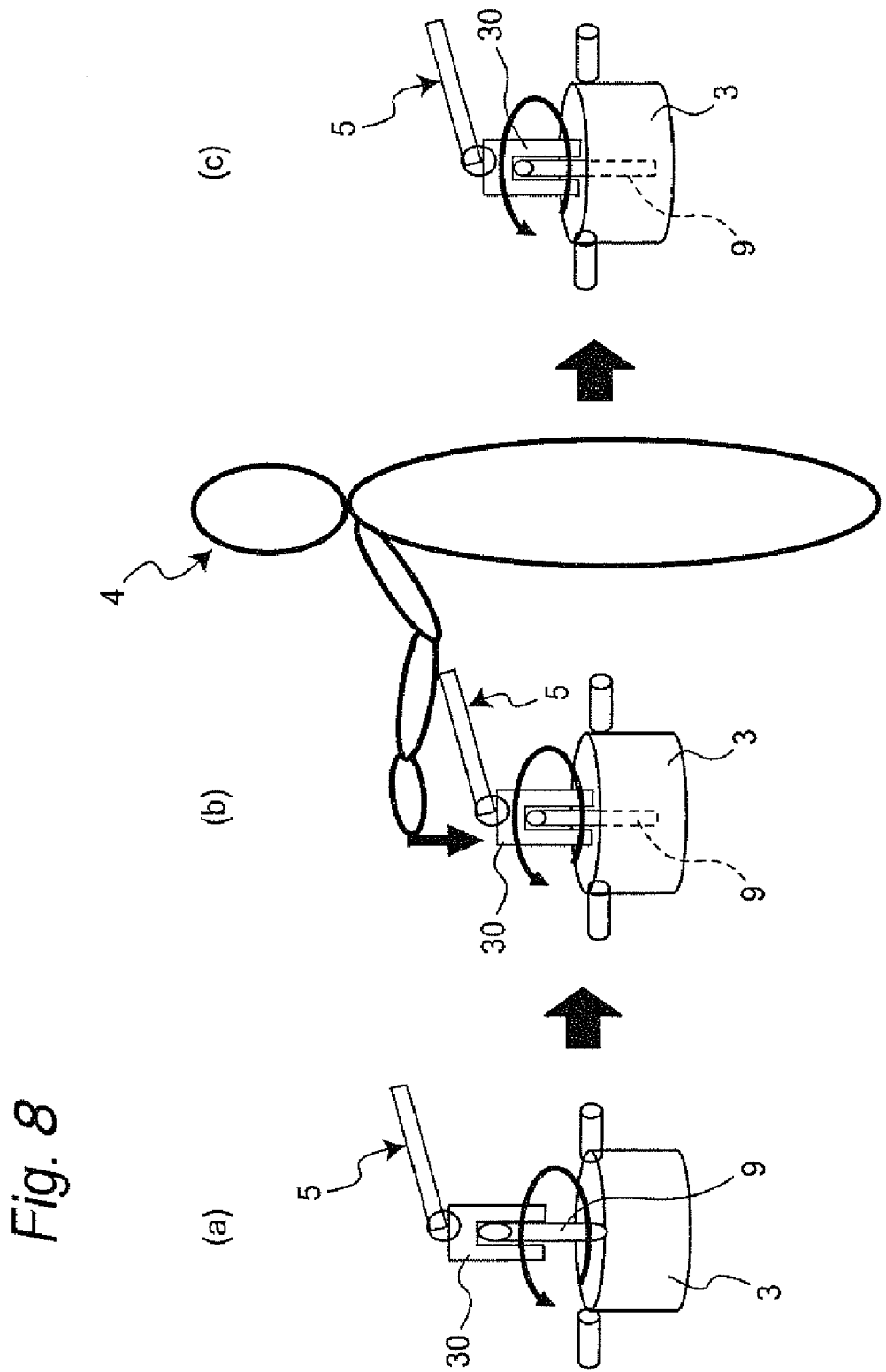
FIG. 8 is an explanatory view including (a) to (c) views respectively illustrating an operating state, a manipulating state, and an operating state of the control apparatus for a robot arm in the first embodiment of the present invention.

For example, in the case where, while the robot arm 5 is carrying out a stirring job as shown in FIG. 8(*a*), the person 4 confirms the state of cooking materials in the pot 3, and wants to correct the operation of the robot arm 5 so as to stir a portion on the bottom side in the pot 3, the control parameter managing unit 21 outputs an instruction for switching the modes from the position control mode to the hybrid impedance control mode from the operation correction unit 20 to the control unit 22.

As a result, while the stirring job is being carried out in the position control mode, the person 4 grabs the robot arm 5, and applies a force to the robot arm 5 in a downward direction in the hybrid impedance control mode, as shown in FIG. 8(*b*); thus, the correction is made in such a manner that, with the inside of the pot 3 being stirred in the position control mode, the stirring operation is also carried out on the portion on the bottom side in the pot 3, as shown in FIG. 8(*c*).

Moreover, while the robot arm 5 is being operated in the hybrid impedance control mode, the person 4 alters the settings of the mechanical impedance parameter or the target correcting output $r_{d\Delta}$ of the tip unit position and orientation to be outputted by the impedance calculation unit 51, in accordance of the parameter to be corrected.

The setting parameters of the mechanical impedance set values include inertia M, viscosity D and rigidity K. The respective parameters of the mechanical impedance set values are determined based upon the following evaluation equations, by using correction values.

[Equation 1]

$$M = KM \times \text{(correction value)} \qquad \text{Equation (3)}$$

[Equation 2]

$$D = KD \times \text{(correction value)} \qquad \text{Equation (4)}$$

[Equation 3]

$$K = KK \times \text{(correction value)} \qquad \text{Equation (5)}$$

In the above-mentioned equations (3) to (5), KM, KD, and KK are gains, and correspond to certain constant values respectively.

The control parameter managing unit 21 outputs the inertia M, viscosity D and rigidity K, that is, the mechanical impedance parameters calculated based upon the equations (3) to (5), to the control unit 22.

As shown in the equations (3) to (5), for example, as shown in FIG. 8(*b*), in the case where, with respect to the stirring operation in an upper portion of the pot 3 being carried out by using the ladle 9 grabbed by the hand 30 of the robot arm 5, the person 4 attempts to correct the operation of the robot arm 5 so as to stir a portion on the bottom side in the pot 3, if the positional components and the orientation components of the axes other than the z-axis of the robot arm 5 are easily moved, it becomes difficult to carry out the correcting process on the operation of the robot arm 5. Therefore, by allowing the control parameter managing unit 21 to set the correction value higher only with respect to the positional components and orientation components of the axes other than the z-axis (more specifically, for example, to about 10 times as high as the correction value), the viscosity D and rigidity K of the robot arm 5 are set to be greater; thus, the movements of the robot arm 5 become resistant or rigid so that the robot arm 5 is hard to move.

Alternatively, another method is proposed in which among the respective components of the target correcting output $r_{d\Delta}$ of the tip unit position and orientation to be outputted by the impedance calculation unit 51, all the values except for the value of the z-axis are set to 0. With this arrangement, since no movement is carried out by the force of the person 4 except for in the z-axis direction, it becomes possible to prevent an erroneous manipulation.

Moreover, as described earlier, it is necessary to transfer pieces of information relating to the tip unit position and orientation of the robot arm 5, as well as the force applied by the person 4, from the control parameter managing unit 21 to the operation selecting unit 27, the operation storage unit 15 and the operation correction unit 20. For this reason, upon receipt of the information of the tip-unit position of the robot arm 5 and the force by the control parameter managing unit 21 from the control unit 22, the control parameter managing unit 21 informs the operation selecting unit 27, the operation storage unit 15 and the operation correction unit 20 of these pieces of information. Moreover, the control parameter managing unit 21 informs the control unit 22 of pieces of operation information, such as the position, orientation and time, which have been inputted to the control parameter managing unit 21 from the operation correction unit 20.

Figure 11:
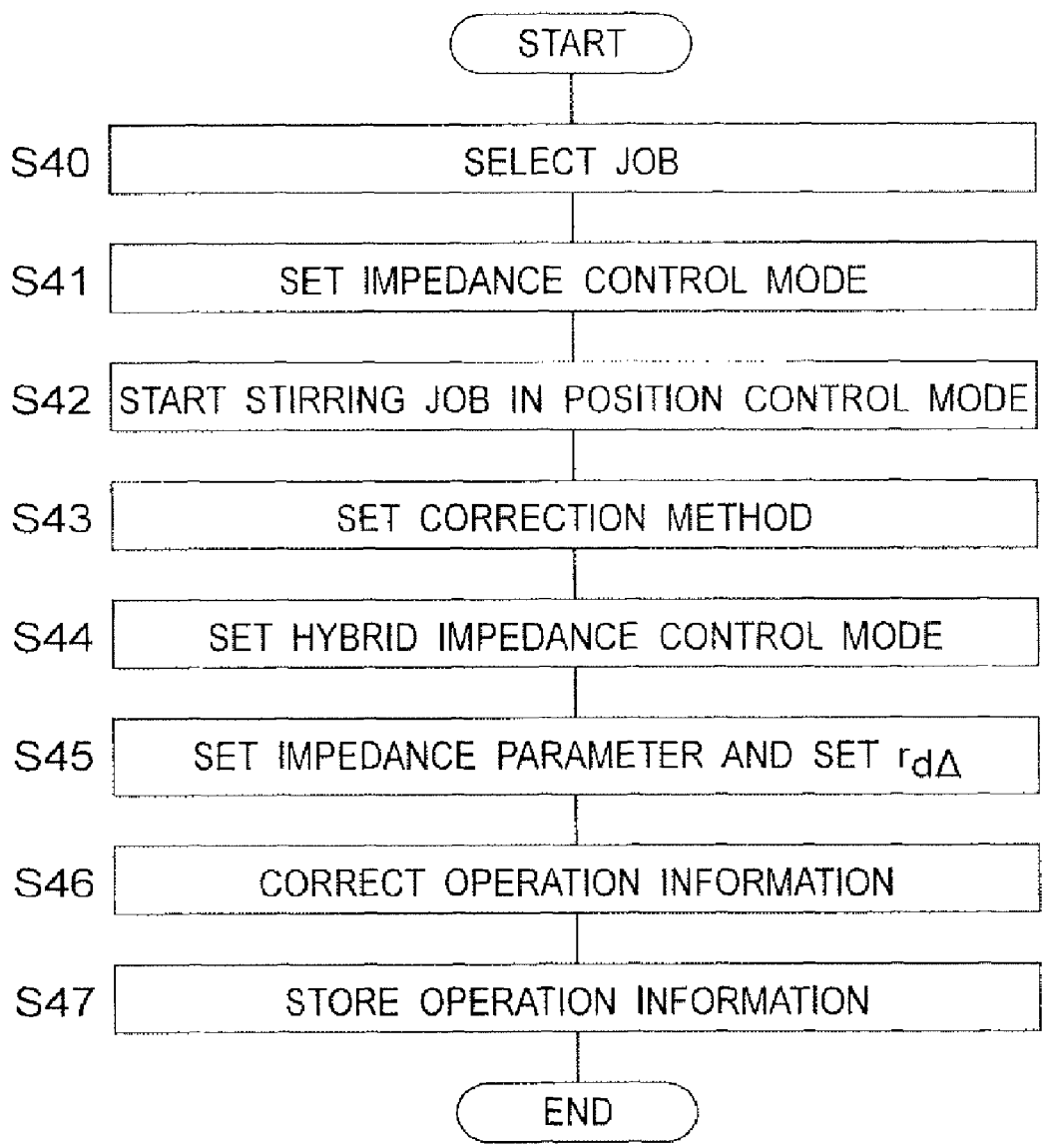
FIG. 11 is a flow chart showing operation steps relating to an operation correction unit, an operation selecting unit, a correction method setting unit, an operation storage unit, an operation information database, and a control parameter managing unit of the control apparatus for a robot arm in the first embodiment of the present invention.

Referring to a flow chart shown in FIG. 11, the following description will discuss operation steps of the above-mentioned operation correction unit 20, operation selecting unit 27, correction method setting unit 23, operation storage unit 15, operation information database 17 and control parameter managing unit 21.

First, the person 4 actually grabs the robot arm 5, and by moving the robot arm 5, the person 4 allows the robot arm 5 to carry out the operation of a stirring job. Then, the information of the tip unit position and orientation of the robot arm 5 at that time is stored in the operation information database 17 by the operation storage unit 15. Next, the operation selecting unit 27 compares the information of the tip unit position and orientation of the robot arm 5 stored in the operation information database 17 at this time with the information of the tip unit position and orientation of the robot arm 5 in each of the operations of jobs preliminarily stored in the operation information database 17, and selects an operation that is coincident therewith, or an operation that relates to information similar to the information of the tip unit position and orientation of the robot arm 5 within a permissible range. Moreover, a job that includes the operation is selected from the list of jobs preliminarily stored in the operation information database 17 by the operation selecting unit 27, and the current job is set in the progress information of the operation information database 17 by the operation selecting unit 27 (step S40). In the list of the jobs, for example, a plurality of stirring jobs (more specifically, a fast stirring job, a slow stirring job, a stirring job carried out in the same rotation direction, a stirring job carried out in both of forward and reverse rotation directions, and the like) are listed, and the coincident job may be selected therefrom, and in addition, different kinds of jobs, such as a stirring job and a wiping job, are included in the list of jobs, and the coincident job may be selected therefrom.

Next, when the current job has been set in the progress information of the operation information database 17, the operation correction unit 20 gives an operation instruction to the control parameter managing unit 21 to set the impedance control mode so that the robot arm 5 is operated in the impedance control mode, and the person 4 directs the robot arm 5 near the pot 3, while grabbing the robot arm 5 (step S41), and gives an instruction for starting the stirring job to the correction method setting unit 23 through the data input IF 26. The instruction is further sent from the correction method setting unit 23 to the control unit 22 through the control parameter managing unit 21.

When informed of the instruction for starting the stirring job that has been inputted to the control parameter managing unit 21 from the correction method setting unit 23, the control unit 22 starts the stirring operation in the position control mode (step S42).

Next, the correction method setting unit 23 sets the correction method. More specifically, by setting the flag information relating to the presence or absence of correction from "0" to "1" in the operation information database 17 through the input IF 26 and the correction method setting unit 23, the setting for starting the correction or the like is made by the correction method setting unit 23 (step S43). In the case of setting of the presence of correction (when the flag information relating to the presence or absence of correction is set from "0" to "1"), the operation correction unit 20 receives information of the flag "1" relating to the presence or absence of correction outputted from the correction method setting unit 23, and gives an instruction to the control parameter managing unit 21 so as to carry out operations in the hybrid impedance mode so that the hybrid impedance mode is set (step S44). The control unit 22 receives the operation instruction for the hybrid impedance control mode from the control parameter managing unit 21, and allows the motor driver 25 to input a control instruction value to the motors 43 and 62 through the input/output IF 24 so that the robot arm 5 starts an operation in the hybrid impedance control mode. In the case of setting of the absence of correction (in the case where the flag relating to the presence or absence of correction is not altered and left as "0", or where the flag relating to the presence or absence of correction is set from "1" to "0"), the operation correction unit 20 gives an instruction to the control parameter managing unit 21 so as to carry out operations in the position control mode so that the position control mode is set, and thereafter, the robot arm 5 is operated without correction, in the position control mode.

Next, in accordance with the correction parameter, a setting of the impedance parameter or the tip unit position and orientation target correcting output $r_{d\Delta}$ to be outputted by the impedance calculation unit 51 is carried out in order to regulate the operation in the impedance control mode at the time of the hybrid impedance control mode (step S45). As described earlier, the setting of the impedance parameter is carried out by inputting such an instruction as to set the correction parameter flag to be desirably corrected to "1" to the control parameter managing unit 21 from the operation correction unit 20 through the data input IF 26 and the correction method setting unit 23. Moreover, upon setting the tip unit position and orientation target correcting output $r_{d\Delta}$ to be outputted by the impedance calculation unit 51, as will be described later, in accordance with the correcting parameter inputted from the control parameter managing unit 21 to the impedance calculation unit 51, the setting of the tip unit position and orientation target correcting output $r_{d\Delta}$ to be outputted from the impedance calculation unit 51 to the positional error calculation unit 80 is altered.

Next, when the person 4 grabs the robot arm 5 and applies a force to the robot arm 5 in a direction to be desirably corrected, the operation correction unit 20 corrects the operation information of the operation information database 17 (step S46).

Next, the operation information corrected by the operation correction unit 20 is stored in the operation information database 17 by the operation storage unit 15 (step S47).

Figure 12:
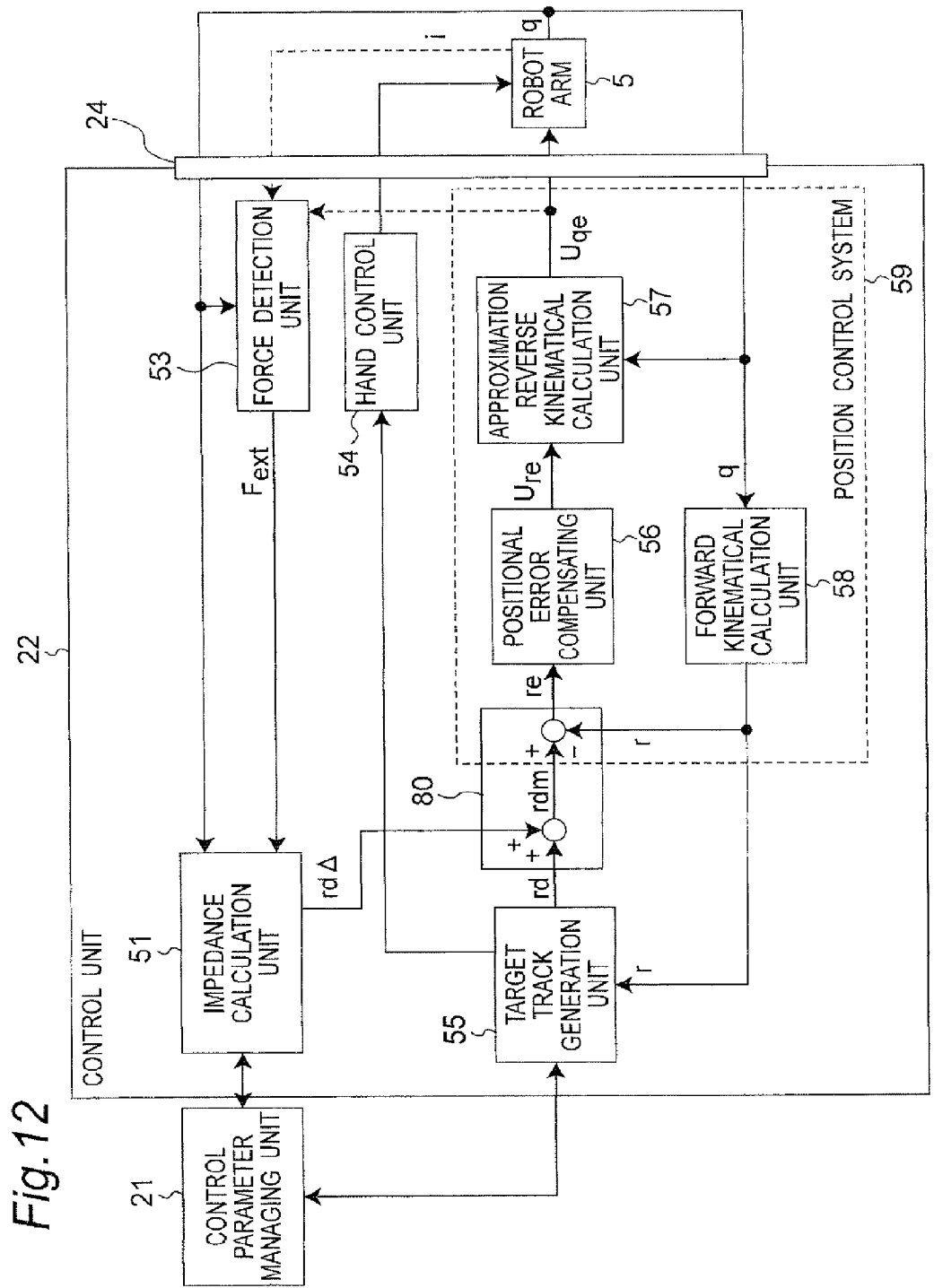
FIG. 12 is a block diagram showing the structure of a control unit of the control apparatus for a robot arm in the first embodiment of the present invention.

FIG. 12 is a block diagram of the control unit 22 relating to the position control mode, the impedance control mode and the hybrid impedance control mode. The control unit 22 controls the mechanical impedance values of the robot arm 5 to mechanical impedance set values of the robot arm 5 that are set based upon the set values of the inertia M, viscosity D and rigidity K determined by the control parameter managing unit 21.

Referring to FIG. 12, the following description will discuss the control unit 22 in detail. From the robot arm 5, a current value (joint angle vector) vector $q=[q_1, q_2, q_3, q_4, q_5, q_6]^T$ of each joint angle, measured by the encoder 44 of each of the joint portions, is outputted, and received by the control unit 22 through the input/output IF 24. In this case, $q_1$, $q_2$, $q_3$, $q_4$, $q_5$, $q_6$ are joint angles of the first joint portion 35, the second joint portion 36, the third joint portion 37, the fourth joint portion 38, the fifth joint portion 39, and the sixth joint portion 40.

Reference numeral 55 represents a target track generation unit, and at the time of the position control mode and the hybrid impedance control mode, tip position and orientation target vectors $r_d$, which form a target, are generated by the target track generation unit 55 from the operation information generated by the operation correction unit 20 and inputted to the target track generation unit 55 through the control parameter managing unit 21. More specifically, when the operation information is inputted to the target track generation unit 55 from the operation correction unit 20 through the control parameter managing unit 21, the tip position and orientation target vectors $r_d$, used for achieving a target operation of the robot arm 5, are outputted from the target track generation unit 55 to the positional error calculation unit 80. The target operation of the robot arm 5 is supplied with a position and orientation ($r_{d0}$, $r_{d1}$, $r_{d2}$, ...) for each point of time (t=0, t=$t_1$, t=$t_2$, ...) from the operation correction unit 20 in accordance with a target job, and the target track generation unit 55 interpolates the track between the respective points by using polynomial interpolation to generate the tip position and orientation target vectors $r_d$. At the time of the impedance control mode, the tip position of the robot arm 5 at the time of switching to the impedance control mode is outputted as the tip position and orientation target vectors $r_d$ to form a target. Moreover, an open/close instruction of the hand 30 is given to the hand control unit 54 to be described later, by using an open/close flag corresponding to the "hand" in the operation information database 17.

Reference numeral 54 represents the hand control unit 54, which, based upon the open/close flag inputted from the target track generation unit 55, gives an instruction to the robot arm 5 through the input/output IF 24 so as to open/close the hand 30.

Reference numeral 53 represents the force detection unit which detects an external force to be applied to the robot arm 5 by a contact between the person 4 or the like and the robot arm 5. An electric current value, $i=[i_1, i_2, i_3, i_4, i_5, i_6]^T$, of each current flowing through the motor 43 that drives each of the joint portions of the robot arm 5, measured by an electric current sensor of the motor driver 27, is taken in the force detection unit 53 through the input/output IF 24, and the current value q of each of the joint angles is also taken therein through the input/output IF 24, and a joint angle error compensating output $u_{qe}$ is also taken therein from an approximation reverse kinematical calculation unit 57 that will be described later. The force detection unit 53, which functions as an observer, calculates a torque $\tau_{eT}$ that is generated in each of the joint portions by an external force applied to the robot arm 5, based upon the electric current value i, the current value q of each of the joint angles and the joint angle error compensating output $u_{qe}$. Moreover, the force detection unit 53 also converts the torque to an equivalent tip unit external force $F_{ext}$ of the tip unit of the robot arm 5, based upon $F_{ext}=J_v(q)^{-T}\tau_{ext}-[0, 0, m_g]^T$, and outputs the equivalent tip unit external force $F_{ext}$ thus converted to the impedance calculation unit 51. In this case, $J_v(q)$ is a Jacob matrix that satisfies the following equation:

$$v=Jv(q)\dot{q}$$ [Equation 4]

where $v=[v_x, v_y, v_z, \omega_x, \omega_y, \omega_z]^T$, and ($v_x$, $v_y$, $v_x$) represent a translation speed of the tip unit of the robot arm 5 in the tip unit coordinate system 42, while ($\omega_x$, $\omega_y$, $\omega_z$) represent an angular velocity of the tip unit of the robot arm 5 in the tip unit coordinate system 42. Moreover, m represents a weight of a grabbed object held by the hand 30, and g represents gravitational acceleration. The value of the weight m of the grabbed object may be inputted to the force detection unit 53 through the input/output IF 24 by the person 4 prior to the grabbing process of the object. Moreover, the grabbing process of the object is actually carried out by the hand 30 of the robot arm 5, and based upon the estimated result of the equivalent tip unit external force $F_{ext}$ of the force detection unit 53 at this time, the value m of the weight of the grabbed object may be calculated.

The impedance calculation unit 51, which is a unit having a function for allowing the robot arm 5 to achieve the control of a mechanical impedance value of the robot arm 5 to a mechanical impedance set value, and information of the position control mode, the impedance control mode, or the hybrid impedance control mode is inputted thereto from the control parameter managing unit 21, and the tip unit position and orientation target vector $r_d$, outputted from the target track generation unit 55, the inertia M, viscosity D and rigidity K that are impedance parameters preliminarily set by the control parameter managing unit 21, the current value q of each of the joint angles, and the external force $F_{ext}$, detected by the force detection unit 53, are also inputted thereto. Upon switching to the position control mode by the control parameter managing unit 21, 0 is outputted from the impedance calculation unit 51. In contrast, upon switching to the impedance control mode or the hybrid impedance control mode in the control parameter managing unit 21, based upon the inertia M, viscosity D and rigidity K that are impedance parameters preliminarily set by the control parameter managing unit 21, the current value q of each of the joint angles and the external force $F_{ext}$ detected by the force detection unit 53, the tip unit position and orientation target correcting outputs $r_{d\Delta}$, used for allowing the robot arm 5 to achieve the control of the mechanical impedance value of the robot arm 5 to a mechanical impedance set value, is calculated by the impedance calculation unit 51 based upon the following equation (6) so that the tip unit position and orientation target correcting output $r_{d\Delta}$ thus calculated and found is outputted to the positional error calculation unit 80. The tip unit position and orientation target correcting output $r_{d\Delta}$ is added to the tip unit position and orientation target vector $r_d$ outputted by the target track generation unit 55 in the positional error calculation unit 80 so that a tip unit position and orientation correcting target vector $r_{dm}$ is generated. In the case where, at the time of the hybrid impedance control mode, the operation of the robot arm 5 is regulated in accordance with the correcting parameter, that is, for example, in the case where the robot arm 5 is allowed to move only in the z-axis direction, the impedance calculation unit 51 sets components of the tip unit position and orientation target correcting output $r_{d\Delta}$ other than the z component to 0.

[Equation 5]

$$r_{d\Delta}=(s^2\hat{M}+s\hat{D}+\hat{K})^{-1}F_{ext}$$ Equation (6)

where the following equations are satisfied and s represents a Laplace operator.

[Equation 6]

$$\hat{M} = \begin{bmatrix} M & 0 & 0 & 0 & 0 & 0 \\ 0 & M & 0 & 0 & 0 & 0 \\ 0 & 0 & M & 0 & 0 & 0 \\ 0 & 0 & 0 & M & 0 & 0 \\ 0 & 0 & 0 & 0 & M & 0 \\ 0 & 0 & 0 & 0 & 0 & M \end{bmatrix} \quad \text{Equation (7)}$$

[Equation 7]

$$\hat{D} = \begin{bmatrix} D & 0 & 0 & 0 & 0 & 0 \\ 0 & D & 0 & 0 & 0 & 0 \\ 0 & 0 & D & 0 & 0 & 0 \\ 0 & 0 & 0 & D & 0 & 0 \\ 0 & 0 & 0 & 0 & D & 0 \\ 0 & 0 & 0 & 0 & 0 & D \end{bmatrix} \quad \text{Equation (8)}$$

[Equation 8]

$$\hat{K} = \begin{bmatrix} K & 0 & 0 & 0 & 0 & 0 \\ 0 & K & 0 & 0 & 0 & 0 \\ 0 & 0 & K & 0 & 0 & 0 \\ 0 & 0 & 0 & K & 0 & 0 \\ 0 & 0 & 0 & 0 & K & 0 \\ 0 & 0 & 0 & 0 & 0 & K \end{bmatrix} \quad \text{Equation (9)}$$

Reference numeral 58 represents a forward kinematical calculation unit to which a joint-angle vector q that is the current value q of each of the joint angles measured by the encoder 44 of each of the joint portions of the robot arm 5 is inputted through the input/output IF 24. In the forward kinematical calculation unit 58, geometrical calculations are carried out to convert the joint angle vectors q of the robot arm 5 to the tip unit position and orientation vectors r, and the tip unit position and orientation vectors r are respectively outputted to the target track generation unit 55 and the positional error calculation unit 80.

Reference numeral 56 represents the positional error compensating unit, and after an error $r_e$ between the tip unit position and orientation vectors r calculated by the forward kinematical calculation unit 58 from the joint angle vectors q measured in the robot arm 5 and the tip unit position and orientation correcting target vectors $r_{dm}$ has been found by the positional error calculation unit 80, the error $r_e$ is inputted to the positional error compensating unit 56, and a positional error compensating output $u_{re}$ is outputted from the forward kinematical calculation unit 58 to the approximation reverse kinematical calculation unit 57.

Based upon the positional error compensating output $u_{re}$ inputted to the positional error compensating unit 56 and the joint angle vector q measured in the robot arm 5, the approximation reverse kinematical calculation unit 57 carries out approximation calculations of reverse kinematics by using an approximation $u_{out} = J_r(q)^{-1} u_{in}$. In this case, $J_r(q)$ is a Jacob matrix that satisfies the following equation, $\dot{r} = J_r(q)\dot{q}$ [Equation 9]

$u_{in}$ is an input to the approximation reverse kinematical calculation unit 57, and $u_{out}$ is an output from the approximation reverse kinematical calculation unit 57, and supposing that the input $u_{in}$ is a joint angle error $q_e$, a conversion equation from the tip unit position and orientation error $r_e$ to the joint angle error $q_e$, as represented by $q_e = J_r(q)^{-1} r_e$, is obtained. Therefore, when the positional error compensating output $u_{re}$ is inputted to the approximation reverse kinematical calculation unit 57 from the positional error compensating unit 56, a joint angle error compensating output $u_{qe}$ for use in compensating the joint angle error $q_e$ is outputted from the approximation reverse kinematical calculation unit 57 to the motor driver 25 of the robot arm 5 through the input/output IF 24 as an output from the approximation reverse kinematical calculation unit 57.

The joint angle error compensating output $u_{qe}$ is given to the motor driver 25 of the robot arm 5 through the D/A board of the input/output IF 24 as a voltage instructing value, and each of the joint portions is consequently driven to forwardly and reversely rotate by each of the motors 43 so that the robot arm 5 is operated.

With respect to the control unit 22 configured as described above, the following description will discuss a principle of the impedance-controlling operation of the robot arm 5.

The impedance controlling operation basically corresponds to a feed-back controlling (position-controlling) operation of the tip unit position and the orientation error $r_e$ by the positional error compensating unit 56 (in the same manner as in the hybrid impedance control), and a portion surrounded by a dotted line and indicated by reference numeral 59 corresponds to a position controlling unit 59. For example, when a PID compensator is used as the positional error compensating unit 56, a controlling operation is executed by the position controlling unit 59 so that the tip unit position and the orientation error $r_e$ is converged to 0; thus, it becomes possible to achieve a target impedance controlling operation of the robot arm 5.

Upon switching to the impedance control mode or the hybrid impedance control mode in the control parameter managing unit 21, the tip unit position and orientation target correcting output $r_{d\Delta}$ is added by the impedance calculation unit 51 in the positional error calculation unit 80 with respect to the position control unit 59 described earlier so that the target value of the tip unit position and orientation is corrected. For this reason, in the position control unit 59, the target value of the tip unit position and orientation is slightly deviated from the original value, with the result that an operation for controlling the mechanical impedance value of the robot arm 5 to the appropriately determined set value is achieved so that the positional controlling operation of the position control unit 59 can be corrected. Since the tip unit position and orientation target correcting output $r_{d\Delta}$ is calculated by equation (6), operations for controlling the mechanical impedance values of the inertia M, viscosity D and rigidity K of the robot arm 5 to the appropriately determined set values can be achieved.

Figure 13:
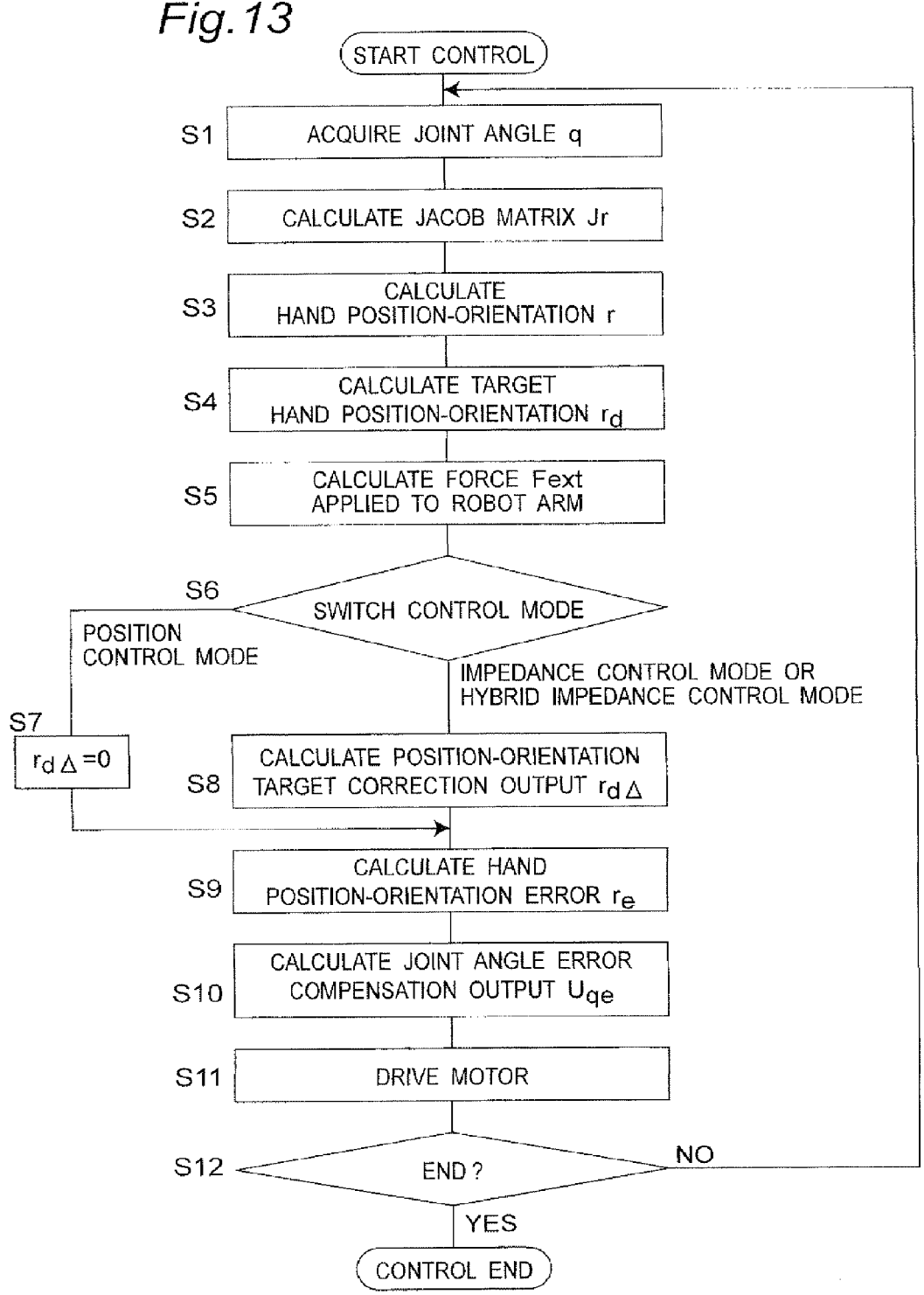
FIG. 13 is a flow chart showing operation steps of the control unit and the like of the control apparatus for a robot arm in the first embodiment of the present invention.

Referring to a flow chart of FIG. 13, the following description will discuss actual operation steps of the control program that is made based upon the principle described above.

The joint angle data (joint variable vector or joint angle vector q), calculated by each of the encoders 44 of the joint portions of the robot arm 5, is received by the control unit 22 of the control apparatus main body unit 11 from the encoder 44 through the input/output IF 24 (step S1).

Next, based upon the joint angle data (joint variable vector or joint angle vector q) thus received by the control unit 22, the reverse kinematical calculation unit 57 executes calculations, such as the Jacob matrix $J_r$, required for kinematical calculations of the robot arm 5 (step S2).

Next, the forward kinematical calculation unit 58 calculates the current tip unit position and orientation vector r of the robot arm 5 from the joint angle data (joint variable vector or joint angle vector q) from each of the encoders 44 of the robot arm 5, and outputs the resulting data to the positional error calculation unit 80 and the target track generation unit 55 (step S3).

Next, at the time of the position control mode or the hybrid impedance control mode, based upon operation information transmitted from the operation correction unit 20 through the control parameter managing unit 21, the target track calculation unit 55 calculates the tip unit position and orientation target vector $r_d$ of the robot arm 5, and outputs the resulting data to the positional error calculation unit 80, while, at the time of the impedance control mode, it outputs the tip unit position of the robot arm 5 to the positional error calculation unit 80 as a target tip unit position and orientation target vector $r_d$ (step S4).

Next, the force detection unit 53 calculates an equivalent tip-unit external force $F_{ext}$ at the tip unit of the robot arm 5 from a driving current value i of the motor 43, the joint angle data (joint variable vector or joint angle vector q) and the joint angle error compensating output $u_{qe}$, and outputs the resulting data to the impedance calculation unit 51 (step S5).

Next, in step S6, in the case where the operation correction unit 20 gives an instruction that "correction is required", the control parameter managing unit 21 sets the hybrid impedance control mode, while in the case where the operation correction unit 20 gives an instruction that "no correction is required", the control parameter managing unit 21 sets the position control mode. In the case of only the position control mode, the process proceeds to step S7, and in the case of the hybrid impedance control mode, the process proceeds to step S8.

Next, in step S7 (process in the impedance calculation unit 51), in the case where the position control mode is set in the control parameter managing unit 21, the impedance calculation unit 51 sets the tip unit position and orientation target correcting output $r_{dΔ}$ to 0 vector. Thereafter, the process proceeds to step S9.

In step S8, in the case where the impedance control mode is set in the control parameter managing unit 21 (in the case where the operation correction unit 20 gives an instruction that "correction is required" in the control parameter managing unit 21), or in the case where the hybrid impedance control mode is set therein, based upon the inertia M, viscosity D and rigidity K of the mechanical impedance parameters set in the control parameter managing unit 21, set by the control parameter managing unit 21, the joint angle data (joint variable vector or joint angle vector q) and the equivalent tip-unit external force $F_{ext}$ to be applied to the robot arm 5 calculated by the force detection unit 53, the tip unit position and orientation target correcting output $r_{dΔ}$ is calculated by the impedance calculation unit 51. Moreover, in the impedance calculation unit 51, based upon the correction parameters, any one of the component values of the tip unit position and orientation target correcting output $r_{dΔ}$ is set to 0.

Next, in step S9, the positional error calculation unit 80 calculates a tip unit position and orientation correction target vector $r_{dm}$, which is a sum $(r_d+r_{dΔ})$ between the tip unit position and orientation target vector $r_d$ from the target track generation unit 55 and the tip unit position and orientation target correcting output $r_{dΔ}$ from the impedance calculation unit 51. Next, the positional error calculation unit 80 calculates an error $r_e$ of the tip position and orientation that is a difference $(r_{dm}-r)$ between the tip unit position and orientation correction target vector $r_{dm}$ and the current tip unit position and orientation vector r from the forward kinematical calculation unit 58, and outputs the resulting data to the positional error compensating unit 56. As a specific example of the positional error compensating unit 56, a PID compensator is proposed. By appropriately adjusting three gains, that is, proportional gain, differential gain and integral gain, corresponding to an orthogonal matrix of a constant, the controlling process of the positional error compensating unit 56 is exerted so as to converge the positional error to 0.

Next, by multiplying the positional error compensating output $u_{re}$ by a reverse matrix of the Jacob matrix $J_r$ calculated in step S2, the approximation reverse kinematical calculation unit 57 converts the positional error compensating output $u_{re}$ from the value relating to the error of the tip unit position and orientation to a joint angle error compensating output $u_{qe}$ that is a value relating to the error of the joint angle (step S10).

Next, the joint angle error compensating output $u_{qe}$ is given to the motor driver 25 from the approximation reverse kinematical calculation unit 57 through the input/output IF 24, and based upon the joint angle error compensating output $u_{qe}$, the motor driver 25 changes the amount of electric current flowing through each of the motors 43 of the joint portions. With this change in the amount of electric current, a rotating movement is generated in each of the joint portions in the robot arm 5 so that the robot arm 5 carries out operations (step S11).

In the case of continuing steps S1 to S11 of the controlling operations, the process returns to step S1, while in the other cases (in the case of neither turning off the power supply nor stopping the robot, but completing only the controlling operations), the steps S1 to S11 of the controlling operations are completed (step S12).

By executing the above-mentioned steps S1 to S12 repeatedly as the controlling calculation loop, the control of the operations of the robot arm 5 can be achieved, that is, the controlling operations for setting the mechanical impedance values of the robot arm 5 to the appropriately determined set values can be achieved.

By using the above-mentioned operation steps S40 to S47 and steps S1 to S12, during operations in the positional control mode based upon operation information, by allowing the person 4 to directly grab the robot arm 5 and apply a force to the robot arm 5 in the hybrid impedance control mode, one portion of the parameters of the correction parameters is corrected so that the corresponding job by the robot arm 5 can be achieved.

As described above, by preparing the operation information database 17, the operation correction unit 20, the control parameter managing unit 21 and the control unit 22, the robot arm 5, which is being operated in the position control mode, is switched from the position control mode to the hybrid impedance control mode so that, by allowing the person 4 to directly grab the robot arm 5 and move the robot arm 5, it is possible to allow the person 4 to easily correct the movements of the robot arm 5 to desired movements.

Moreover, since the correction method setting unit 23 is prepared so that the presence or absence of the correction is switched, the operation of the robot arm 5 is maintained as "no correction is required", even when the person 4 erroneously applies a force to the robot arm 5 without an intention for correction, so that the operations of the robot arm 5 can be continued without corrections in the operations of the robot arm 5.

Note that, although the operation selecting unit 27 is designed to select an operation by a manipulation of the person 4, that is, by allowing the person 4 to hold the robot arm 5 and apply a force thereto, another arrangement may be used in which the person 4 is allowed to select a desired job to be preferably carried out through the operation selecting unit 27 from a list of jobs displayed on the display unit 2 by using a data input IF 26, such as a button 13a on an operation panel 13. In this case, it is necessary to make connections so that instruction information is inputted from the data input IF 26 to the operation selecting unit 27.

Moreover, in the above description, the position control mode is switched to the hybrid impedance control mode by switching the flag relating to the presence or absence of correction from "0" to "1" by the correction method setting unit 23; however, during the operation of the robot arm 5, the robot arm 5 may be operated not in the position control mode, but in the hybrid impedance control mode, all the time. In this case, although, it is not possible to prevent an erroneous operation at the time when the person 4 erroneously applies a force to the robot arm 5, it becomes possible to make a correction all the time, without the necessity of switching the presence or absence of correction.

(Second Embodiment)

Since the basic structure of a control apparatus 70 of the robot arm 5 of the robot system 1 in accordance with a second embodiment of the present invention is the same as that of the first embodiment, descriptions for the common portions will not be given, and the following description will discuss only different portions in detail.

Figure 14A:
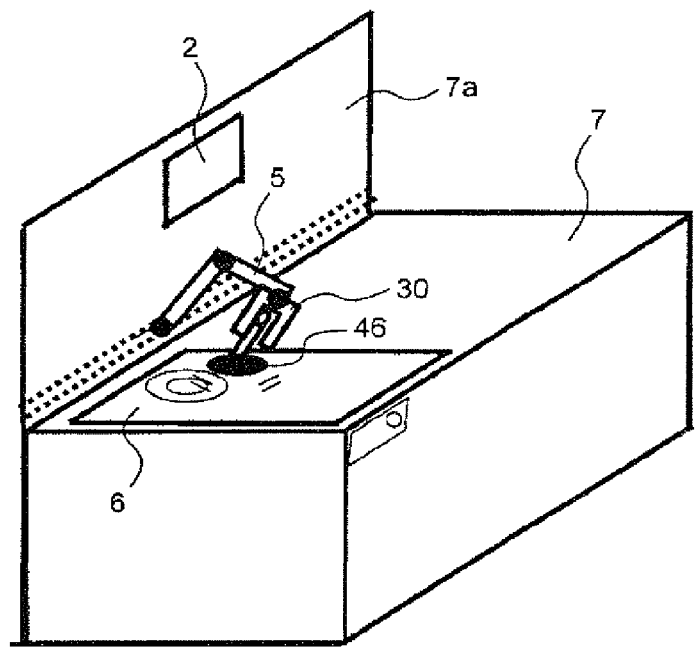
FIG. 14A is a view showing a manipulating state of a control apparatus for a robot arm in a second embodiment of the present invention.

In the second embodiment, as shown in FIG. 14A, the following description will be given by exemplifying a structure in which, as shown in FIG. 14A, a wiping process is carried out on a top plate of an IH cooking heater 6 by using a robot system 1. First, the person 4 attaches a sponge 46 serving as one example of a tool used for the wiping job to the tip unit of the robot arm 5 of the robot system 1, that is, a hand 30 on the tip thereof.

FIG. 15 shows an operation information database 17A (operation information database 17A disposed on the position of the operation information database 17 of FIG. 2A in place of the operation information database 17), and the "job ID", "operation ID", "position and orientation", "hand", "time" and "progress information" are the same as those of the first embodiment; therefore, the description thereof will not be given.

The information relating to "force" of the operation information database 17A represents information relating to a force to be applied by the robot arm 5 to an object to be subjected to the job thereof, and components in x, y, z, Φ, θ, φ directions of a force are indicated by ($f_x$, $f_y$, $f_z$, $f_\phi$, $f_\theta$, $f_\phi$). For example, in the case where $f_z$=5[N], this means that the wiping job is carried out by applying a force of 5[N] in the z-axis direction, and corresponds to a parameter used upon carrying out a wiping job on the top plate of the IH cooking heater 6 or the like, by applying a force in a direction along the surface of the top plate.

The information relating to "flag" of the operation information database 17A gives a value that indicates which piece of information among the position, orientation and force is valid, and more specifically, with respect to numeric value of 32 bits shown in FIG. 16, when the respective values of the position, orientation and force are valid in the respective bits, these are indicated by "1", while, when the respective values of the position orientation and force are invalid therein, these are indicated by "0". For example, in the 0th bit, when the value of the x-coordinate of the tip unit position of the robot arm 5 is valid, "1" is given thereto, while when the value of the x-coordinate of the tip unit position is invalid, "0" is given thereto; in the 1st bit, when the value of the y-coordinate of the tip unit position of the robot arm 5 is valid, "1" is given thereto, while when the value of the y-coordinate of the tip unit position is invalid, "0" is given thereto; in the 2nd bit, when the value of the z-coordinate of the tip unit position of the robot arm 5 is valid, "1" is given thereto, while when the value of the z-coordinate of the tip unit position is invalid, "0" is given thereto; and successively, in the 3rd, 4th and 5th bits, the validity of each of parameters Φ, θ, φ of the orientation is indicated (that is, "1" is given thereto when it is valid, while "0" is given thereto when it is invalid), and in the 6th bit to the 11th bit, the validity of each of components of a force is indicated (that is, "1" is given thereto when it is valid, while "0" is given thereto when it is invalid). Moreover, with respect to the information relating to "flag", in the same manner as in the first embodiment, since more bits (32 bits) are prepared for expansion in the future, bits from the 13th bit to the 31st bit are not used so that "0" is given to each of these bits in this example.

In the same manner as in the first embodiment, information relating to "correction parameter flag" in the operation information database 17A indicates which parameter should be corrected in the operation correction unit 20, and the information is given by a numeric value of 32 bits, and among the parameters described by the flag of the operation information database 17A, the types of correctable parameters are described as shown in FIG. 17. More specifically, in the case where only the $f_z$ coordinate representing the force in the z-axis direction in the operation database is corrected, "1" is given to the 8th bit, with "0" being given to the other bits.

By using the data input IF 26 such as a button 13a of the operation panel 13, the person 4 selects a wiping job among the jobs in the operation information database 17A through the operation selecting unit 27 so that an instruction for starting the wiping job is given to the control unit 22.

Figure 18:
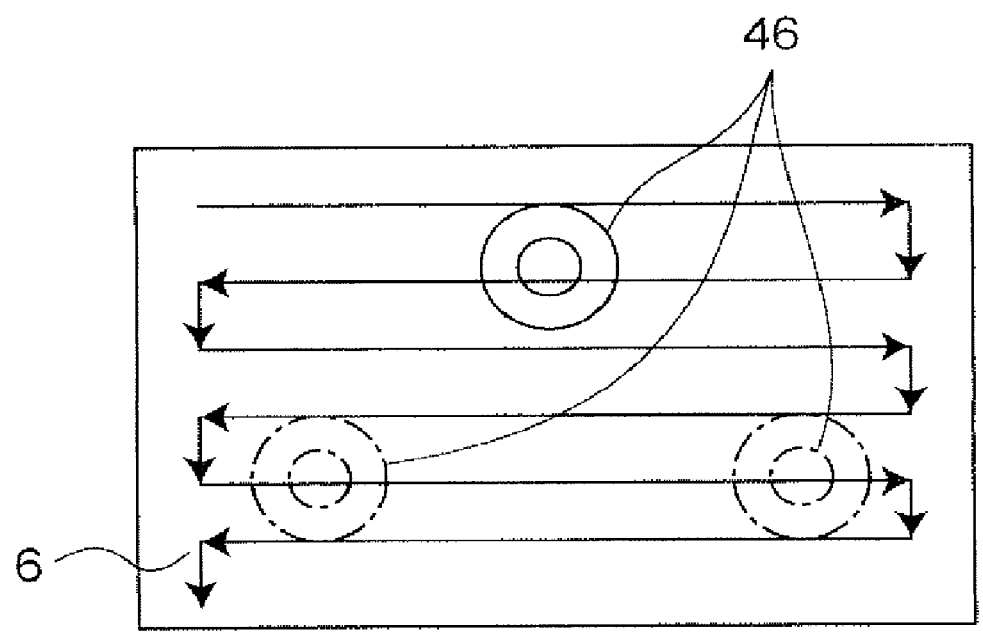
FIG. 18 is a view illustrating operations of a hand of the robot arm based upon operation template information of the control apparatus for a robot arm in the second embodiment of the present invention.

FIG. 18 is a plan view showing the IH cooking heater 6 viewed from the ceiling side. Values of the x, y coordinates of the operation information are preliminarily stored in the operation information database 17A as the coordinates of the tip unit of the robot arm 5 so as to shift the tip unit of the robot arm 5, that is, the hand 30, along a track as indicated by an arrow in FIG. 18 so that the wiping job is carried out by the sponge 46 on the top plate of the IH cooking heater 6. This track is used for carrying out the wiping job, with the sponge 46 grabbed by the hand 30 being pressed onto the top plate of the IH cooking heater 6 with a certain force in the z-axis direction; therefore, the bit relating to the z-axis direction has information of a force, and not information of the position and orientation. More specifically, as shown in FIG. 15, with respect to the operation information with its "operation ID" being set to "4", the bits other than that relating to the z-axis are specified by the position and orientation, while the bit relating to the z-axis is specified by the force. For this reason, with respect to the "flags", as shown in FIG. 16, those in the 0th bit, 1st bit and 3rd to 5th bits that represent the position x, y, and the orientation Φ, θ, φ are respectively set to "1", and the 8th bit representing the z-axis component of a force is set to "1".

The operation correction unit 20 first confirms whether or not the bit of the force component in the "flag" is "1", so as to realize the operation of a wiping job prior to correction. At this time, in the case where the operation correction unit 20 has determined that the bit of the force component is "1" even in only one of the six axes, the operation correction unit 20 outputs to the control parameter managing unit 21 such a control instruction as to control the pieces of operation information relating to "position and orientation", "force", "flag", "time" and "hand" in a force hybrid impedance control mode, which will be described later. In the force hybrid impedance mode, switching is made between the position control mode and the impedance control mode in each of the directions, and the operation of the wiping job is carried out with the specified force being applied.

At the time of the wiping job, a force is applied only in the z-axis direction, and the position control mode is used in the other directions; therefore, upon switching to the force hybrid impedance control mode, an instruction for carrying out such an operation is given from the operation correction unit 20 to the control parameter managing unit 21 together with the "flag" of FIG. 16. In the case where setting is made in the correction method setting unit 23 as "no correction is required", however, upon carrying out the controlling operation in the force hybrid impedance control mode, the impedance calculation unit 51, which will be described later, carries out a control process such that, when the tip unit of the robot arm 5 is moved to such an extent as to exceed a certain value, the robot arm 5 is prevented from being moved further so as not to allow the person 4 to erroneously apply a force in the z-axis direction to move the robot arm 5; thus, the job, such as a wiping job, can be carried out safely.

Figure 14B:
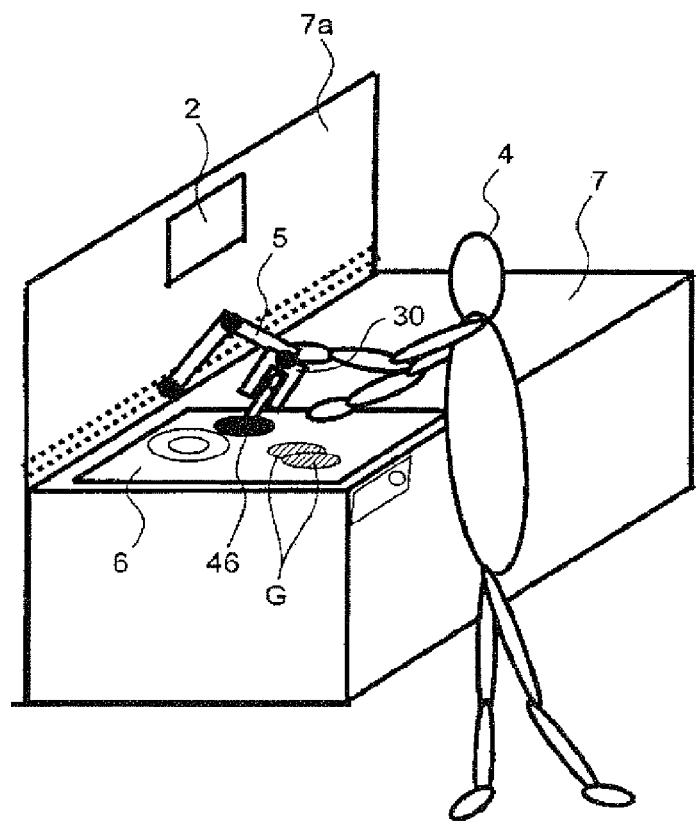
FIG. 14B is a view showing a manipulating state of the control apparatus for a robot arm in the second embodiment of the present invention.

The following description will be given by exemplifying a case where, during a wiping job in the force hybrid impedance control mode, the person 4 finds a terribly soiled portion G on the top plate, as shown in FIG. 14B, and wishes to correct the operation of the robot arm 5 so as to rub the top plate more strongly with a sponge 46.

The person 4 switches the flag relating to the presence or absence of correction from "0" to "1" by using the correction method setting unit 23 through the data input IF 26, and in order to correct only the force in the z-axis of the correction parameters, the correction method setting unit 23 also gives such a control instruction as to set only the 8th bit of the correction parameters in FIG. 16 to "1", to the control parameter managing unit 21 through the operation correction unit 20. In the case where any one of the 6th to 11th bits (force components) of the correction parameters is "1", the control parameter managing unit 21 gives to the control unit 22 such a control instruction as not to make a switch to the hybrid impedance control mode of the first embodiment, but to carry out an operation in a high-rigidity position control mode, which will be described later.

By giving this instruction to the control unit 22, the high-rigidity position control mode makes it possible to set high rigidity upon controlling positions in each of the directions differently, and in this mode, even upon application of a force to the robot arm 5 by the person 4, the robot arm 5 is prevented from being easily moved, for example, being brought in contact with a floor surface or the like. Such a control instruction as to operate the robot arm 5 in the high-rigidity position control mode only in the z-axis direction, and also operate the robot arm 5 in the normal position control mode in the other directions is given from the control parameter managing unit 21 to the control unit 22. Based upon the control instruction, the control unit 22 controls the wiping operation of the robot arm 5.

In this manner, while, during a wiping operation of the robot arm 5, the robot arm 5 carries out a wiping job on a terribly soiled portion G of the top plate, the person 4 directly grabs the robot arm 5, and the person 4 applies a desired force to the robot arm 5 that is carrying out a wiping job, downward to the top plate of the IH cooking heater 6.

The high-rigidity position control mode is a mode in which the position control mode of the first embodiment is allowed to have higher rigidity, and achieved by making higher the gain in the positional error compensating unit 56, which will be described later (such a control instruction as to carry out an operation in the high-rigidity position control mode from the control parameter managing unit 21 to the positional error compensating unit 56. Upon receipt of the instruction, the positional error compensating unit 56 makes the gain larger than that at the time of a normal position control mode (more specifically, a value about two times higher than that in the normal position control mode)), and even when the person 4 applies a force to the robot arm 5, the robot arm 5 is not moved easily. Since the robot arm 5 is not moved to be brought in contact with the floor surface or the like, the applied force by the person 4 can be detected by the force detection unit 53 of the control unit 22, without being influenced by a drag from the contact surface.

The force detected by the force detection unit 53 of the control unit 22 is transmitted to the operation correction unit 20 through the control parameter managing unit 21. The operation correction unit 20 replaces the force in the z-axis direction of the operation information database 17A with the force thus transmitted to the operation correction unit 20, and the resulting information is stored in the operation information database 17A by the operation storage unit 15; thereafter, by operating the robot arm 5 based upon the stored information, the operations of the robot arm 5 are corrected so as to carry out a cleaning process more strongly only on the soiled portion.

In addition to the functions described in the first embodiment, the control parameter managing unit 21 also has a function for informing the target track generation unit 55 of force information, in addition to pieces of information of making a switch to any one of modes among the impedance control mode, the force hybrid impedance control mode and the high-rigidity position control mode, and information relating to the position and orientation.

Figure 19:
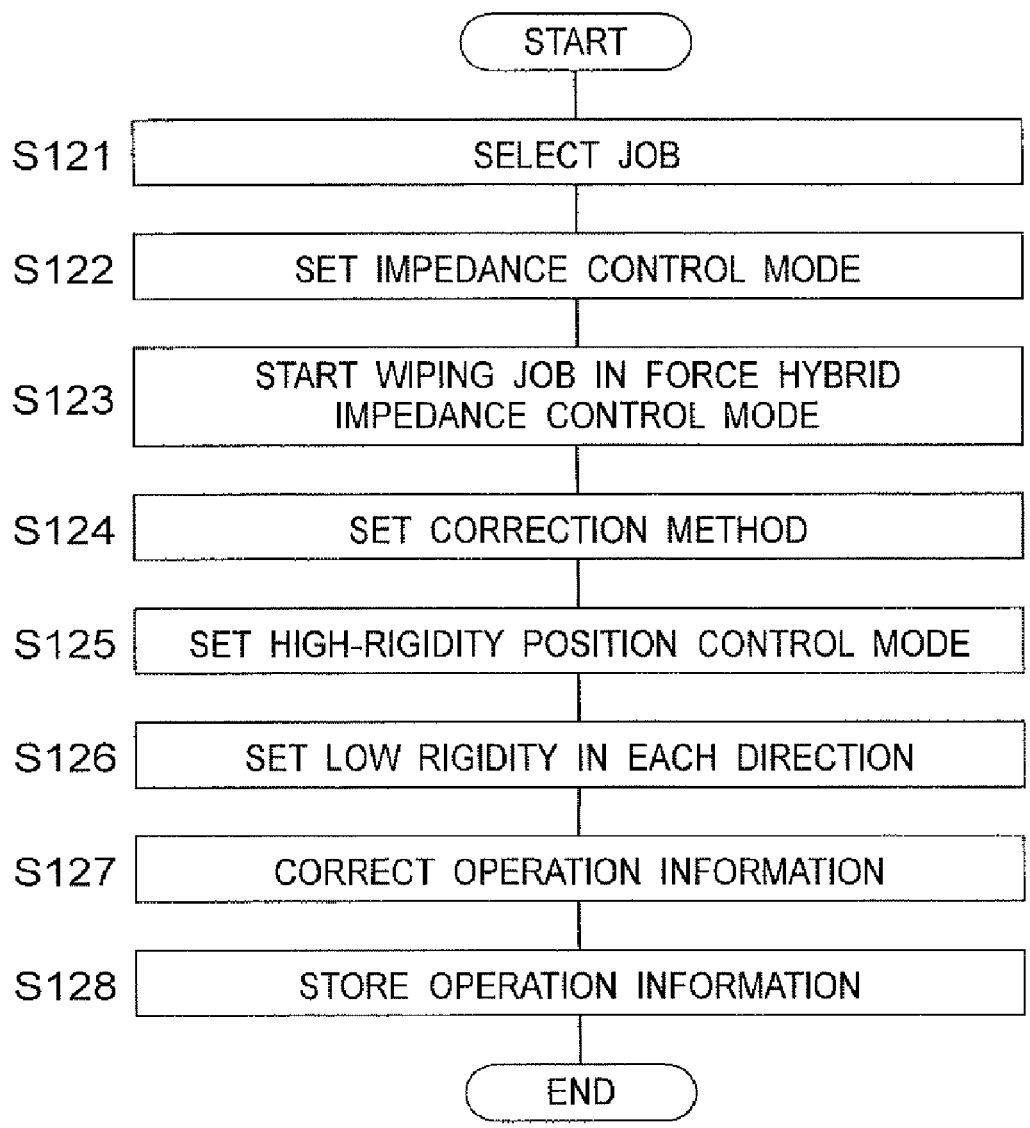
FIG. 19 is a flow chart showing operation steps relating to an operation correction unit, an operation selecting unit, a correction method setting unit, an operation storage unit, the operation information database, and a control parameter managing unit of the control apparatus for a robot arm in the second embodiment of the present invention.

Referring to a flow chart of FIG. 19, the following description will discuss operation steps of the operation correction unit 20, the operation selecting unit 27, the correction method setting unit 23, the operation storage unit 15, the operation information database 20 and the control parameter managing unit 21, in accordance with the above structure. The following description mainly deals with a switching process to the high-rigidity position control mode.

In the same manner as in step S40 in the first embodiment, first, the person 4 actually grabs the robot arm 5, and by moving the robot arm 5, the person 4 allows the robot arm 5 to carry out an operation of a wiping job. Then, the information of the tip unit position and orientation of the robot arm 5 is stored in the operation information database 17A by the operation storage unit 15.

Next, the operation selecting unit 27 compares the information of the tip unit position and orientation of the robot arm 5, stored in the operation information database 17A at this time, with information of the tip unit position and orientation of the robot arm 5 of each of the operations of preliminarily stored jobs that have been preliminarily stored in the operation information database 17A, and selects an operation that is coincident therewith, or an operation that relates to information similar to the information of the tip unit position and orientation of the robot arm 5 within a permissible range. Moreover, a job that includes the operation is selected from the list of jobs preliminarily stored in the operation information database 17A by the operation selecting unit 27, and the current job is set in the progress information of the operation information database 17A by the operation selecting unit 27 (step S121). In the list of the jobs, for example, a plurality of wiping jobs (more specifically, a wiping job with a strong rubbing force, a wiping job with a weak rubbing force, a wiping job in the same rotation direction, and a wiping job carried out in both of the forwardly and reversely rotation directions) are listed, and the coincident job is selected therefrom, and in addition, the list of the jobs includes different kinds of jobs, for example, a wiping job and a stirring job, and the coincident job may be selected therefrom.

Next, in the same manner as in step S41 of the first embodiment, when the current job has been set in the progress information of the operation information database 17A, the operation correction unit 20 gives an operation instruction to the control parameter managing unit 21 to set the impedance control mode so that the robot arm 5 is operated in the impedance control mode, and the person 4 directs the robot arm 5 near the IH cooking heater 6 (step S122), and gives an instruction for starting the wiping job to the correction method setting unit 23 through the data input IF 26. The instruction is further sent from the correction method setting unit 23 to the control unit 22 through the control parameter managing unit 21.

When the instruction for starting the wiping job that has been inputted to the control parameter managing unit 21 from the correction method setting unit 23 is sent to the control unit 22, the operation correction unit 20 allows the control unit 22 to start operations for the wiping job in the force hybrid impedance control mode in the case where the bit of the force component in "flag" of the operation information database 17A is "1" (step S123). In the case where the bit of the force component in "flag" of the operation information database 17A is "0", the operation correction unit 20 allows the control unit 22 to start operations for the wiping job in the position control mode set in step S122.

Next, the correcting method is set by the correcting method setting 23. More specifically, by setting the information of the flag relating to the presence or absence of correction to "1" from "0" in the operation information database 17A through the input IF 26 and the correction method setting unit 23, the setting for starting the correction is carried out by the correction method setting unit 23 (step S124). In the case of setting of the presence of correction (when the flag information relating to the presence or absence of correction is set from "0" to "1"), as well as correcting the force component by the correction parameter (when the flag of the force component is "1"), upon receipt of the information that the flag relating to the presence or absence of correction outputted from the correction method setting unit 23 is "1" and that any one of the 6th to 11th bits (force components) of the correction parameters is "1", the operation correction unit 20 gives an instruction to the control parameter managing unit 21 so as to carry out operations in the high-rigidity position control mode so that the high-rigidity position control mode is set (step S125). The control unit 22 receives the operation instruction for the high-rigidity position control mode from the control parameter managing unit 21, with a control instruction value being inputted to each of the motors 43 and 62 from the motor driver 25 through the input/output IF 24, and allows the robot arm 5 to start operations in the high-rigidity position control mode.

Next, in accordance with the correction parameter, a setting of the high-rigidity position control mode in each of different directions is carried out so as to regulate the operation at the time of the high-rigidity position control mode (step S126). The setting of the high-rigidity position control mode in each of different directions is carried out by inputting such an instruction as to set the correction parameter flag to be desirably corrected to "1" to the control parameter managing unit 21 from the operation correction unit 20 through the data input IF 26 and the correction method setting unit 23, as described earlier.

Next, when the person 4 grabs the robot arm 5 and applies a force to the robot arm 5 in a direction to be desirably corrected, the operation correction unit 20 corrects the operation information of the operation information database 17A (step S127).

Next, the operation information thus corrected is stored in the operation information database 17A by the operation storage unit 15 in the same manner as in step S47 in the first embodiment (step S128).

Figure 20:
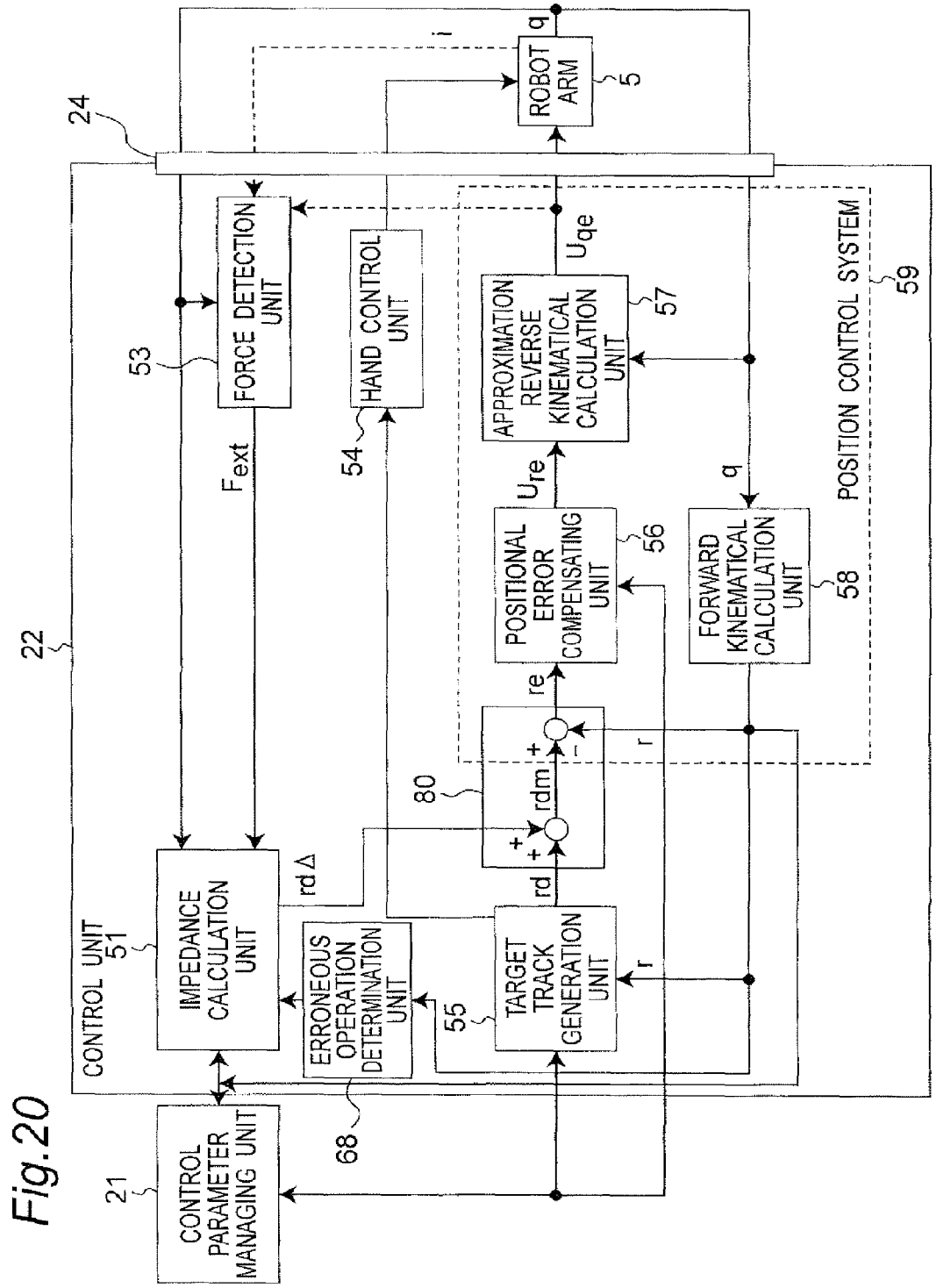
FIG. 20 is a block diagram showing a structure of the control unit of the control apparatus for a robot arm in the second embodiment of the present invention.

Referring to FIG. 20, the following description will discuss the control unit 22 in detail.

Of the control unit 22, the force detection unit 53, the approximation reverse kinematical calculation unit 57, the forward kinematical calculation unit 58, the hand control unit 54 and the positional error calculation unit 80 are the same as those of the first embodiment; therefore, the description thereof will not be given.

At the time of the impedance control mode, the force hybrid impedance control mode and the high-rigidity position control mode, the target track generation unit 55 generates a tip unit position and orientation target vector $r_d$ that indicates a target, based upon the operation information that has been generated by the operation correction unit 20 and inputted to the target track generation unit 55 through the control parameter managing unit 21. Upon receipt of the operation information from the control parameter managing unit 21 by the target track generation unit 55, the tip unit position and orientation target vector $r_d$ used for achieving target operations of the robot arm 5, a tip-unit force vector $f_d$ generated by the target track generation unit 55 and the flag that indicates which parameter is valid in each of the directions separately are outputted from the target track generation unit 55 to the positional error calculation unit 80. At the time of the position control mode, the target operation of the robot arm 5 is supplied with a position and orientation ($r_{d0}$, $r_{d1}$, $r_{d2}$, ...) and a force ($f_{d0}$, $f_{d1}$, $f_{d2}$, ...) at each point of time (t=0, t=$t_1$, t=$t_2$, ...) from the operation correction unit 20, in accordance with the target job. The target track generation unit 55 interpolates the track and force between the respective points by using polynomial interpolation to generate the tip unit position and orientation target vector $r_d$ and the force vector $f_d$. Moreover, in the same manner as in the first embodiment, an open/close instruction of the hand 30 is given to the hand control unit 54, which will be described later, by using an open/close flag corresponding to the "hand" in the operation information database 17A.

The impedance calculation unit 51 is a unit that achieves a function for controlling the mechanical impedance value of the robot arm 5 to a mechanical impedance set value of the robot arm 5, and upon switching to the position control mode by the control parameter managing unit 21, 0 is outputted from the impedance calculation unit 51. In the case where the impedance control mode is specified by the control parameter managing unit 21, the tip unit position and orientation target correcting output $r_{d\Delta}$ is outputted in the same manner as in the first embodiment. Upon switching to the force hybrid impedance control mode by the control parameter managing unit 21, in the case where there is a force component specified by "flag", based upon the inertia M, viscosity D and rigidity K that are impedance parameters set by the control parameter managing unit 21, the current value q of each of the joint angles, the external force $F_{ext}$ detected by the force detection unit 53 and $f_d$ outputted from the target track generation unit 55, the tip unit position and orientation target correcting output $r_{d\Delta}$, used for achieving the control of the mechanical impedance value of the robot arm 5 to a mechanical impedance set value of the robot arm 5, is calculated by the impedance calculation unit 51 based upon the following equation (10) so that the tip unit position and orientation target correcting output $r_{d\Delta}$ thus calculated and found is outputted to the positional error calculation unit 80. In the same manner as in the first embodiment, the tip unit position and orientation target correcting output $r_{d\Delta}$ is added to the tip unit position and orientation target vector $r_d$ outputted by the target track generation unit 55 in the positional error calculation unit 80 so that a tip unit position and orientation correcting target vector $r_{dm}$ is generated. However, in the case where the operations of the robot arm 5 under the impedance control are regulated in accordance with a correcting parameter, for example, in the case where only a force in the z-axis is applied to the robot arm 5 so as to carry out a cleaning job, with the components of the other axes being exerted in the position control mode, the components other than the z-component of the tip unit position and orientation target correcting output $r_{d\Delta}$ are set to 0 by the impedance calculation unit 51.

[Equation 10]

$$r_{d\Delta}=(s^2\hat{M}+s\hat{D}+\hat{K})^{-1}(F_{ext}-f_d) \qquad \text{Equation (10)}$$

Moreover, in the case where the mode is switched to the force hybrid impedance control mode, if the tip unit position and orientation vector r of the actual robot arm 5 set by the target track generation unit 55 is detected as indicating the fact that the robot arm 5 is moved beyond a certain range, for example, by a force erroneously applied to the robot arm 5 by the person 4, an adjusting process is carried out by setting the calculated tip unit position and orientation target correcting output $r_{d\Delta}$ to a certain value or less so as to prevent the robot arm 5 from being moved beyond the certain range.

In this case, the determination as to whether or not the robot arm 5 has been moved beyond a certain range is made in the following manner. The actual tip unit position of the robot arm 5 is stored in a time sequential manner, and detection is made as to whether or not the tip unit position has been moved beyond a certain threshold value within a certain period of time. More specifically, in an erroneous operation determination unit 68 shown in FIG. 20, an actual tip unit position r of the robot arm 5, outputted from the forward kinematical calculation unit 58, is stored in a time sequential manner, and the erroneous operation detection unit 68 determines whether or not the tip unit position has been moved beyond a certain threshold value within a certain period of time. Upon determination by the erroneous operation determination unit 68 that it has been moved beyond the certain threshold value, the erroneous operation determination unit 68 gives an instruction to the impedance calculation unit 51 so as to set the tip-unit position and posture target compensating output $r_{d\Delta}$ to a certain value or less.

In addition to the functions of the positional error compensating unit 56 of the first embodiment, when the high-rigidity position control mode is set, the positional error compensating unit 56 sets three gains, that is, proportional, differential and integral gains, that are diagonal matrixes of a constant to predetermined greater values (that is, values greater than those in the normal position control mode. More specifically, about two times as large as those values in the normal position control mode. In this case, "high rigidity" means higher rigidity in comparison with that in the normal position control mode. When the values are set to two times as large as those values in the normal position control mode, the rigidity can be made about two times as high as that in the normal position control mode); thus, it becomes possible to achieve a position controlling process with high rigidity. Note that, by changing the gain values for each of the components, for example, a controlling process can be carried out with high rigidity only in the z-axis direction, with the normal positional control being carried out in the other directions.

Figure 21:
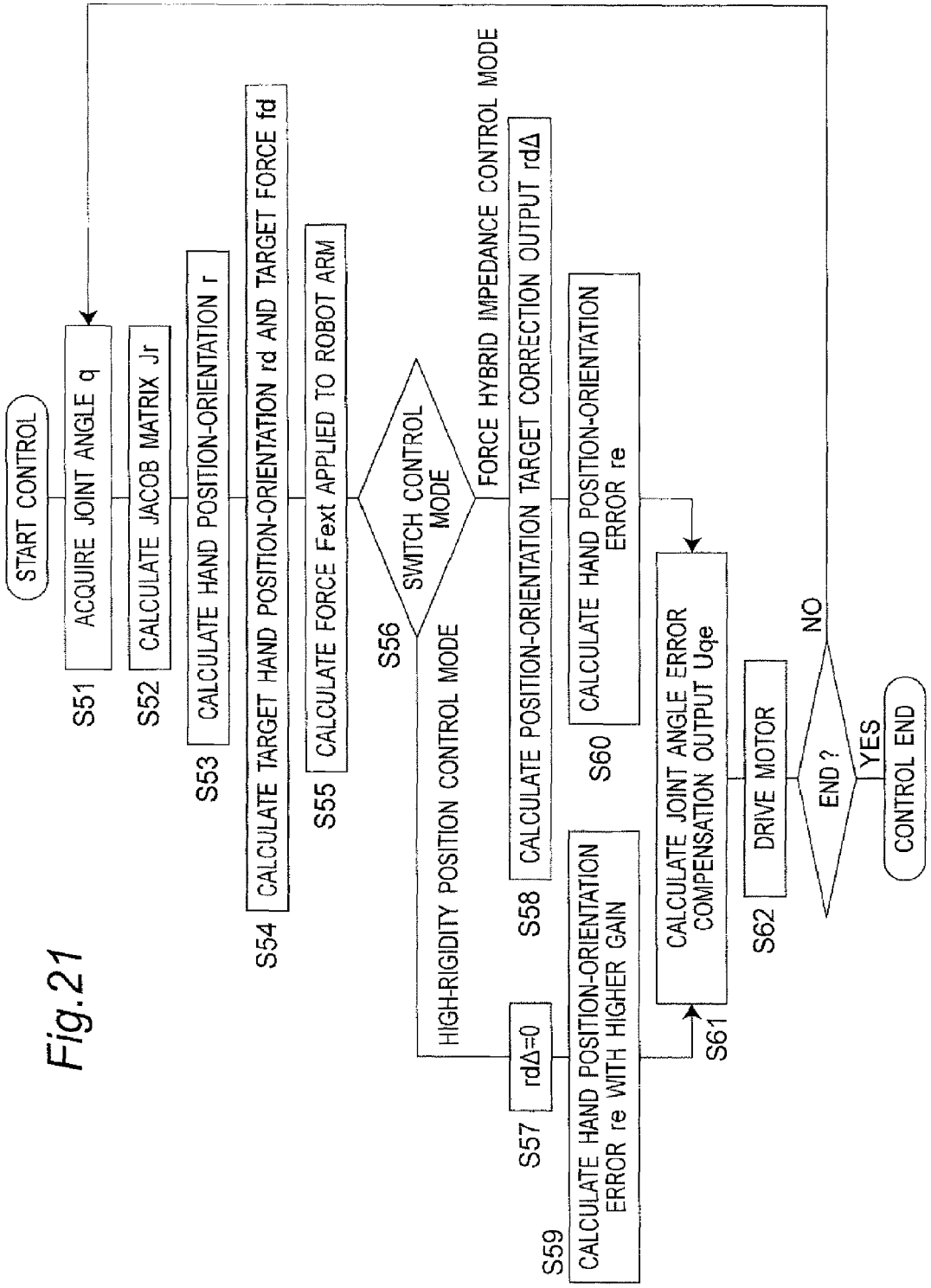
FIG. 21 is a flow chart showing operation steps of the control unit and the like of the control apparatus for a robot arm in the second embodiment of the present invention.

Referring to a flow chart of FIG. 21, the following description will discuss actual operation steps of the control program.

The joint angle data (joint variable vector or joint angle vector q), calculated by each of the encoders 44 of the joint portions of the robot arm 5, is received by the control unit 22 of the control apparatus main body unit 11 from the encoder 44 through the input/output IF 24 (step S51).

Next, based upon the joint angle data (joint variable vector or joint angle vector q) thus received by the control unit 22, the reverse kinematical calculation unit 57 executes calculations, such as the Jacob matrix $J_r$, required for kinematical calculations of the robot arm 5 (step S52).

Next, the forward kinematical calculation unit 58 calculates the current tip unit position and orientation vector r of the robot arm 5 from the joint angle data (joint variable vector or joint angle vector q) from each of the encoders 44 of the robot arm 5, and outputs the resulting data to the positional error calculation unit 80, the target track generation unit 55 and the impedance 51 (step S53).

Next, based upon operation information transmitted from the operation correction unit 20 through the control parameter managing unit 21, the target track calculation unit 55 calculates the tip unit position and orientation target vector $r_d$ and a force target vector $f_d$ of the robot arm 5, and outputs the resulting data to the positional error calculation unit 80 (step S54).

Next, the force detection unit 53 calculates an equivalent tip-unit external force $F_{ext}$ at the tip unit of the robot arm 5 from a driving current value i of the motor 43, the joint angle data (joint variable vector or joint angle vector q) and the joint angle error compensating output $u_{qe}$, and outputs the resulting data to the impedance calculation unit 51 (step S55).

Next, in step S56, in the case where the operation correction unit 20 gives an instruction that "no correction is required", the control parameter managing unit 21 sets the force hybrid impedance control mode, while in the case where the operation correction unit 20 gives an instruction that "correction is required", the control parameter managing unit 21 sets the high-rigidity position control mode. In the case of only the high-rigidity position control mode, the process proceeds to step S57, and in the case of the force hybrid impedance control mode, the process proceeds to step S58.

Next, in step S57 (process in the impedance calculation unit 51), in the case where the high-rigidity position control mode is set in the control parameter managing unit 21, the impedance calculation unit 51 sets the tip unit position and orientation target correcting output $r_{d\Delta}$ to 0 vector. Thereafter, the process proceeds to step S59.

In step S58, in the case where the force hybrid impedance control mode is set in the control parameter managing unit 21, based upon the inertia M, viscosity D and rigidity K of the mechanical impedance parameters set in the control parameter managing unit 21, the joint angle data (joint variable vector or joint angle vector q) and the equivalent tip-unit external force $F_{ext}$ to be applied to the robot arm 5 calculated by the force detection unit 53, a tip unit position and orientation target correcting output $r_{d\Delta}$ is calculated by the impedance calculation unit 51. Moreover, in the impedance calculation unit 51, upon detection of the fact that the actual tip unit position r (the actual tip unit position r of the robot arm 5 outputted from the forward kinematical calculation unit 58) (see step S53) has been moved beyond a certain range, the calculated tip unit position and orientation target correcting output $r_{d\Delta}$ is set to a certain value or less.

Next, in step S59 or step S60, the positional error calculation unit 80 calculates a tip unit position and orientation correction target vector $r_{dm}$, which is a sum ($r_d+r_{d\Delta}$) between the tip unit position and orientation target vector $r_d$ from the target track generation unit 55 and the tip unit position and orientation target correcting output $r_{d\Delta}$ from the impedance calculation unit 51. Next, the positional error calculation unit 80 calculates an error $r_e$ of the tip position and orientation that is a difference ($r_{dm}$–r) between the tip unit position and orientation correction target vector $r_{dm}$ and the current tip unit position and orientation vector r from the forward kinematical calculation unit 58, and outputs the resulting data to the positional error compensating unit 56. As a specific example of the positional error compensating unit 56 used in step S60, a PID compensator is proposed. By appropriately adjusting three gains, that is, proportional gain, differential gain and integral gain, corresponding to an orthogonal matrix of a constant, the controlling process of the positional error compensating unit 56 is exerted so as to converge the positional error to 0. In step S59, by setting the gains to certain greater values (that is, values greater than those in the normal position control mode. More specifically, about two times as large as those values in the normal position control mode. In this case, "high rigidity" means higher rigidity in comparison with that in the normal position control mode. When the values are set to two times as large as those values in the normal position control mode, the rigidity can be made about two times as high as that in the normal position control mode), it becomes possible to achieve a position controlling process with high rigidity.

Next, in the approximation reverse kinematical calculation unit 57, by multiplying the positional error compensating output $u_{re}$ by a reverse matrix of the Jacob matrix $J_r$ calculated in step S52, the positional error compensating output $u_{re}$ is converted from the value relating to the error of the tip unit position and orientation to a joint angle error compensating output $u_{qe}$ that is a value relating to the error of the joint angle, by the approximation reverse kinematical calculation unit 57 (step S61).

Next, the joint angle error compensating output $u_{qe}$ is given to the motor driver 25 from the approximation reverse kinematical calculation unit 57 through the input/output IF 24, and based upon the joint angle error compensating output $u_{qe}$, the motor driver 25 changes the amount of electric current flowing through each of the motors 43 of the joint portions. With this change in the amount of electric current, a rotating movement is generated in each of the joint portions in the robot arm 5 so that the robot arm 5 carries out operations (step S62).

In the case of continuing steps S51 to S62 of the controlling operations, the process returns to step S51, while in the other cases (in the case of neither turning off the power supply nor stopping the robot, but completing only the controlling operations), the steps S51 to S62 of the controlling operations are completed (step S63).

By executing the above-mentioned steps S51 to S62 repeatedly as the controlling calculation loop, the control of the operations of the robot arm 5 can be achieved, that is, the controlling operations for setting the mechanical impedance values of the robot arm 5 to the appropriately determined set values can be achieved.

In the above-mentioned operation steps S120 to S130 and steps S51 to S62, during operations in the force hybrid impedance control mode based upon operation information, by correcting the force information of the correction parameters by the high-rigidity positional control, the corresponding job by the robot arm 5 can be achieved.

As described above, the operation information database 17A, the operation correction unit 20, the control parameter managing unit 21 and the control unit 22 are prepared in such a manner that, even in the case where, while the robot arm 5 is carrying out a job such as a wiping job, with its force being applied in each of directions separately (in this example, in a top-plate direction of the IH cooking heater 6), in the force hybrid impedance control mode, the person 4 switches the mode to the high-rigidity position control mode, directly grabs the robot arm 5 and applies a force in each of directions separately, since the robot arm 5 is not easily moved, it becomes possible to prevent the robot arm 5 from being brought in contact with the floor surface or the like and influenced by a drag from the contact surface, and consequently to allow the person 4 to desirably correct the movements (force components) of the robot arm 5 easily.

(Third Embodiment)

Since the basic structure of a control apparatus 70 of the robot arm 5 in accordance with a third embodiment of the present invention is the same as that of the first embodiment, descriptions for the common portions will not be given, and the following description will discuss only different portions in detail.

Figure 22:
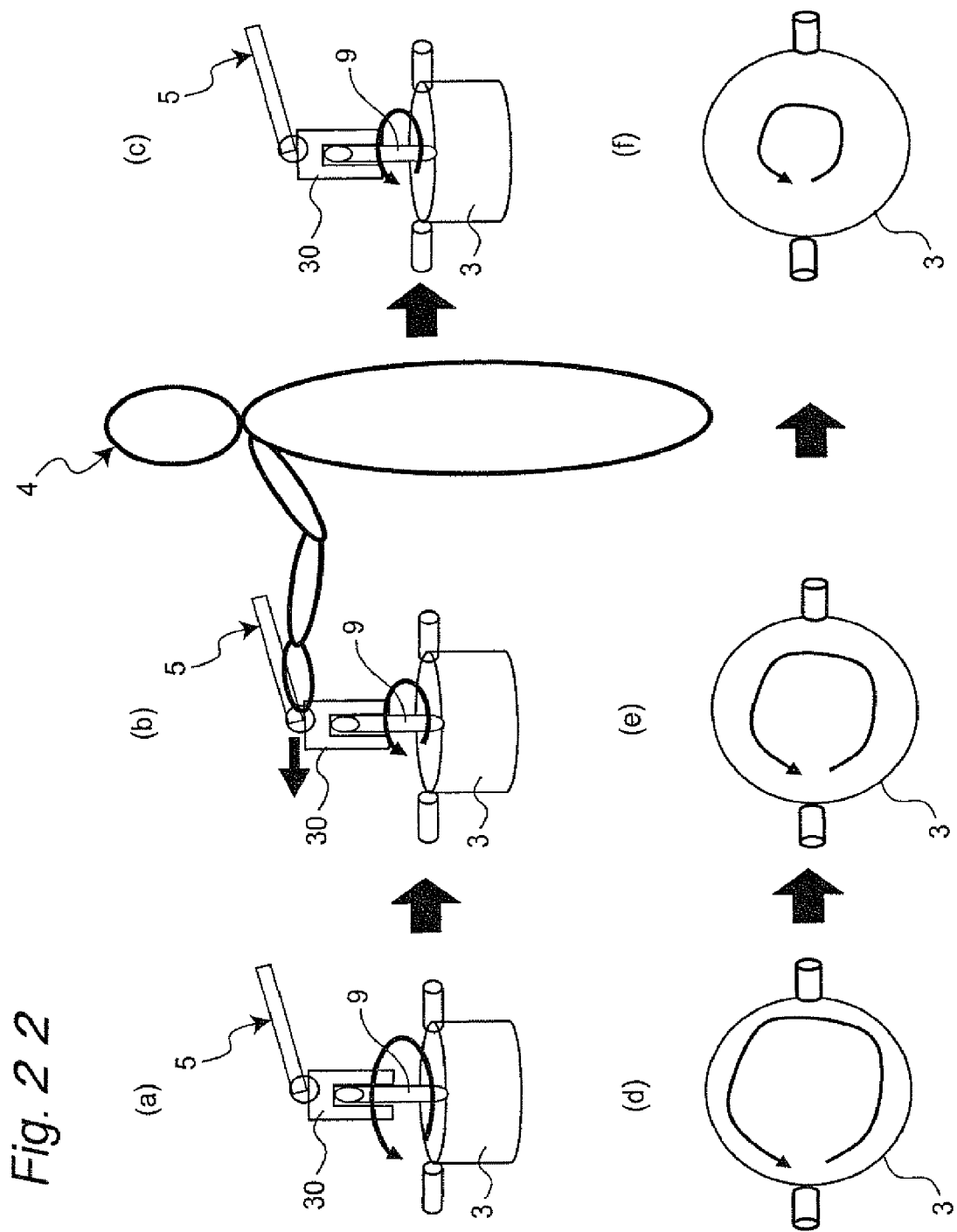
FIG. 22 is an explanatory view including (a) to (f) views respectively illustrating control operating states of a robot arm by a control apparatus for a robot arm and manipulating states by a person in a third embodiment of the present invention.

As shown in FIG. 22(a) (FIG. 22(d) is a view taken by viewing FIG. 22(a) from above), the following description will be given by exemplifying an operation in which a stirring job in a pot 3 is carried out by using the robot arm 5 of a robot system 1.

Figure 23:
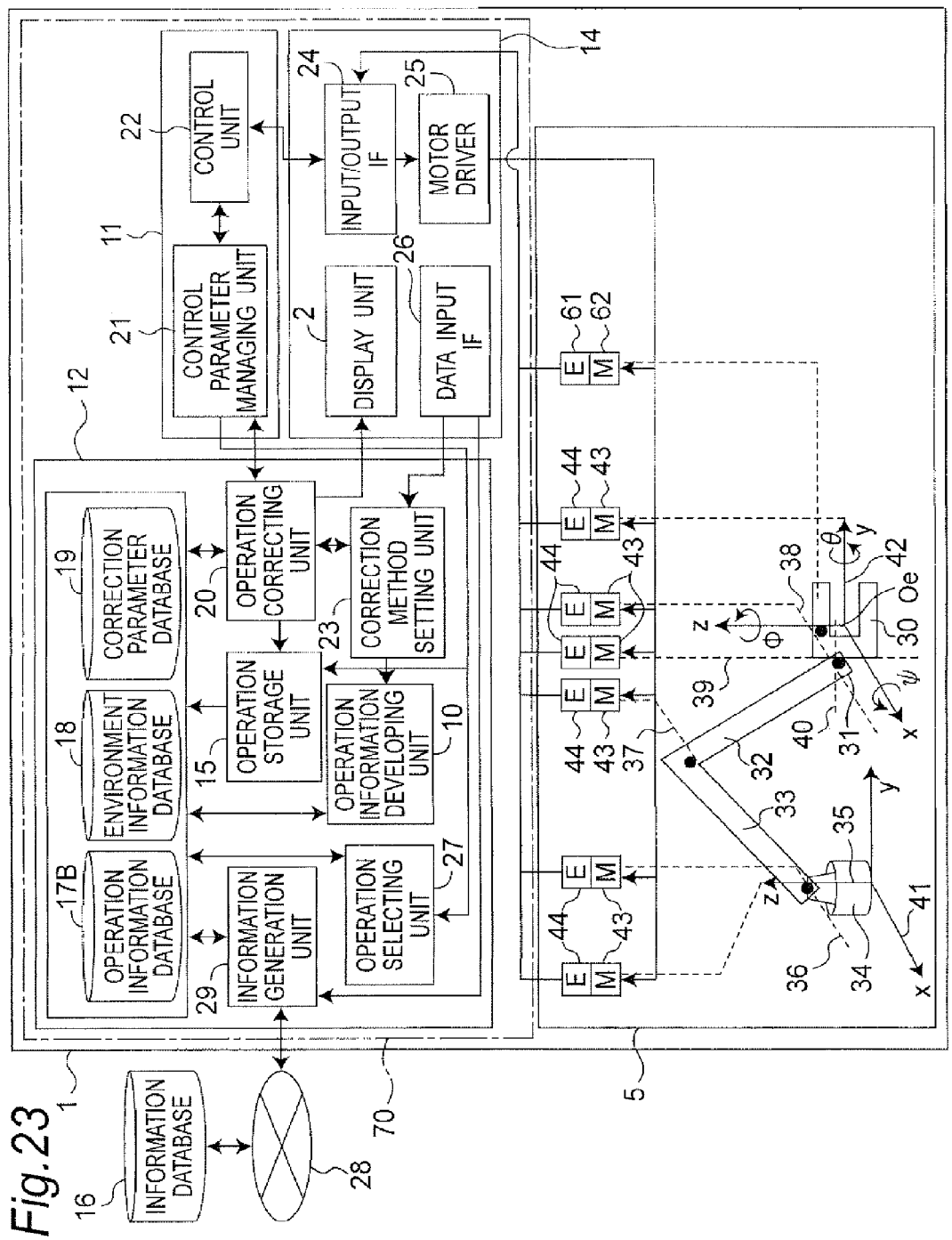
FIG. 23 is a view showing detailed structures of the control apparatus for a robot arm and the robot arm to be controlled that form a robot system in the third embodiment of the present invention.

FIG. 23 is a view showing detailed structures of the robot arm 5 to be controlled and a control apparatus 70 for the robot arm 5, which form the robot system 1. As shown in FIG. 23 in detail, the control apparatus 70 of the robot arm 5 is provided with a control apparatus main body unit 11, an operation generation device 12 that generates operations of the robot arm 5, and a peripheral apparatus 14. In FIG. 23, since the robot arm 5, the peripheral apparatus 14, the control apparatus main body unit 11, the operation selecting unit 27 and the correction method setting unit 23 are the same as those of the first embodiment, the descriptions thereof will not be given. The third embodiment is different from the aforementioned embodiments in that an environment information database 18, a correction parameter database 19, an information generation unit 29 and an operation information developing unit 10 are newly installed.

As shown in FIG. 24, an operation information database 17B corresponds to the operation information database 17 of the first embodiment or the operation information database 17A of the second embodiment, and information relating to an action of the robot arm 5, such as a position and an orientation at a certain point of time, generated in the information generation unit 29, which will be described later, is stored in the operation information database 17B.

Moreover, the environment information database 18 stores pieces of information relating to an environment of the robot arm 5 in the case where the robot arm 5 and the person 4 carry out a job in cooperation with each other, that is, for example, pieces of information relating to tools, such as a tool 9 like a ladle and a tool 3 like a pot, required for the robot arm 5 to carry out the job, or pieces of information relating to an operation environment, such as a cooking apparatus 6 like an IH cooking heater or a gas heater, and the environment information is generated by the information generation unit 29, which will be described later, and stored in the environment information database 18 by the information generation unit 29.

Pieces of information relating to a type of parameters to be corrected upon correcting operation information of the operation information database 17B in the operation correction unit 20, which will be described later, are generated by the information generation unit 29, and stored in the correction parameter database 19 by the information generation unit 29. The operation correction unit 20, which will be described later, can function as one example of an environment information acquiring unit used for acquiring environment information relating to an environment in which the robot arm 5 is operated, or as one example of an operation information acquiring unit used for acquiring operation information therein.

The following description will discuss the operation information database 17B in detail.

The operation information database 17B stores, for example, pieces of information relating to operations of the robot arm 5 shown in FIG. 24, and those pieces of information relating to the "job ID", "operation ID", "position and orientation", "hand" and "progress information" are the same as those of the first embodiment; therefore, the description thereof will not be given.

Figures 25D, 25E:
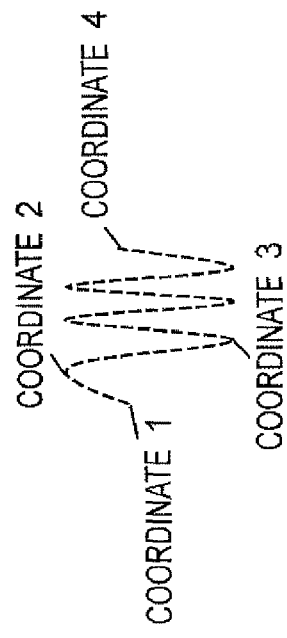
FIG. 25D is a view in a list format that indicates coordinate 1 to coordinate 4 of an operation template relating to a state in which the operation template ID is "3" and the type is "3" in the list of FIG. 25A.
FIG. 25E is a view illustrating an operation in which the hand of the robot arm moves along a zigzag course so as to stir the inside of a pan, which corresponds to the operation template information of FIG. 25D.
Figure 25F:
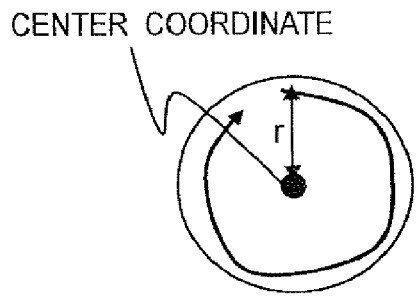
FIG. 25F is a view illustrating an operation in which the hand of the robot arm moves in a manner like drawing circles to stir the inside of the pan, which corresponds to the operation template information of FIG. 25B.

FIGS. 25A to 25G showpieces of information relating to "operation template ID" (codes used for identifying pieces of information relating to operation templates) of the operation information database 17B, that is, information relating to the operation templates. The information relating to the operation templates (operation template information) corresponds to geometrical information used for generating the tip unit position of the robot arm 5, and, more specifically, as shown in FIG. 25F, in the case where the tip unit of the robot arm 5 is operated in a manner like drawing circles, the operation template information is indicated by center coordinates and a radius, as shown in FIG. 25B. The following description will discuss the operation template information in detail.

The "operation template ID" of the operation information database 17B of FIG. 24, that is, the "operation template ID" used for identifying information relating to the operation template, indicates the "operation template ID" shown in FIG. 25A, and the operation information developing unit 10, which will be described later, generates a tip unit position and an orientation of the robot arm 5 based upon the operation template information and environment information to be described later. For example, in the case where the "operation template ID" of the operation information database 17B of FIG. 24 is "1", this means the operation template information in the case of the "operation template ID" of "1" in FIG. 25A.

Figure 26A:
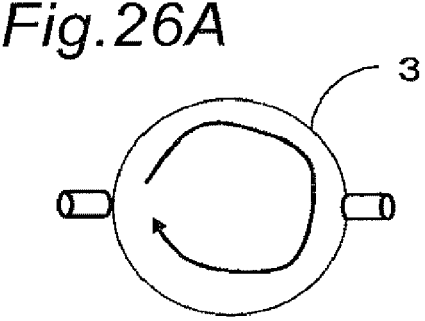
FIG. 26A is a view illustrating the operation of stirring the inside of a pan by using the hand of the robot arm based on the operation template information in the third embodiment of the present invention.
Figure 26B:
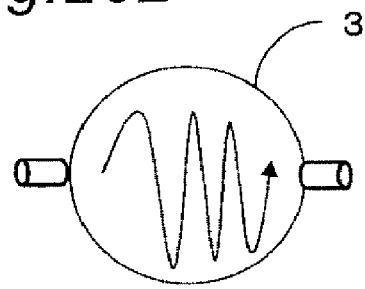
FIG. 26B is a view illustrating the operation of stirring the inside of the pan by using the hand of the robot arm based on the operation template information in the third embodiment of the present invention.
Figure 26C:
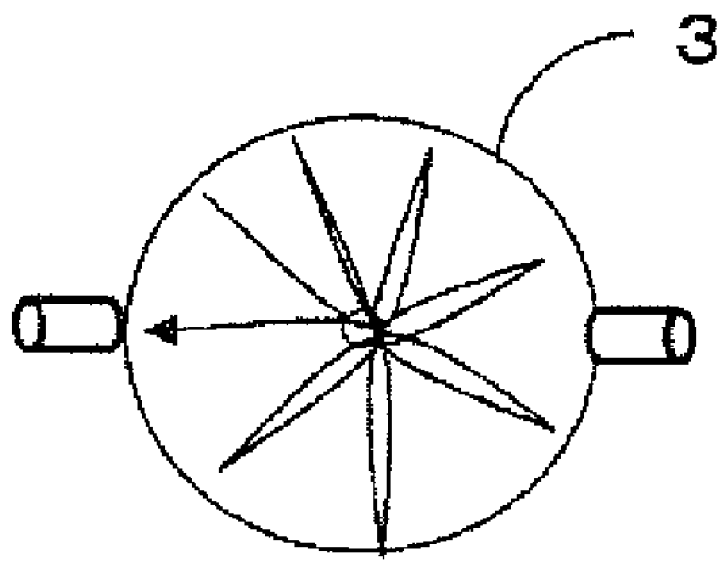
FIG. 26C is a view illustrating the operation of stirring the inside of the pan by using the hand of the robot arm based on the operation template information in the third embodiment of the present invention.

FIGS. 26A to 26C are views each showing a pot 3 viewed from above, and arrows in the views show tracks through which the tip unit of the robot arm 5 is moved. In this case, the operations of the operation template information are, for example, given as movements in which, as shown in FIG. 26A, the tip unit of the robot arm 5 is moved in a manner like drawing circles to stir the inside of the pot 3, movements in which, as shown in FIG. 26B, the tip unit of the robot arm 5 is moved in a zigzag course so as to stir the inside of the pot 3, and movements in which, as shown in FIG. 26C, the tip unit of the robot arm 5 is moved radially between the center of the pot 3 and the periphery thereof so as to stir the inside of the pot 3. For example, in the case of the movements shown in FIG. 26A, the "type" of the operation template information of FIG. 25A is described as "1", in the case of the movements shown in FIG. 26B, the "type" of the operation template information is described as "2", and in the case of the movements shown in FIG. 26C, the "type" of the operation template information is described as "3".

Figure 25G:
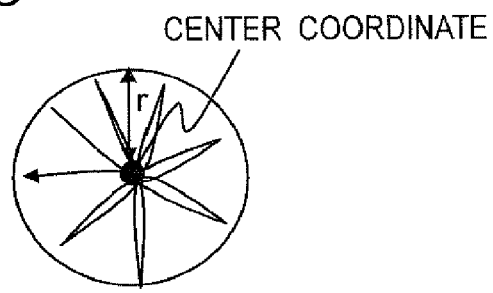
FIG. 25G is a view illustrating an operation in which the hand of the robot arm moves in a radial manner so as to stir the inside of the pan, which corresponds to the operation template information of FIG. 25C.

Moreover, in the case where the "type" of the operation template information of FIG. 25A is "1", the table of FIG. 25B is referred to, in the case where the "type" of the operation template information is "2", the table of FIG. 25C is referred to, and in the case where the "type" of the operation template information is "3", the table of FIG. 25D is referred to, and, thereafter, pieces of information of the "type ID" of the tables of FIGS. 25B to 25D corresponding to the "type ID" of FIG. 25A (codes used for identifying information relating to the type). For example, in the case where the "type" of the operation template information of FIG. 25A is "1", with the "type ID" being set to "1", this corresponds to the case where the "type ID" of FIG. 25B is "1". Therefore, as shown in FIG. 25F, center coordinates (such as ($x_{b1}$, $y_{b1}$, $z_{b1}$) and the like) and a radius (such as $r_{b1}$), used when the tip unit of the robot arm 5 is moved in a manner like drawing circles to stir the inside of the pot 3, are stored as shown in FIG. 25B. Moreover, in the case where the "type" of the operation template information of FIG. 25A is "2", with the "type ID" being set to "1", this corresponds to the case where the "type ID" of FIG. 25C is "1". Therefore, as shown in FIG. 25G, center coordinates of radial lines and a radius, used when the tip unit of the robot arm 5 is moved radially to stir the inside of the pot 3, are stored as shown in FIG. 25C. Furthermore, in the case where the "type" of the operation template information of FIG. 25A is "3", with the "type ID" being set to "1", this corresponds to the case where the "type ID" of FIG. 25D is "1". Therefore, as shown in FIG. 25E, coordinates of four points (such as coordinates 1 ($x_{d1}$, $y_{d1}$, $z_{d1}$), coordinates 2 ($x_{d2}$, $y_{d2}$, $z_{d2}$), coordinates 3 ($x_{d3}$, $y_{d3}$, $z_{d3}$), and coordinates 4 ($x_{d4}$, $y_{d4}$, $z_{d4}$)), used when the tip unit of the robot arm 5 is moved in a zigzag course so as to stir the inside of the pot 3, are stored as shown in FIG. 25D.

The respective values of the center coordinates, radius, coordinates and the like of FIGS. 25B, 25C and 25D are corrected in the information generation unit 29, which will be described later, based upon the environment information database 18, and then used for forming pieces of information of the tip unit position and orientation of the robot arm 5 by the operation information developing unit 10, which will be described later, and stored in the operation information database 17B. Note that, the operation template information is not intended to be limited by the above-mentioned three examples (FIGS. 25B, 25C and 25D), but may be any type of information as long as it is geometric information (geometric track information of the tip unit of the robot arm 5) capable of generating the tip unit position and orientation of the robot arm 5.

The information relating to "flag" of the operation information database 17B of FIG. 24 gives a value that indicates which piece of information among the tip unit position, orientation and operation template information of the robot arm 5, indicated by each of the "operation IDs", is valid, and more specifically, these are indicated by numeric value of 32 bits shown in FIG. 27. In FIG. 27, when the respective values of the tip unit position, orientation and operation template information of the robot arm are valid in the respective bits, these are indicated by "1", while, when the respective values of the tip unit position, orientation and operation template information are invalid therein, these are indicated by "0". For example, in the 0th bit, when the value of the x-coordinate of the tip unit position of the robot arm 5 is valid, "1" is given thereto, while when the value of the x-coordinate of the tip unit position is invalid, "0" is given thereto; in the 1st bit, when the value of the y-coordinate of the tip unit position of the robot arm 5 is valid, "1" is given thereto, while when the value of the y-coordinate of the tip unit position is invalid, "0" is given thereto; in the 2nd bit, when the value of the z-coordinate of the tip unit position of the robot arm 5 is valid, "1"

is given thereto, while when the value of the z-coordinate of the tip unit position is invalid, "0" is given thereto; and successively, in the 3rd, 4th and 5th bits, the validity of each of parameters $\phi$, $\theta$, $\phi$ of the orientation is indicated (that is, "1" is given thereto when it is valid, while "0" is given thereto when it is invalid), and in the 6th bit, the validity of the operation template information is indicated (that is, "1" is given thereto when it is valid, while "0" is given thereto when it is invalid). Moreover, with respect to the information relating to "flag", since more bits (32 bits) are prepared for expansion in the future, bits from the 7th bit to the 31st bit are not used so that "0" is given to each of these bits in this example. In FIG. 27, since "1" is given to each of the 0th bit to the 2nd bit, only the pieces of information of x, y, z are indicated as valid among the pieces of operation information, and since "0" is given to each of the 3rd bit to 5th bit, even when any value is stored as the values of $\Phi$, $\theta$, $\phi$ and operation template information, these values are defined as invalid.

Information relating to "time" in the operation information database 17B in FIG. 24 indicates time during which each of the operations of the robot arm 5 is executed, and it is indicated that each of the operations stored in "operation ID" is carried out in a period of "time" stored as the information relating to "time". That is, "time" represents not the absolute time, but the relative time from the previous operation. Moreover, in the case where the operation template information of the operation indicated by "operation ID" is valid, the "time" indicates a period of time required for the operation template information to be executed. In the case where the tip unit position and orientation of the robot arm 5 of the operation indicated by the "operation ID" are valid, the "time" indicates a period of time required for the robot arm 5 to be moved to a specified position and orientation.

In the operation information database 17B of FIG. 24, "environment information ID" (codes used for identifying pieces of environment information) includes two kinds of "environment information IDs". Information relating to "ambient environment" indicated by the first of the "environment information IDs" corresponds to information relating to the ambient environment in which the robot arm 5 is operated, and, for example, in the case where the robot arm 5 is carrying out a stirring job, the information represents the pot 3 or the like. Information relating to "grabbed object" indicated by the second "environment information ID" corresponds to information relating to an object grabbed by the robot arm 5, and, for example, in the case where the robot arm 5 is carrying out a stirring job, the information represents the ladle 9 or the like grabbed by the robot arm 5. The respective "environment information IDs" are any of values included in "environment information IDs" shown in FIG. 28A, which will be described later, and correspond to pieces of information indicating under which environment the operation is carried out.

Information relating to "correction parameter ID" in the operation information database 17 in FIG. 24 (codes used for identifying pieces of information relating to correction parameters) corresponds to any of values in "correction parameter IDs" shown in FIG. 29, which will be described later, and indicates which parameter should be corrected in the operation correction unit 20, which will be described later.

Figure 28E:
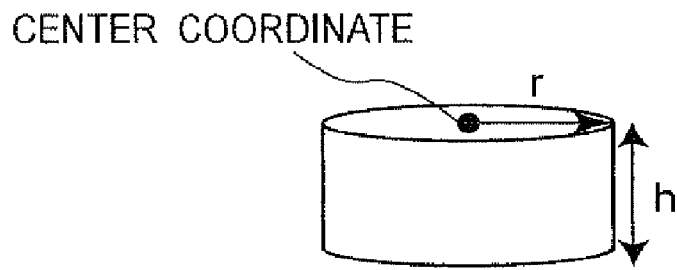
FIG. 28E is an explanatory view illustrating information relating to an object in environmental information of the environmental information database in the third embodiment of the present invention.
Figure 28F:
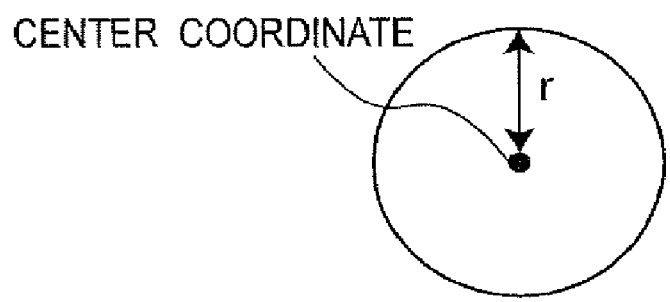
FIG. 28F is an explanatory view illustrating information relating to a circle in the environmental information of the environmental information database in the third embodiment of the present invention.
Figure 28G:
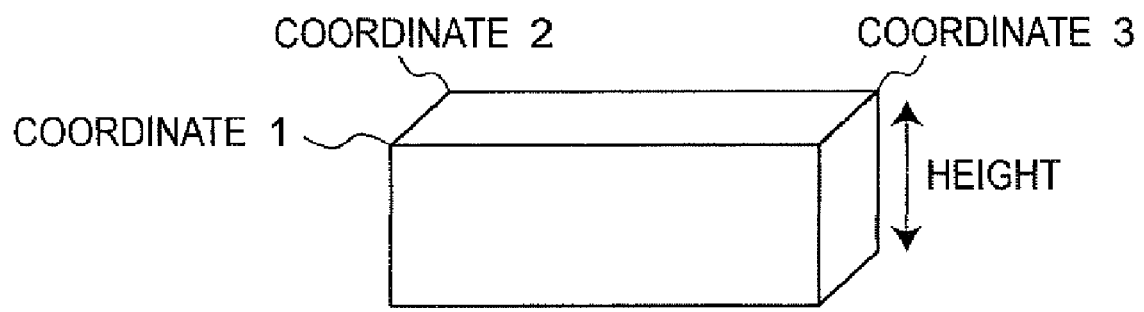
FIG. 28G is an explanatory view illustrating information relating to a rectangular parallelepiped object in the environmental information of the environmental information database in the third embodiment of the present invention.

The environment information database 18 is designed to have pieces of information relating to operation environments of the robot arm 5, for example, shown in FIG. 28A, including "environment IDs" representing environment information ID numbers used for identifying environments, "types" representing the types of the pieces of environment information and "type IDs" used for identifying the respective types. The respective pieces of information include pieces of information shown in FIGS. 28B, 28C and 28D stored in accordance with the "types" of environmental information. That is, in the case where the "type" of the environment information of FIG. 28A is "1", the table of FIG. 28B is referred to, in the case where the "type" of the environment information of FIG. 28A is "2", the table of FIG. 28C is referred to, and in the case where the "type" of the environment information of FIG. 28A is "3", the table of FIG. 28D is referred to. For example, in the case where the "type" of the operation template information of FIG. 28A is "1", with the "type ID" being set to "1", this corresponds to the case where the "type ID" of FIG. 28B is "1", and the coincided values (center coordinates, radius and height) are defined as the environment information of the "environment information ID". For example, FIG. 28B shows information representing an object having a cylinder shape as shown in FIG. 28E, which can approximately indicate the pot 3 for home use, or the like. The cylindrical object is represented by pieces of information including center coordinates of the bottom surface of a cylinder, the radius of the bottom surface and the height of the cylinder. Moreover, in the case where the "type" of the operation template information of FIG. 28A is "2", with the "type ID" being set to "1", this corresponds to the case where the "type ID" of FIG. 28C is "1", and the coincided values (center coordinates and radius) are defined as the environment information of the "environment information ID". FIG. 28C shows information representing a circle as shown in FIG. 28F, which can approximately indicate a portion of the IH cooking heater 6 on which the pot 3 is placed, or the like. More specifically, the information includes the center coordinates and the radius of a circle. In the case where the "type" of the operation template information of FIG. 28D is "3", with the "type ID" being set to "1", this corresponds to the case where the "type ID" of FIG. 28D is "1", and the coincided values (coordinates 1, coordinates 2, coordinates 3 and height) are defined as the environment information of the "environment information ID". This information represents a rectangular parallelepiped shape that can approximately indicate a sink in a home-use kitchen or a bathtub. More specifically, the top surface of the rectangular parallelepiped shape is represented by coordinates of a certain point on the top surface (in FIG. 28G, "coordinates 2" of one of corner portions of the top surface) and coordinates of two points (in FIG. 28G, "coordinates 1" and "coordinates 3" of two corners adjacent to "coordinates 2" of the corner of the upper surface) adjacent to the coordinates of the above certain point (in FIG. 28G, "coordinates 2" of one of corner portions of the top surface), and information relating to the height in a direction orthogonal to the top surface.

The correction parameter database 19 stores pieces of information, for example, as shown in FIG. 29, relating to types of parameters to be corrected upon correcting operation information of the operation information database 17B in the operation correction unit 20, which will be described later. More specifically, these pieces of information include "correction parameter IDs" used for identifying correction parameters, "operation information flags" that indicate which parameter of the operation information should be corrected for each of the "correction parameter IDs", "environment information flags" that indicate which parameter of the environment information should be corrected, and "operation template flags" that indicate which parameter of the operation template information should be corrected.

The "operation information flag" is given by a numeric value of 32 bits in the same manner as in FIG. 27, and among the parameters described by the "flags" of the operation information database 17B of FIG. 3, and with respect to the types of the parameters that can be corrected, a description is given in the same manner as in FIG. 27. More specifically, in the case where, with the x, y, z coordinates being valid in the operation information database 17B, only the x-coordinate is corrected, "1" is given to the 0th bit, with "0" being given to the other bits.

The "environment information flag" is given by a numeric value of 32 bits as shown in FIG. 30, and when the x-coordinate of the coordinates 1 is corrected, "1" is given to the 0th bit, while, when it is not corrected, "0" is given to the 0th bit. In this case, the presence or absence of correction on the center coordinates of FIG. 28B of the environment information database 18 is described on the coordinates 1 of FIG. 30. In the same manner, the presence or absence of correction on the center coordinates of FIG. 28C thereof is described on the coordinates 1 of FIG. 30.

The "operation template flag" is given by a numeric value of 32 bits as shown in FIG. 30, and in the same manner as in the "environment information flag", when the x-coordinate of the coordinates 1 is corrected, "1" is given to the 0th bit, while, when it is not corrected, "0" is given to the 0th bit. In this case, the presence or absence of correction on the center coordinates of FIGS. 25B and 25C in the operation template information is described on the coordinates 1 of FIG. 30.

Reference numeral 29 represents the information generation unit, which generates the operation information of the operation information database 17B, the environment information of the environment information database 18 and the correction parameter of the correction parameter database 19, based upon input information externally given, which will be described later, the input information from the data input IF 26 and the input information from the control parameter managing unit 21, and outputs the resulting data to the operation information database 17B, the environment information database 18 and the correction parameter database 19 respectively.

As described earlier, the operation template information of the operation information database 17B represents an operation of the tip unit of the robot arm 5 that is carried out in a certain fixed pattern, as shown in FIG. 26, and is formed by collecting pieces of geometric information from the information database 16 located in an external web server through the Internet 28 of FIG. 23, and the required pieces of the geometric information are stored as shown in FIG. 25. Additionally, those pieces of geometric information may be preliminarily stored by the manufacturer upon shipment.

In the environment information database 18, RF ID tags are attached, for example, to the pot 3 and the ladle 9, the sink, the IH cooking heater or the like relating to the jobs, and the positions of these objects are detected by a tag detector, respectively. Moreover, pieces of dimensional information of the objects are collected by the information generating unit 29 from the information database 16 located in the external web server through the Internet 28 and stored in the environment information database 18.

The environment may be photographed by using an image pickup device, such as a camera, and a model-matching process may be carried out between the resulting image data and the preliminarily stored object images, so that the dimension of the object or the position of the object may be extracted, and may be stored in the environment information database 18.

Moreover, by using an ultrasonic tag system, an ultrasonic transmitter may be attached to the object, and an ultrasonic wave emitted from the ultrasonic transmitter may be received by a plurality of ultrasonic wave receivers attached to the ceiling or the like, and based upon time differences of arrivals of the ultrasonic waves, a three-dimensional position (values of three-dimensional position coordinates) of the ultrasonic wave transmitter may be calculated, and the resulting data may be stored in the environment information database 18.

With respect to the information relating to the tip unit position and orientation of the robot arm 5 of the operation information database 17B, after its operation template information has been corrected by the operation information developing unit 10, which will be described later, based upon the environment information database 18, pieces of information relating to the tip unit position, orientation and time of the robot arm 5 are formed, and the resulting data is stored in the operation information database 17B. Upon carrying out an operation that is not included in the operation template information, in the same manner as in the first embodiment, the person 4 directly grabs the robot arm 5, and moves the robot arm in the impedance control mode, and by acquiring pieces of information relating to the tip position and orientation of the robot arm 5 every certain fixed period of time (for example, every 0.2 msec), the resulting data is stored in the operation information database 17B in association with time.

The operation information developing unit 10 uses the operation template information and the environment information from the environment information database 18 to generate pieces of operation information relating to the position, orientation and time of the operation information database 17B corresponding to the tip unit position of the robot arm 5. More specifically, the following description will discuss this operation by exemplifying a state in which the "job ID" is "1" in the operation information database 17B shown in FIG. 24, with the "operation ID" thereof being set to "1".

The operation information in the case of the "operation ID" of "1" represents information, with the 6th bit of the flag, indicated by a numeric value of 32 bits shown in FIG. 27, being set to "1", the rest of all the bits being set to "0" (only the operation template information is valid), the "operation template ID" being set to "1", and the "time" being set to 3 seconds. As shown in FIG. 26A, this operation corresponds to a stirring operation in which the tip unit of the robot arm 5 is moved in a manner like drawing circles to stir the inside of the pot 3, and this example indicates that the stirring operation is carried out in three seconds per circuit of the inside of the pot 3. Moreover, with respect to the environment information relating to the operation, since the "environment information ID" of the "ambient environment" is "1", with the "environment information ID" of the "grabbed object" being set to "4", the "type" corresponding to "1" of the "environment information ID" of FIG. 28A is "1", with the "type ID" being "1". Therefore, upon referring to "1" in the "type ID" of FIG. 28B, it is indicated that the operation is carried out in a cylindrical shape, like a pot 3 having center coordinates (0.1 m, 0.1 m, 0.1 m), a radius of 0.2 m and a height of 0.3 m. Moreover, since the "type" corresponding to "4" of the "environment information ID" is "1", with the "type ID" being "2", it is indicated that, upon referring to "2" in the "type ID" of FIG. 28B, the hand 30 of the robot arm 5 is grabbing an object having a cylindrical shape, like a ladle having center coordinates (0.1 m, 0.1 m, 0 m), a radius of 0.01 m and a height of 0.2 m.

Figure 31A:
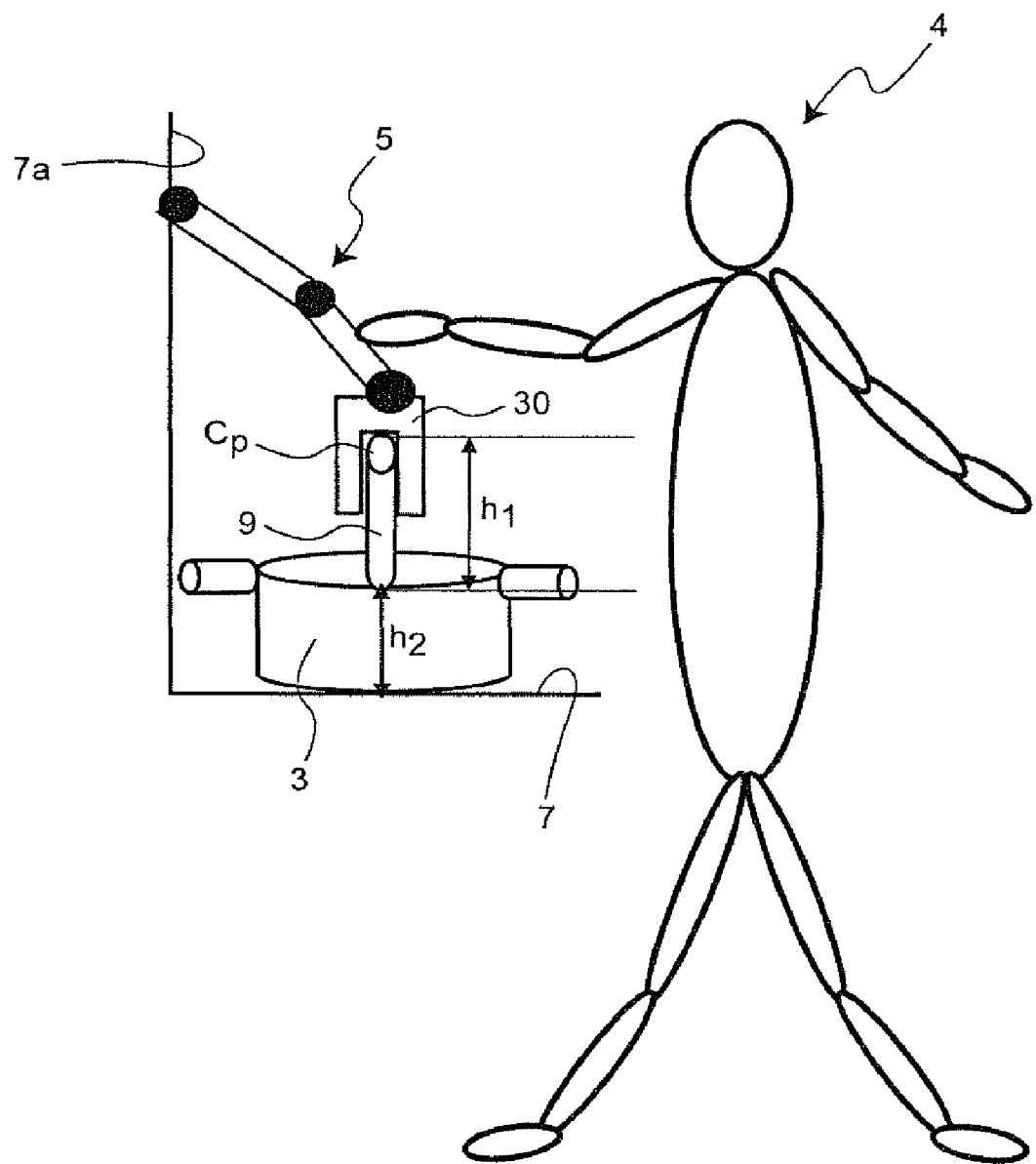
FIG. 31A is an explanatory view illustrating a control operating state of the robot arm of the control apparatus for a robot arm and a manipulating state by the person in the third embodiment of the present invention.

First, prior to generating the tip unit position and orientation information of the robot arm 5 from the operation template information, as shown in FIG. 31A, the person 4 directly grabs the robot arm 5 and directs the robot arm 5 near the pot 3 relating to the stirring job. This operation is realized by the impedance control mode, which will be described later, and, for example, at the time of a stopped state prior to the start of the stirring job, the impedance control mode is preliminarily set so that, by allowing the person 4 to grab the robot arm 5 and to apply a force to the robot arm 5, the robot arm 5 can be moved by the person 4.

Figure 31B:
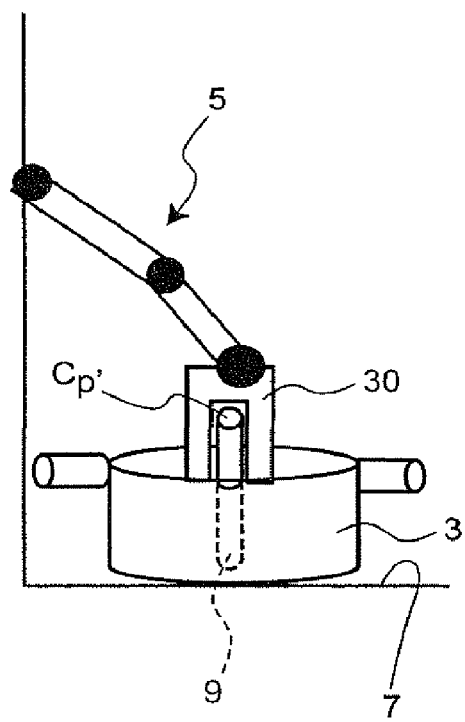
FIG. 31B is an explanatory view illustrating a control operating state of the robot arm by the control apparatus for a robot arm in the third embodiment of the present invention.

Next, upon receipt of an instruction for starting a stirring job from the correction method setting unit 23 through the data input IF 26, the operation information developing unit 10 finds the value of the z-axis component of the tip unit position of the robot arm 5 for the stirring job from the information of the environment information database 18. More specifically, supposing that a stirring job is carried out at a portion on the bottom side in the pot 3, that is, at a position raised slightly from the bottom of the pot 3, as shown in FIG. 31B, that the z-coordinate of a tip unit position $O_p$ of the robot arm 5 in FIG. 31A is indicated by $O_{pz}$, that the z-coordinate of a tip unit position $O_{p'}$ after a correcting process in FIG. 31B is indicated by $O_{pz'}$, and that the height of the ladle 9 and the pot 3 is indicated by $h_1$ (0.2 m), with the height of the pot 3 being indicated by $h_2$ (0.3 m), based upon the environment information database 18, the z-coordinate of the tip unit position $O_{p'}$ of the robot arm 5 after the correcting process is calculated based upon an equation $O_{pz'}=O_{pz}-(h_1-h_2)+\alpha$ by the operation information developing unit 10. In this case, supposing that the value of $\alpha$ is a positive value, it is possible to achieve a stirring operation at a position slightly raised from the bottom of the pot 3.

Figure 31C:
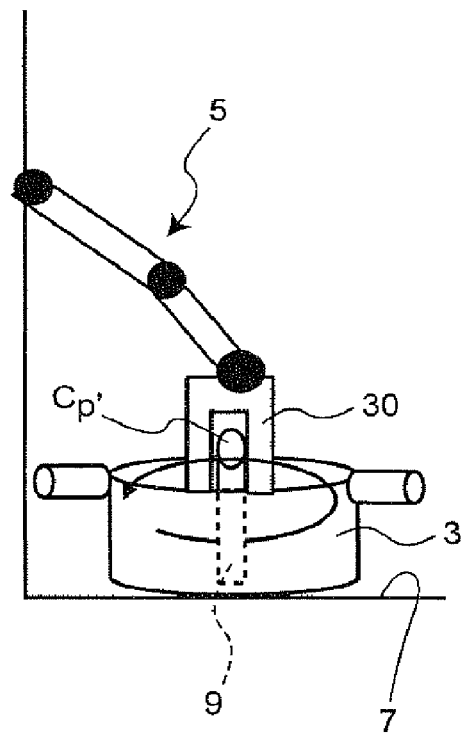
FIG. 31C is an explanatory view illustrating a control operating state of the robot arm by the control apparatus for a robot arm in the third embodiment of the present invention.
Figure 31D:
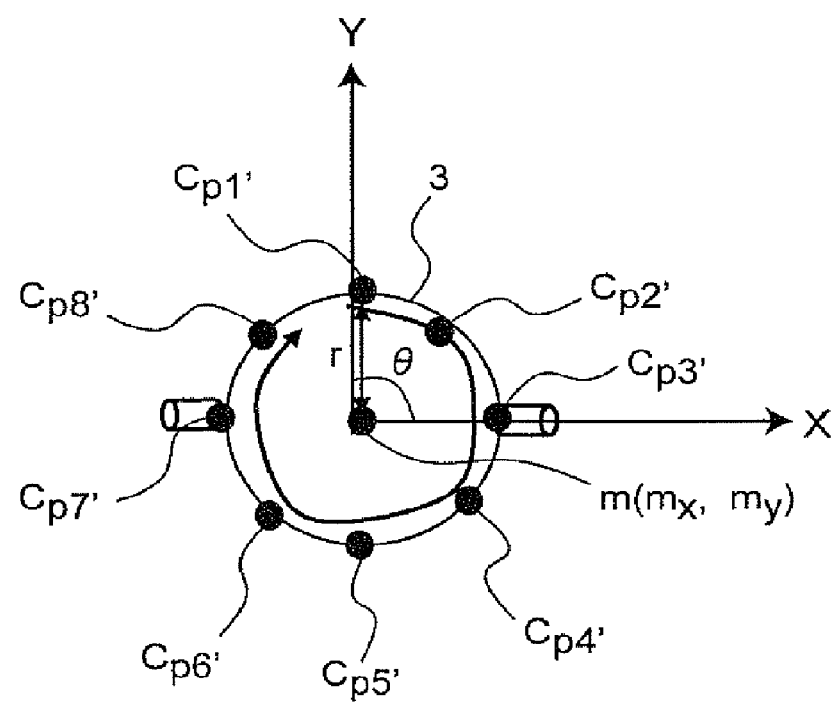
FIG. 31D is a plan view illustrating a control operating state of the robot arm by the control apparatus for a robot arm in the third embodiment of the present invention.

Next, the x-coordinate and y-coordinate are found by the operation information developing unit 10. More specifically, as shown in FIG. 31C, with the z-axis coordinate being held, the stirring operation is executed. FIG. 31D is a view showing the pot 3 viewed from above, and m ($m_x$, $m_y$) represents the center coordinates of the pot 3, with r representing a radius inside the pot 3. These pieces of information are stored in the environment information database 18 by the aforementioned information generation unit 29; more specifically, the "type ID" in FIG. 28B is stored as being set to "2". In FIG. 31D, $C_{p1'}, C_{p2'}, \ldots, C_{p8'}$ represent coordinates at respective positions obtained by dividing the circumference of the edge of the pot 3 into 8 equal portions, and by moving the tip unit position of the robot arm 5 successively from $C_{p1'}, C_{p2'}, \ldots$ to $C_{p8'}$, it is possible to achieve such operations of the tip unit of the robot arm 5 as to be approximately carried out in a manner like drawing circles. In FIG. 31D, $\theta$ represents an angle around the center of the pot 3, and the x-coordinate $x_1$ and the y-coordinate $y_1$ of the coordinates $C_{p1'}$ are found by the operation information developing unit 10 based upon equations, $x_1 = r \cos \theta + m_x$, $y_1 = r \sin \theta + m_y$, by using the radius r, the center coordinates m ($m_x$, $m_y$) and the angle $\theta$. In the same manner, the values of the x-coordinate and the y-coordinate of the respective coordinates $C_{p2'}, \ldots$ to $C_{p8'}$, are calculated by the operation information developing unit 10, and by substituting the $O_{pz'}$ serving as the coordinates of the z-axis thereto, eight coordinates of the coordinates $C_{p1'}, C_{p2'}, \ldots$ to $C_{p8'}$ can be found by the operation information developing unit 10. As described earlier, since the stirring operation completes one circuit in three seconds, the respective arrival times to the coordinates $C_{p1'}, C_{p2'}, \ldots$ to $C_{p8'}$ are indicated by 3/8 seconds. With respect to the orientation, the orientation of the tip unit of the robot arm 5 at the time of guidance by the person 4, as it is, is substituted thereto by the operation information developing unit 10. The eight coordinates of the coordinates $C_{p1'}, C_{p2'}, \ldots$ to $C_{p8'}$ and the respective pieces of time information thereof, generated by the operation information developing unit 10, are stored in columns "1" to "8" in the "operation IDs", with the "job ID" being set to "3", for example, in the operation information database 17B of FIG. 24, as shown in FIG. 24. At this time, with respect to the information of "flag" in the operation information database 17B, "1" is given to the bits (from 0th bit to 5th bit) relating to the position and orientation in FIG. 27, with "0" being given to the other bits, by the operation information developing unit 10. Moreover, with respect to the correction parameters, "3" is given to the "correction parameter ID", and the resulting data is stored in the operation information database 17B by the operation information developing unit 10, and since, among the correction parameters of FIG. 29, the "operation information flag" can be corrected in its position and orientation, "1" is given to the 0th bit to 5th bit of FIG. 27, with "0" being given to the other bits, by the operation information developing unit 10. With respect to the "environment information flag", since the pieces of information relating to the radius, center coordinates and height of the pot 3 can be corrected, "1" is given to the 0th, 1st and 2nd bits as well as to the 12th and 13th bits of FIG. 30, with "0" being given to the other bits, by the operation information developing unit 10. With respect to the "operation template flag", since the parameters of FIG. 28B can be corrected, "1" is given to the 0th, 1st, 2nd and 12th bits of FIG. 30, with "0" being given to the other bits, by the operation information developing unit 10.

Based upon the operation template information and information from the environment information database 18, the operation information developing unit 10 calculates the tip unit position and orientation of the robot arm 5, and stores the resulting operation information in the operation information database 17B, with its "job ID" of FIG. 24 being set to "3". Based upon the operation information stored in the operation information database 17B by the operation information developing unit 10, the operation correction unit 20 gives an instruction to the control parameter managing unit 21 so as to carry out a stirring job in the position control mode; thus, the stirring job in the position control mode is executed.

Next, the following description will discuss a correcting process of the stirring operation, by exemplifying a state in which, by confirming the state of the cooking materials in the pot 3 or the like, the person 4 tries to change the stirring operation in the pot 3 from an operation for stirring the proximity of the inner circumference of the pot 3 (see FIG. 22(a) and FIG. 22(d) that is a view obtained by viewing FIG. 22(a) from above) to an operation in which a stirring process is carried out more weakly centered on the slightly inner side of the pot 3 as shown in FIG. 22(c) (FIG. 22(f) is a view obtained by viewing FIG. 22(c) from above).

In the same manner as in the first embodiment, the person 4 changes the flag relating to the presence or absence of correction from "0" to "1" by using the correction method setting unit 23. Upon receipt of the flag "1" relating to the presence or absence of correction from the correction method setting unit 23, the operation correction unit 20 gives an instruction to the control parameter managing unit 21 so as to operate the robot arm 5 in the hybrid impedance control mode (the mode in which, while the robot arm 5 is being moved in the position control mode, the robot arm 5 is shifted in the impedance control in a direction in which the force detecting unit 53 has detected the force of the person 4), which will be described later.

Next, as shown in FIG. 22(b) (FIG. 22(e) is a view obtained by viewing FIG. 22(b) from above), when the person 4 directly grabs the robot arm 5, and applies a force to the robot arm 5 toward the inside of the pot 3 so as to stir weakly near the center of the pot 3 by using the ladle 9 grabbed by the hand 30 of the robot arm 5, while the robot arm 5 is being moved in the position control mode, by moving the robot arm 5 in the y-axis direction, that is, in a direction in which the force applied by the person 4 is detected by the force detection unit 53 in the impedance control mode, the stirring operation can be corrected in the hybrid impedance control mode, as shown in FIG. 22(c).

In this example, the correction is desirably made so as to make the radius of the stirring circle smaller; therefore, as in the case of "1" of "correction parameter ID" in FIG. 29, when the correction method setting unit 23 sets so that only the 12th bit in FIG. 30 of the operation template flag is changed from "0" to "1", only the 12th bit of FIG. 30 is set to "1" by the correction method setting unit. Upon receipt of the flag "1" relating to the presence or absence of correction from the correction method setting unit 23, the operation correction unit 20 gives the instruction to the control parameter managing unit 21.

In this example, upon changing the radius of the stirring circle, the operation is carried out, with the robot arm 5 being operated in the impedance control mode so as to be moved only in the x-axis direction and the y-axis direction. Upon receipt of a notice from the control unit 22 of the information of the tip unit position of the robot arm 5 moved by the force applied by the person 4, the operation correction unit 20 changes the value of the radius of the operation template information of FIG. 25B. More specifically, supposing that upon receipt of a force from the person 4, the robot arm 5 is moved by $\Delta r$ in a radial direction, the operation correction unit 20 subtracts $\Delta r$ from the value r of the radius. That is, the operation correction unit 20 calculates (r−$\Delta r$).

Next, by generating the tip unit position and orientation information of the robot arm 5 again by the operation information developing unit 10 based upon the correction template, the stirring operation to be carried out in a manner like drawing small circles near the center of the pot 3 can be realized as shown in FIG. 22(c).

Figure 32:
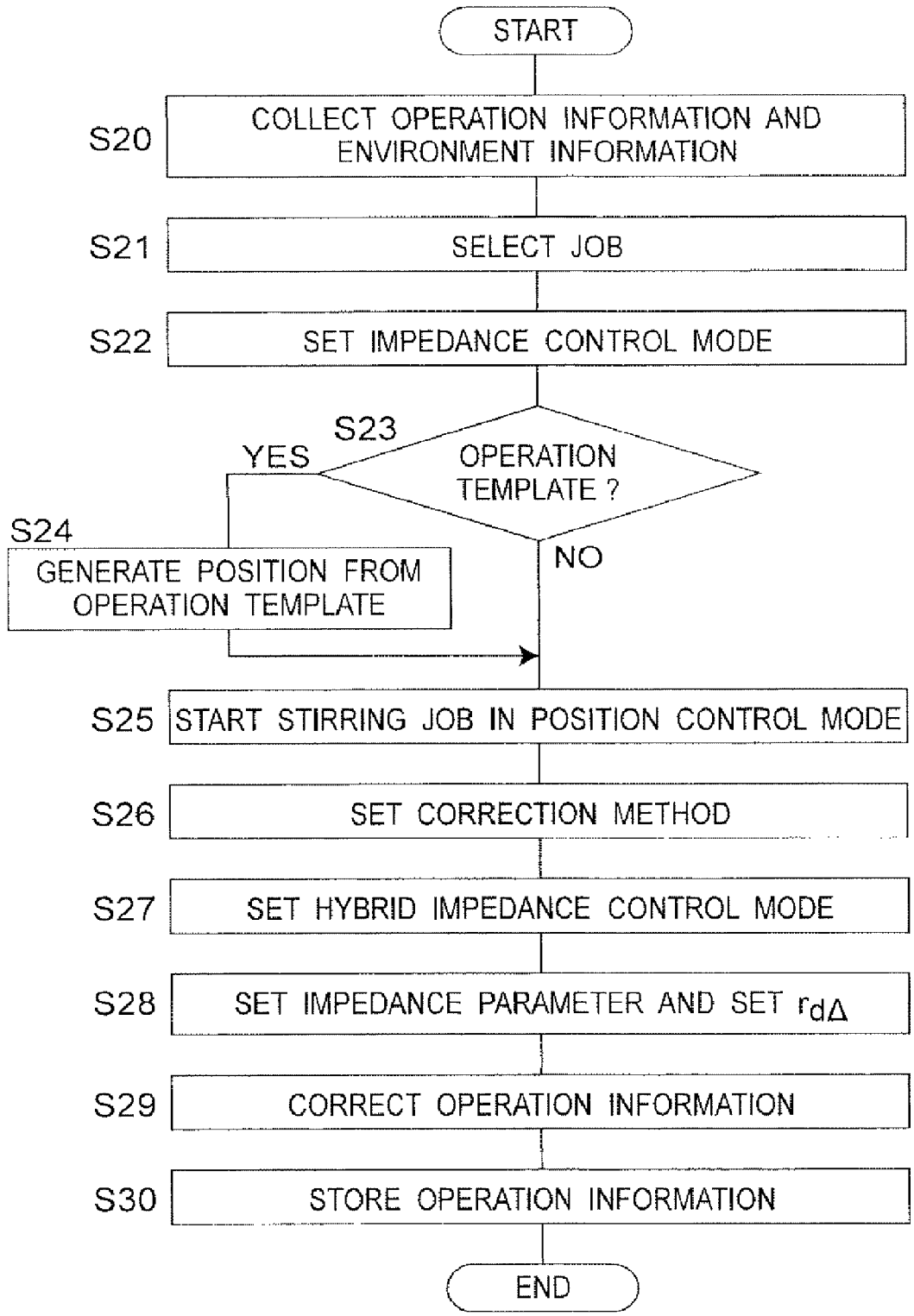
FIG. 32 is a flow chart showing operation steps relating to an operation correction unit, an information generating unit, an information selection unit, a correction method setting unit, an operation storage unit, an operation information database, an environmental information database, a correction parameter database, and a control parameter managing unit of the control apparatus for a robot arm in the third embodiment of the present invention.

Referring to a flow chart of FIG. 32, the following description will discuss operation steps of the above-mentioned operation information developing unit 10, operation correction unit 20, information generation unit 29, operation selecting unit 27, correction method setting unit 23, operation storage unit 15, operation information database 20, environment information database 18, correction parameter database 19 and control parameter managing unit 21.

The information generation unit 29 collects the operation template information and the environment information relating to the pot 3, the kitchen or the like from the information database 16 located on an external web server, through the Internet 28, or collects environment information by using image recognition or the like, and the collected information is stored in the operation information database 17B and the environment information database 18 by the information generation unit 29 (step S20).

Next, in the same manner as in step S40 of the aforementioned embodiment, the person 4 actually grabs the robot arm 5, and moves the robot arm 5 so as to allow the robot arm 5 to execute a stirring operation desired by the person 4 so that the person 4 selects a stirring job corresponding to the desired stirring operation from the operation selecting unit 27 from the list of jobs of the robot arm 5, and the selected job is set as the current job in the progress information of the operation information database 17B by the operation selecting unit 27 (step S21).

Next, when the current job is set as the progress information of the operation information database 17B, the operation correction unit 20 gives an operation instruction to the control parameter managing unit 21 so as to operate the robot arm 5 in the impedance control mode so that the impedance control mode is set, and the person 4 directs the robot arm 5 near the pot 3, while holding the robot arm 5 (step S22), and gives an instruction for starting a stirring job to the correction method setting unit 23 through the data input IF 26.

Next, the operation information developing unit 10 determines whether the operation template flag is valid or not with respect to the selected job (step S23). If it is not valid, the process proceeds to step S25, while if it is valid, the process proceeds to step S24. In the case where the selected job relates to an operation parameter (step S23) (more specifically, in the case where, if the operation template information is valid in the flag of FIG. 24, a determination is made so that the selected job is carried out by an operation indicated by the operation parameter), in step S24, the operation information developing unit 10 generates pieces of information of the tip unit position, orientation and time of the robot arm 5 from the environment information and operation parameter.

In step S25, by the instruction from the operation correction unit 20, the control unit 22 starts a stirring operation in the position control mode through the control parameter managing unit 21 (step S25).

Next, in the case where, in the selected operation, the pieces of information of the tip unit position and orientation of the robot arm 5 are valid, the control unit 22 starts the stirring job by using the corresponding values (step S25).

Next, the correction method setting unit 23 sets a correcting method. More specifically, by allowing a person to set from "0" to "1" in the correction method setting unit 23 by an inputting process through the data input IF 26, the flag information relating to the presence or absence of correction is set from "0" to "1" in the operation information database 17B through the data input IF 26 and the correction method setting unit 23; thus, the correction method setting unit 23 carries out setting processes, such as starting of the correcting operation (step S26). In the case where the presence of correction is set (in the case where the flag relating to the presence or absence of correction is set from "0" to "1"), upon receipt of the information of the flag "1" of the presence or absence of correction outputted from the correction method setting unit 23, the operation correction unit 20 gives an instruction to the control parameter managing unit 21 so as to carry out an operation in the hybrid impedance control mode so that the hybrid impedance control mode is set (step S27). Upon receipt of the operation instruction for the hybrid impedance control mode from the control parameter managing unit 21, the control unit 22 allows the motor driver 25 to input a control instruction value to the motors 43 and 62 through the input/output IF 24 so that the robot arm 5 starts an operation in the hybrid impedance control mode. In the case where the absence of correction is set (in the case where the flag relating to the presence or absence of correction is not altered, and left as "0", or when the flag relating to the presence or absence of correction is set from "1" to "0"), the operation correction unit 20 gives an instruction to the control parameter managing unit 21 so as to carry out an operation in the position control mode so that the position control mode is set, and thereafter, the robot arm 5 is operated without any correction, in the position control mode.

Next, in an attempt to regulate the operation in the impedance control mode at the time of the hybrid impedance control mode in accordance with the correction parameter, the impedance parameter is set, or the tip unit position and orientation target correcting output $r_{d\Delta}$ of the robot arm 5 to be outputted by the impedance calculation unit 51 is set (step S28). As described earlier, the setting of the impedance parameter is carried out by inputting such an instruction as to change the correction parameter flag to be desirably corrected to "1" from the operation correction unit 20 to the control parameter managing unit 21 through the data input IF 26 and the correction method setting unit 23. Moreover, upon setting the tip unit position and orientation target correcting output $r_{dΔ}$ to be outputted by the impedance calculation unit 51, in accordance with the parameter to be corrected, which is inputted from the control parameter managing unit 21 to the impedance calculation unit 51, the setting of the tip unit position and orientation target correcting output $r_{dΔ}$ to be outputted from the impedance calculation unit 51 to the positional error calculation unit 80 is altered.

Next, when the person 4 grabs the robot arm 5 and applies a force to the robot arm 5 in a direction to be desirably corrected, the operation correction unit 20 corrects the operation information of the operation information database 17B (step S29).

Next, the operation information corrected by the operation correction unit 20 is stored in the operation information database 17B by the operation storage unit 15 (step S30).

As described above, by preparing the operation information database 17B having the operation template information and the environment database 18, it becomes possible to eliminate the necessity of the person 4 having to generate all the tracks of the robot arm 5, and consequently to provide an efficient job. Moreover, since the parameter type of the operation template information to be corrected can be set by the correction parameter database 19, the person 4 is allowed to easily correct a radius of a stirring operation or the like, by directly grabbing the robot arm 5.

Note that, in the third embodiment, the correction parameter is used for correcting the parameter of the operation template information; however, the environment information radius is prepared as a correction parameter, and by giving an instruction for correcting one portion of parameters of the environment information (more specifically, the radius of the pot 3), the same effects can be obtained.

Moreover, in the third embodiment, the correction parameter is used for correcting the parameter of the operation template information (more specifically, the radius of a stirring operation); however, the height of the stirring operation may be corrected in the same manner as in the first embodiment.

(Fourth Embodiment)

Since the basic structure of a control apparatus 70 of the robot arm 5 in accordance with a fourth embodiment of the present invention is the same as that of the first embodiment and the third embodiment, descriptions for the common portions will not be given, and the following description will discuss only different portions in detail.

As shown in FIG. 33(*a*) (FIG. 33(*d*) is a view taken by viewing FIG. 33(*a*) from above), the following description will be given by exemplifying an operation in which a stirring job is carried out in a zigzag manner in a pot 3 by using the robot arm 5 of a robot system 1.

FIG. 34 shows an operation information database 17C used for carrying out a stirring job in a zigzag manner (operation information database 17C disposed at the position of the operation information database 17B in place of the operation information database 17B of FIG. 23), and since the definitions of the respective parameters are respectively the same as those of the third embodiment, the descriptions thereof will not be given.

In the same manner as in the third embodiment, the operation information developing unit 10 uses the operation template information and the environment information from the environment information database 18 to generate pieces of operation information relating to the position, orientation and time of the operation information database 17C corresponding to the tip unit position of the robot arm 5. More specifically, the following description will discuss this operation by exemplifying a state in which the "job ID" of the operation information database 17C is "1" in the operation information database 17C shown in FIG. 34, with the "operation ID" thereof being set to "1".

The operation information in the case of the "operation ID" of "1" represents information, with the 6th bit of the flag, indicated by a numeric value of 32 bits shown in FIG. 27, being set to "1", the rest of all the bits being set to "0" (only the operation template information is valid), and the "operation template ID" is "1", with the "time" being set to 3 seconds. As shown in FIG. 26B, this operation corresponds to a stirring operation in which the robot arm 5 stirs the inside of the pot 3 in a zigzag manner, and this example indicates that the stirring operation is carried out for three seconds per cycle (one cycle corresponds to "a reversed V-letter-shaped movement" shown in FIG. 33(*g*)). Moreover, in the same manner as in the third embodiment, with respect to the environment information relating to the operation, since the "environment information ID" of the "ambient environment" is "1", with the "environment information ID" of the "grabbed object" being set to "4", the "type" corresponding to "1" of the "environment information ID" of FIG. 28A is "1", with the "type" being "1" and the "type ID" also being "1". Therefore, upon referring to the case where the "type ID" of FIG. 28B is "1", it is indicated that the operation is carried out in a cylindrical shape, like a pot 3 having center coordinates (0.1 m, 0.1 m, 0.1 m), a radius of 0.2 m and a height of 0.3 m (that is, a stirring operation is carried out in a zigzag manner). Moreover, since the "type" corresponding to "4" of the "environment information ID" is "1", with the "type ID" being "2", and therefore, upon referring to the case where the "type ID" of FIG. 28B is "2", it is indicated that the hand 30 of the robot arm 5 is grabbing an object having a cylindrical shape, like a ladle 9 having center coordinates (0.1 m, 0.1 m, 0 m), a radius of 0.01 m and a height of 0.2 m.

First, prior to generating the tip unit position and orientation information of the robot arm 5 from the operation template information, as shown in FIG. 31A, the person 4 directly grabs the robot arm 5 and directs the robot arm 5 near the pot 3 relating to the stirring job.

Next, upon receipt of an instruction for starting a stirring job from the correction method setting unit 23 through the data input IF 26, the operation information developing unit 10 finds the value of the z-axis component of the tip unit position of the robot arm 5 for the stirring operation from the information of the environment information database 18. More specifically, supposing that a stirring operation is carried out at a portion slightly raised from the bottom of the pot 3, as shown in FIG. 31B, that the z-coordinate of a tip unit position $O_p$ of the robot arm 5 in FIG. 31A is indicated by $O_{pz}$, that the z-coordinate of a tip unit position $O_{p'}$ of the robot arm 5 after a correcting process in FIG. 31B is indicated by $O_{pz'}$, and that the heights of the ladle 9 and the pot 3 are respectively indicated by $h_1$ (0.2 m) and $h_2$ (0.3 m), based upon the environment information database 18, the z-coordinate of the tip unit position $O_{p'}$ of the robot arm 5 after the correcting process is calculated based upon an equation $O_{pz'} = O_{pz} - (h_1 - h_2) + α$ by the operation information developing unit 10. In this case, supposing that the value of α is a positive value, it is possible to achieve a stirring operation at a position slightly raised from the bottom of the pot 3.

Figure 35A:
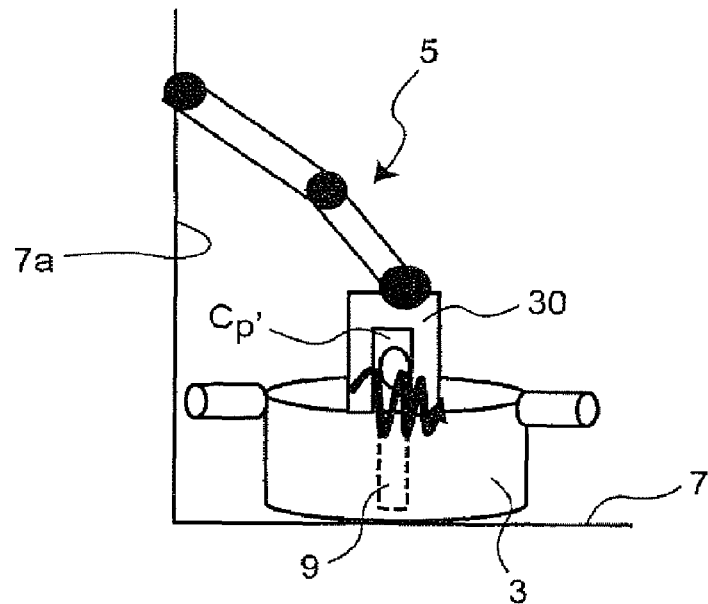
FIG. 35A is an explanatory view showing an operating state of the control apparatus for a robot arm in the fourth embodiment of the present invention.
Figure 35B:
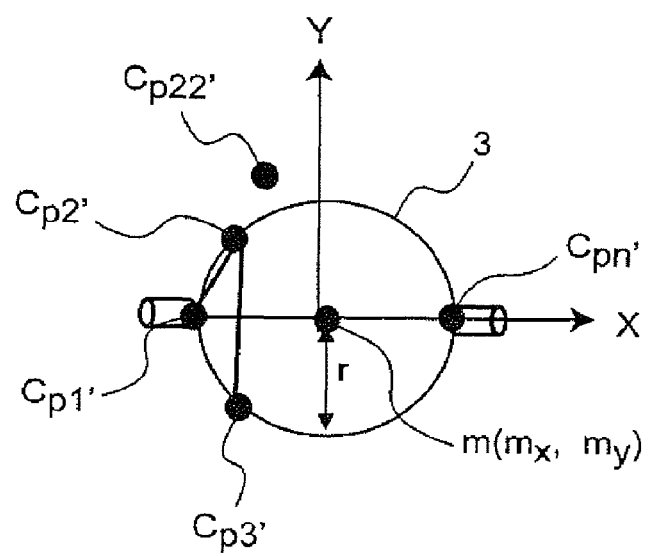
FIG. 35B is a plan view illustrating an operating state of the control apparatus for a robot arm in the fourth embodiment of the present invention.
Figure 35C:
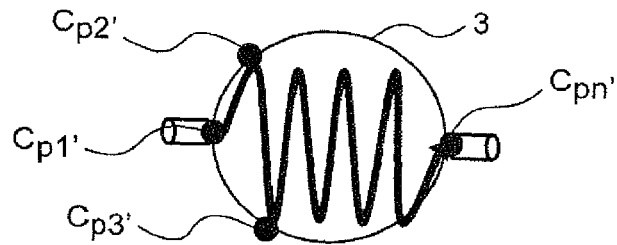
FIG. 35C is a plan view illustrating an operating state of the control apparatus for a robot arm in the fourth embodiment of the present invention.
Figure 35D:
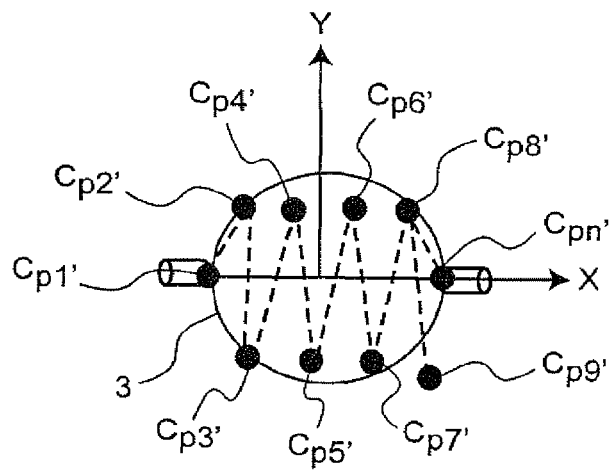
FIG. 35D is a plan view illustrating an operating state of the control apparatus for a robot arm in the fourth embodiment of the present invention.

Next, the x-coordinate and y-coordinate are found by the operation information developing unit 10. More specifically, as shown in FIG. 35A, with the z-axis coordinate being held, the stirring operation is executed. FIG. 35B is a view showing the pot 3 viewed from above, and m ($m_x$, $m_y$) represents the center coordinates of the pot 3, with r representing a radius inside the pot 3. These pieces of information are stored in the environment information database 18 by the aforementioned information generation unit 29; more specifically, the "type ID" in FIG. 28B is stored as being set to "2". By moving the tip unit position of the robot arm 5 successively from coordinates $C_{p1'}$, $C_{p2'}$, $C_{p3'}$, ... to coordinates $C_{pn'}$ repeatedly, it is possible to achieve a stirring operation in which the tip unit of the robot arm 5 is moved in a zigzag manner as shown in FIG. 35C.

Figure 35E:
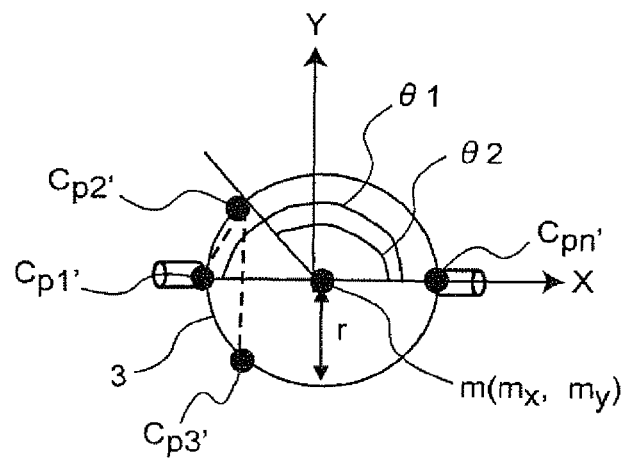
FIG. 35E is a plan view illustrating an operating state of the control apparatus for a robot arm in the fourth embodiment of the present invention.

More specifically, $\theta_1$ of FIG. 35E represents an angle around the center of the pot 3, and the x-coordinate $x_1$ and the y-coordinate $y_1$ of the coordinates $C_{p1'}$ are found based upon $x_1 = r \cos \theta_1 + m_x$ and $y_1 = r \sin \theta_1 + m_y$, by using the radius r, the center coordinates m ($m_x$, $m_y$) and the angle $\theta_1$, by the operation information developing unit 10. The coordinates $C_{p2'}$ are defined as values obtained by adding values ($d_{x1}$, $d_{x2}$) that are calculated by subtracting the respective x-coordinate and y-coordinate of coordinates 1 from the respective x-coordinate and y-coordinate of coordinates 2 of FIG. 25E in the operation information developing unit 10, to the coordinates $C_{p1'}$ by the operation information developing unit 10. In the case where the coordinates $C_{p2'}$, calculated by the above-mentioned method in the operation information developing unit 10, are located out of the pot 3 as indicated by coordinates $C_{p22'}$ of FIG. 35B, calculations are carried out by the operation information developing unit 10 based upon $x_2 = r \cos \theta_2 + m_x$ and $y_2 = r \sin \theta_2 + m_y$. The x-axis and y-axis coordinates of the coordinates $C_{p3'}$ are obtained by adding values that are calculated by subtracting the coordinates 2 from the coordinates 3 in FIG. 25E by the operation information developing unit 10 to the coordinates $C_{p2'}$ by the operation information developing unit 10. The coordinates $C_{p4'}$ are obtained by adding values that are calculated by subtracting the coordinates 3 from the coordinates 2 in FIG. 25E by the operation information developing unit 10 to the coordinates $C_{p3'}$ by the operation information developing unit 10. In the same manner as in the coordinates $C_{p3'}$, the coordinates $C_{p5'}$ are calculated by the operation information developing unit 10 based upon the coordinates $C_{p5'}$=(coordinates 3−coordinates 2)+$C_{p4'}$, and in the same manner as in the coordinates $C_{p4'}$, the coordinates $C_{p6'}$ are calculated by the operation information developing unit 10 based upon the coordinates $C_{p6'}$=(coordinates 2−coordinates 3)+$C_{p5'}$; thus, the coordinates $C_{p7'}$, coordinates $C_{p8'}$ and coordinates $C_{p9'}$ are successively calculated by the operation information developing unit 10, respectively.

At the time when the coordinates are located out of the pot 3 as indicated by the coordinates $C_{p9'}$, the calculation process by the operation information developing unit 10 is completed, and by eliminating the coordinates $C_{p9'}$ located out of the pot 3, the coordinates $C_{p1'}$, $C_{p2'}$, ... $C_{p7'}$, $C_{p8'}$, $C_{pn'}$ are set, and by substituting the aforementioned $O_{pz'}$ for these as the z-axis coordinate, the respective coordinates can be found. With respect to the time, since it takes 3 seconds for one cycle of "the reversed V-letter-shaped" operations shown in FIG. 33(g), for example, since it takes 3 seconds from the coordinates $C_{p3'}$, coordinates $C_{p4'}$, to coordinates $C_{p5'}$, it takes 3/2 seconds from the coordinates $C_{p4'}$ to coordinates $C_{p5'}$. Since the time period from the coordinates $C_{p2'}$ to coordinates $C_{p3'}$ correspond to about ½ cycle, it takes 3/2 seconds. Since the time period from the coordinates $C_{p1'}$ to coordinates $C_{p2'}$, as well as from the coordinates $C_{p8'}$ to coordinates $C_{pn'}$, corresponds to about ¼ cycle, it takes ¾ seconds.

Pieces of information of the nine coordinates, that is, the coordinates $C_{p1'}$, $C_{p2'}$, ..., $C_{pn'}$, generated by the operation information developing unit 10, and the respective points of time are stored in "1" to "9" in the "operation IDs", with the "job ID" being set to "4", for example, in the operation information database 17C of FIG. 34. At this time, with respect to the flag information in the operation database 17C, "1" is given to the bits (from 0th bit to 5th bit) relating to the position and orientation in FIG. 27, with "0" being given to the other bits.

Moreover, the correction parameter is stored with "the correction parameter ID" being set to "5", and among correction parameters of FIG. 29, since the position and orientation can be correctable relating to "the operation information flags", "1" is given from the 0th bit to the 5th bit of FIG. 27, with the other bits being set to "0". With respect to the "environment information flag", since the pieces of information relating to the radius, center coordinates and height of the pot 3 can be corrected, "1" is given to the 0th, 1st and 2nd bits as well as to the 12th and 13th bits, with "0" being given to the other bits. With respect to the "operation template flag", since the parameters of FIG. 28D can be corrected, "1" is given from the 0th bit to the 11th bit of FIG. 30, with "0" being given to the other bits.

Based upon the operation template information and information from the environment information database 18, the operation information developing unit 10 calculates the tip unit position and orientation of the robot arm 5, and stores the resulting operation information in the operation information database 17C, with its "job ID" of FIG. 34 being set to "4". Based upon the operation information stored in the operation information database 17C, the operation correction unit 20 gives an instruction to the control parameter managing unit 21 so as to carry out a stirring job in the position control mode so that the robot arm 5 is operation-controlled by the control unit 22; thus, the stirring operation in the position control mode is executed.

Next, the following description will discuss a correcting process of the stirring operation, by exemplifying a state in which, by confirming the state of the cooking materials in the pot 3 or the like, as shown in FIG. 33(c) (FIG. 33(f) is a view obtained by viewing FIG. 33(c) from above), the person 4 tries to change the stirring operation to an operation in which a stirring process is carried out more weakly centered on the slightly inner side of the pot 3 with a smaller amplitude.

In the same manner as in the first embodiment, the person 4 changes the flag relating to the presence or absence of correction from "0" to "1" by using the correction method setting unit 23. Upon receipt of the flag "1" relating to the presence or absence of correction from the correction method setting unit 23, the operation correction unit 20 gives an instruction to the control parameter managing unit 21 so as to operate the robot arm 5 in the hybrid impedance control mode (the mode in which, while the robot arm 5 is being moved in the position control mode, the robot arm 5 is shifted in the impedance control in a direction in which the force detecting unit 53 has detected the force of the person 4), which will be described later.

Next, as shown in FIG. 33(b) (FIG. 33(e) is a view obtained by viewing FIG. 33(b) from above), when the person 4 directly grabs the robot arm 5, and applies a force to the robot arm 5 toward the inside of the pot 3 so as to stir weakly near the center of the pot 3 by using the ladle 9 grabbed by the hand 30 of the robot arm 5, while the robot arm 5 is being moved in the position control mode, by moving the robot arm 5 in the y-axis direction, that is, in a direction in which the force applied by the person 4 is detected by the force detection unit 53 in the impedance control mode, the stirring operation can be corrected in the hybrid impedance control mode, as shown in FIG. 33(c).

In this example, since the coordinates 2 and coordinates 3 in FIG. 25E are desirably corrected so as to correct the amplitude of the stirring operation smaller in the y-axis direction, the operation correction unit 20 gives such an instruction as to set only the 3rd to 8th bits in FIG. 30 of the operation template flag to "1" as in the case of "4" in the "correction parameter ID" of FIG. 29 to the control parameter managing unit 21 through the data input IF 26 and the correction method setting unit 23. Upon changing the amplitude in this manner, in this example, settings may be made so as to allow the robot arm 5 to move only in the x-axis and y-axis directions in the impedance control. Upon receipt of the information of the tip unit position of the robot arm 5 moved by the force applied by the person 4 from the control unit 22, the operation correction unit 20 changes the value of the coordinates 2 and coordinates 3 of the operation template information of FIG. 25D. More specifically, supposing that upon receipt of a force from the person 4, the robot arm 5 is moved by Δr in the y-axis direction, the operation correction unit 20 subtracts Δr from the value of the y-coordinate of the coordinates 3, and the operation correction unit 20 adds Δr to the y-coordinate of the coordinates 4. Next, by generating the tip unit position and orientation information of the robot arm 5 again by the operation information developing unit 10, based upon the correction template, the stirring operation to be carried out near the center of the pot 3 with a smaller amplitude can be realized as shown in FIG. 33(c) (FIG. 33(f)).

The operation steps of the above-mentioned operation information developing unit 10, operation correction unit 20, information generation unit 29, operation selecting unit 27, correction method setting unit 23, operation storage unit 15, operation information database 20, environment information database 18, correction parameter database 19 and control parameter managing unit 21 are the same as those of the third embodiment; therefore, the description thereof will not be given.

As described above, by preparing the operation template information and the environment database 18, it becomes possible to eliminate the necessity of the person 4 having to generate all the tracks of the robot arm 5, and consequently to provide an efficient job. Moreover, since the parameter type of the operation template information to be corrected can be set by the correction parameter database 19, the person 4 is allowed to easily correct a radius of a stirring operation or the like, by directly grabbing the robot arm 5.

Moreover, by using the operation selecting unit 27 described in the first embodiment, the movement such as "a reversed V-letter-shaped movement" shown in FIG. 33(g), can be selected by the person 4 directly grabbing the robot arm 5 and allowing the robot arm 5 to move correspondingly; thus, the stirring job in a zigzag manner can be carried out.

(Fifth Embodiment)

Since the basic structure of a control apparatus 70 of the robot arm 5 in accordance with a fifth embodiment of the present invention is the same as that of the first embodiment, descriptions for the common portions will not be given, and the following description will discuss only different portions in detail.

Figure 36:
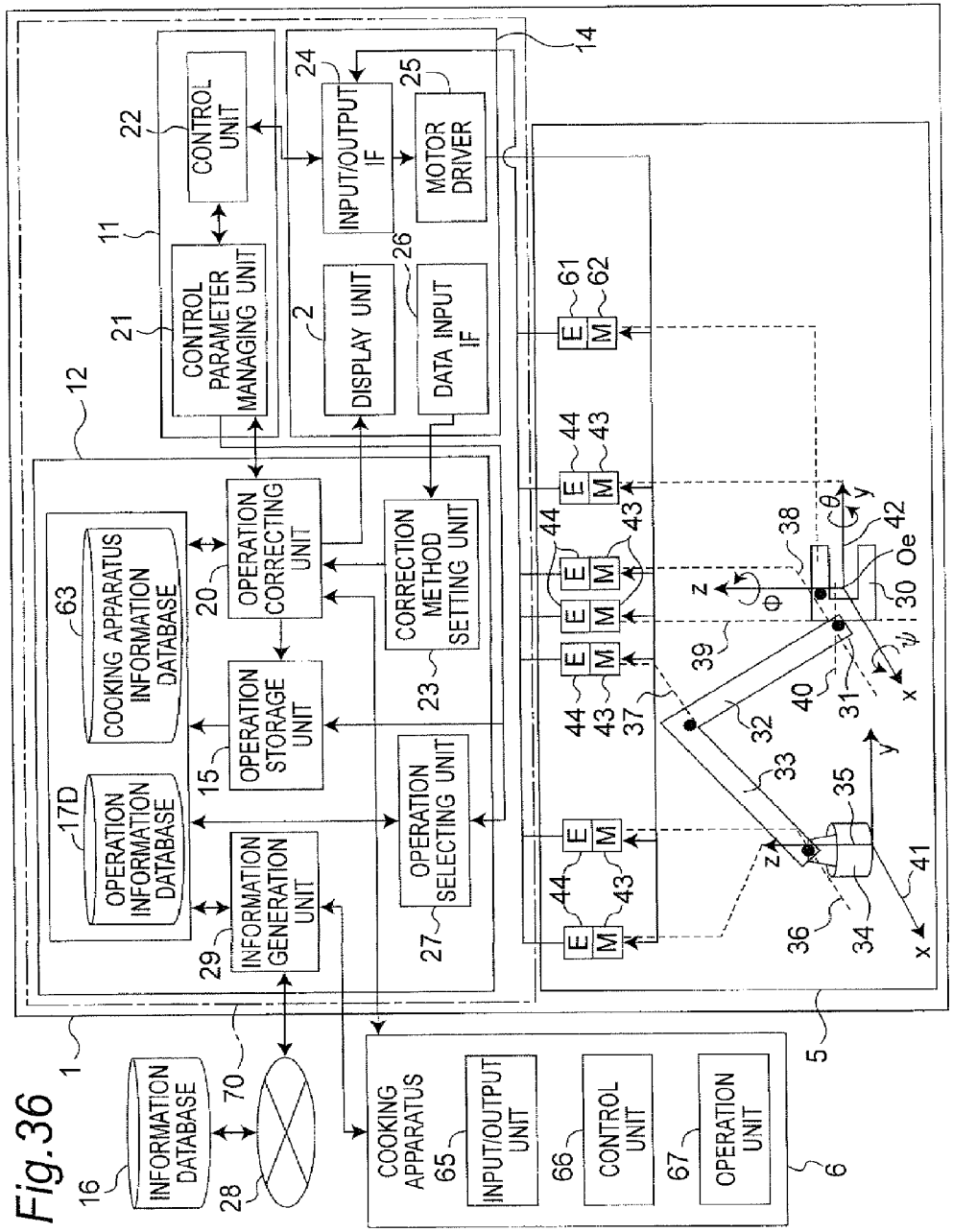
FIG. 36 is a view showing detailed structures of a control apparatus for a robot arm and the robot arm to be controlled that form a robot system in a fifth embodiment of the present invention.

FIG. 36 is a view showing detailed structures of the robot arm 5 to be controlled and the control apparatus 70 for the robot arm 5, which form the robot system 1. As shown in FIG. 36 in detail, in comparison with the control apparatus 70 of the robot arm 5 of FIG. 23 in the third embodiment that is provided with the control apparatus main body unit 11, the operation generation device 12 for generating operations of the robot arm 5 and the peripheral apparatus 14, the control apparatus 70 of the robot arm 5 of the fifth embodiment has the same robot arm 5, peripheral apparatus 14, control apparatus main body unit 11, operation selecting unit 27 and correction method setting unit 23; therefore, the description of these devices and units will not be given.

FIG. 37 shows one example of a cooking apparatus information database 63 that functions as one example of an operation information database 17D and a peripheral apparatus information database. Since the operation information database 17D is the same as that of the first embodiment, the description thereof will not be given.

The cooking apparatus information database 63 stores pieces of information (cooking apparatus information) relating to the state of the cooking apparatus 6. More specifically, "the cooking apparatus information" includes pieces of information of "an apparatus ID" (a code used for identifying pieces of information relating to the cooking apparatus 6 serving as the apparatus) that is an ID used for identifying the currently activated cooking apparatus 6 by an operation corresponding to the operation ID number, and "a control ID" (a code used for identifying pieces of information relating to the operation control of the cooking apparatus 6) used for indicating the operation state of the cooking apparatus 6. For example, "1" of "the apparatus ID", shown in FIG. 37, represents an IH cooking heater serving as one example of the cooking apparatus 6, "1001" of "the control ID" represents "heating over a strong flame" as one example of an operation state, "1002" of "the control ID" represents "heating over a medium flame" as another example of the operation state, and "1003" of "the control ID" represents "heating over a weak flame" as the other example of the operation state; thus, the corresponding instruction is generated by the information generation unit 29 to be described later.

Reference numeral 29 represents an information generation unit, and the information generation unit 29 collects pieces of cooking apparatus information, such as cooking time or heating degree, of the cooking apparatus 6, such as an electronic oven or an IH cooking heater, that is, another peripheral apparatus located around the robot arm 5, and stores the information in the cooking apparatus information database 63. The cooking apparatus information may be collected from an information database 16 located in an external web server through the Internet 28, by the information generation unit 29.

As shown in FIG. 36, the cooking apparatus 6 is provided with an input/output unit 65, a control unit 66 and an operation unit 67. The input/output unit 65 serves as an input/output interface with the robot system 1, and is connected with the operation correction unit 20 and the information generation unit 29 so that information input/output operations relating to the state of the cooking apparatus 6 are executed. The control unit 66 controls the cooking apparatus 6 in accordance with the state of the cooking apparatus 6 given through the input/output unit 65, and the operation unit 67 actually operates the cooking apparatus 6. More specifically, in the case of the IH cooking heater 6 shown in FIG. 1, the robot system 1 gives an instruction relating to heating degree information, and the control unit 66 controls so as to achieve the corresponding heating degree inputted by the control unit 66, and then the operation unit 67 carries out operations based upon the corresponding heating degree. Moreover, in the case where the person 4 has changed the heating degree manually, the corresponding heating degree information is transmitted to the robot system 1 through the input/output unit 65.

In the same manner as in the first embodiment, the operation correction unit 20 corrects the operation information of the operation information database 17D by allowing the person 4 to apply a force to the robot arm 5 during the operation of the robot arm 5 in the position control mode to be described later, based upon the position, orientation and time in the operation information database 17D. Moreover, with respect to the apparatus of "the apparatus ID" of the cooking apparatus 6 as one example of a peripheral apparatus corresponding to "the operation ID" being currently operated, the operation correction unit 20 acquires the current "control ID" at a timing in which the correction is started. Therefore, the operation correction unit 20 also functions as one example of a peripheral apparatus information acquiring unit used for acquiring peripheral apparatus information that is information relating to the peripheral apparatus. More specifically, in the case where "the apparatus ID" is "1", this corresponds to the IH cooking heater 6, and the operation correction unit 20 acquires information relating to the current heating degree of the IH cooking heater 6, from the input/output unit 65 of the IH cooking heater 6. In the case where "the control ID" acquired by the operation correction unit 20 is "1001" (heating strongly), "the control ID" is altered from "1001" (heating strongly) to "1003" (heating weakly), and the information of the altered "control ID" is transmitted from the operation correction unit 20 to the input/output unit 65 of the cooking apparatus 6. In the cooking apparatus 6, the operation is altered so that a stirring operation is carried out under the heating degree thus inputted (that is, in a weakly heating state in this example). Furthermore, in synchronized timing with the completion of the correction of the stirring operation (in the case where, the presence or absence of correction is set by the correction method setting unit 23, with the start of the correction (presence of correction) being set to "1", while the completion of the correction (absence of correction) is set to "0", at the timing or the time when "0" indicating the completion of the correction (absence of correction) is set), a setting is made so as to return to the original heating degree 1001.

With this arrangement, in the middle of the correction of the stirring operation, by setting the heating degree weaker, for example, in the IH cooking heater 6, it becomes possible to prevent burning or the like of the cooking materials.

In the case where, at the time of a correction, the heating degree has already been set to "1003" (heating weakly) and the degree cannot be made weaker, no alternation of the heating degree is carried out.

(Sixth Embodiment)

Since the basic structure of a control apparatus 70 of the robot arm 5 in accordance with a sixth embodiment of the present invention is the same as that of the first embodiment, descriptions for the common portions will not be given, and the following description will discuss only different portions in detail. Although the following description will be given in comparison with the first embodiment, the sixth embodiment may also be applied to the second to fifth embodiments respectively.

The first embodiment has described a structure in which the correction method setting unit 23 sets the flag relating to the presence or absence of correction as to whether or not the correction is carried out, stored in the operation information database 17; however, the following description will discuss in detail the other settings that can be stored in the operation information database 17.

Although the first embodiment has described the system in which the flag relating to the presence or absence of correction is switched by the data input IF 26, the following description will discuss another method.

In the same manner as in the first embodiment, when the robot arm 5 is executing a stirring operation in the position control mode, the person 4 grabs the robot arm 5, and applies a force in a desired direction to be corrected. In the case where, as shown in FIG. 38A, the force applied to the robot arm 5 by the person 4 is a certain threshold value (see "$t_1$" in FIG. 38A) or more, and the correction method setting unit 23 has determined that the state has continued for a certain period of time or more (see "time 1" of FIG. 38A), the flag relating to the presence or absence of correction, stored in the operation information database 17, is switched from "0" to "1" by the correction method setting unit 23 so as to provide a correctable state. At this time, force information is transmitted from the control unit 22 (force detection unit 53) to the operation method setting unit 23 through the control parameter managing unit 21 and the operation correction unit 20 in succession.

In the case where, in contrast, the correction method setting unit 23 has determined that the force applied thereto becomes smaller than the threshold value, the flag relating to the presence or absence of correction, stored in the operation information database 17, is switched from "1" to "0" by the correction method setting unit 23 so as to provide an uncorrectable state.

Moreover, in the case where, as shown in FIG. 38B, the correction method setting unit 23 has determined that a strong force is applied instantaneously, if the correction method setting unit 23 has further determined that, the applied force becomes the threshold value (see "$t_1$" of FIG. 38B) or more, but the time during which the force is applied is short (see "time 2" of FIG. 38B), the correction method setting unit 23 provides the uncorrectable state. Thus, even when a large force, such as a collision, is applied to the robot arm 5 instantaneously, it is possible to prevent the operation of the robot arm 5 from being erroneously corrected.

With the above-mentioned structure, the presence or absence of correction can be switched by the correction method setting unit 23, without using the data input IF 26, such as a button.

Moreover, another mode may be further stored in the operation information database 17 in which, after any correction has been carried out by the operation correction unit 20, in the case where the person 4 allows the flag relating to the presence or absence of correction to return from "1" to "0" through the data input IF 26, or in the case where the correction method setting unit 23 has determined that the force of the person 4 has become smaller than a certain threshold value, the correction method setting unit 23 determines that the correction is completed, so that when the correction is finished, operation information after the correction as to whether the corrected operation is carried out or the operation before the correction is carried out is set. In the case where, after the correction, "corrected operation" is executed, "1" is set in the flag as to "whether the corrected operation or the original operation is executed after the correction" shown in the second column of a mode shown in FIG. 39, while in the case where, after the correction, "the original operation" is again executed, "0" is set therein, and the resulting data is stored in the operation information database 17. In this setting, for example, when the flag as to "whether the corrected operation or the original operation is executed after the correction" stored in the operation information database 17 is set to "0", the operation of the robot arm 5 is corrected only in the case where the person 4 touches the robot arm 5, while, in the case where the person 4 releases his or her hand from the robot arm 5, the robot arm 5 is allowed to return to the original operation by the operation correction unit 20. In other words, only during a period in which the person 4 is touching the robot arm 5, another operation can be carried out.

Moreover, for another example, in the case where, after any correction has been carried out by the operation correction unit 20, the robot arm 5 is operated after the correction, settings are made as to whether, instead of the original operation, the corrected operation is carried out by the robot arm 5 (overwrite mode), or the original operation and the corrected operation are carried out alternately by the robot arm 5 (insertion mode), and the resulting data may be stored in the operation information database 17. In the case of "the overwrite mode", "1" is set in the flag as to "whether the overwrite mode or the insertion mode is carried out" shown in the third column of the mode shown in FIG. 39, while in the case of "the insertion mode", "0" is set therein, and the resulting data is stored in the operation information database 17. In this setting, for example, when the flag as to "whether the overwrite mode or the insertion mode is carried out", stored in the operation information database 17, is "0", the operation before the correction and the operation after the correction can be carried out alternately.

Moreover, in the case where, in the middle of the correcting operation by the operation correction unit 20 during the operation of the operation information database 17, the operation of the robot arm 5 is too fast, and it is difficult for the person 4 to directly grab the robot arm 5. Therefore, in the case where, while the robot arm 5 is being operated at a certain speed or more, the person 4 applies a force to the robot arm 5 to correct the operation, or in the case where "1" is set in the flag relating to "the presence or absence of correction" (in the case of the presence of correction), operation information relating to the operation speed as to whether the speed of the robot arm 5 is lowered to a certain threshold value or less, or is not lowered thereto may be set, and the resulting data may be stored in the operation information database 17. With respect to a flag relating to "whether or not a low speed is prepared" in the fourth column of the mode shown in FIG. 39, "1" is set in the flag in the case where "the low-speed operation is carried out", while "0" is set therein when "the low-speed operation is not carried out", and the resulting data is stored in the operation information database. With this setting, in the case where the operation of the robot arm 5 is too fast and the person 4 cannot grab the robot arm 5, the operation of the robot arm 5 can be carried out at a low speed, when the flag as to "whether or not a low speed is prepared", stored in the operation information database 17, is set to "1", so that the person 4 is allowed to grab the robot arm 5 safely, and correct the operation of the robot arm 5.

With respect to the respective settings, the person may make the above-mentioned settings in the operation information database 17 through the data input IF 26, or the manufacturer or the like may preliminarily make the above-mentioned settings in the operation information database 17 upon shipment of the robot system.

As shown in the first or third embodiment, in the case where the robot arm 5 is operated upon receipt of a force of the person 4, the operation correction unit 20 gives an instruction to the control parameter managing unit 21 so as to carry out the operation of the robot arm 5 in the hybrid impedance control mode (the mode in which, while the robot arm 5 is being moved in the position control mode, the robot arm 5 is shifted in the impedance control in a direction in which the force applied by the person 4 is detected), upon receipt of the information of the flag "1" relating to the presence or absence of correction outputted from the correction method setting unit 23. At this time, in the case where the flag as to "whether or not a low speed is prepared", stored in the operation information database 17, is set to "1" by the correction method setting unit 23, the operation correction unit 20 gives operation information in which, in order to carry out the operation of the robot arm 5 at the time of the position control mode under the hybrid impedance control mode at a low speed, the value of "time" in the operation information database 17 is made greater (for example, a value twice as large as the original value), as an instruction to the control parameter managing unit 21. Thus, the operation speed at the time of the position control mode is altered to a lower speed.

After the above-mentioned settings, as shown in the first embodiment or the third embodiment, the person 4 directly grabs the robot arm 5, and alters the operation of the robot arm 5.

Next, in the case where, with respect to the setting after the correction of the operation of the robot arm 5, as to whether the corrected operation is carried out or the operation is returned to its original operation, the setting is made as to return to its original operation in the correction method setting unit 23 (that is, the flag as to "whether the corrected operation or the original operation is executed after the correction" is set to "0"), upon completion of the correction (when the flag relating to the presence or absence of correction is returned to "0"), in the first embodiment, Δz-component (correction value in the z-axis direction), which is a differential value of the z-component to be corrected, is added to all the values in the z-coordinate of the operation information by the operation correction unit 20 so that the resulting data is stored in the operation information of the operation information database 17 by the operation storage unit 15. In the case where, upon altering to the corrected operation (that is, when the flag as to "whether the corrected operation or the original operation is executed after the correction" is set to "1"), the overwrite mode is set in the correction method setting unit 23 (when the flag as to "whether the overwrite mode or the insertion mode is carried out" is set to "1"), the operation information, obtained by subtracting the Δz-component from all the values in the z-coordinate of the operation information by the operation correction unit 20, is stored in the operation information database 17 by the operation storage unit 15. More specifically, with respect to all the lines having "3" in "the job ID" of FIG. 3, the z-coordinate at the tip unit position of the robot arm 5 is subtracted by the Δz-component in the operation correction unit 20 so that the resulting information is stored in the operation information database 17 by the operation storage unit 15. In the case where the insertion mode is set (when the flag as to "whether the overwrite mode or the insertion mode is carried out" is set to "0"), in the operation storage unit 15, of the operation information of the operation information database 17, to the succeeding line of the original operation (for example, the operation of 8 lines having "3" in "the job ID" of FIG. 3), values obtained by subtracting Δz from the z-coordinate values at the respective positions of the original operation by the operation correction unit 20 are added by 8 lines. In the case of the insertion mode, since the corrected operation is inserted after the original operation, the operation is sometimes suddenly switched, when the connecting time between the original operation and the corrected operation is short. In such a case, in the operation correction unit 20, the switching operation can be carried out at a low speed by making the period of time of the switching operation greater. Moreover, by copying the same operation as the operation information indicated by the switching "operation ID" only by one line immediately thereafter, in the operation correction unit 20, and at the time of a switching process, by inserting such an operation, an operation that stops by the positional information can be inserted therein so that it becomes possible to prevent the abrupt switching process.

As described above, by switching the presence or absence of correction in the operation of the robot arm 5 based upon the state of a force applied to the robot arm 5 by the person 4, the operation of the robot arm 5 can be easily corrected without using a button or the like. Moreover, even upon collision of the robot arm 5 with the person 4 or another object, it is possible to prevent the operation of the robot arm 5 from being erroneously corrected. Furthermore, with respect to the operation after the correction, by making a setting as to whether an overwriting operation or an inserting operation is carried out, it becomes possible to make a switch as to whether only the operation after the correction is carried out or the robot arm 5 is operated in combination with the operations before and after the correction. Moreover, in the case where the setting is made so as to carry out the operation of the robot arm 5 during the correction at a low speed, when the operation of the robot arm 5 is so fast that the person 4 cannot grab the robot arm 5, by setting the operation of the robot arm 5 at a low speed, the person 4 is allowed to grab the robot arm 5 safely and correct the operation of the robot arm 5.

(Seventh Embodiment)

Since the basic structure of a control apparatus 70 of the robot arm 5 in accordance with a seventh embodiment of the present invention is the same as that of the first embodiment, descriptions for the common portions will not be given, and the following description will discuss only different portions in detail.

Figure 40:
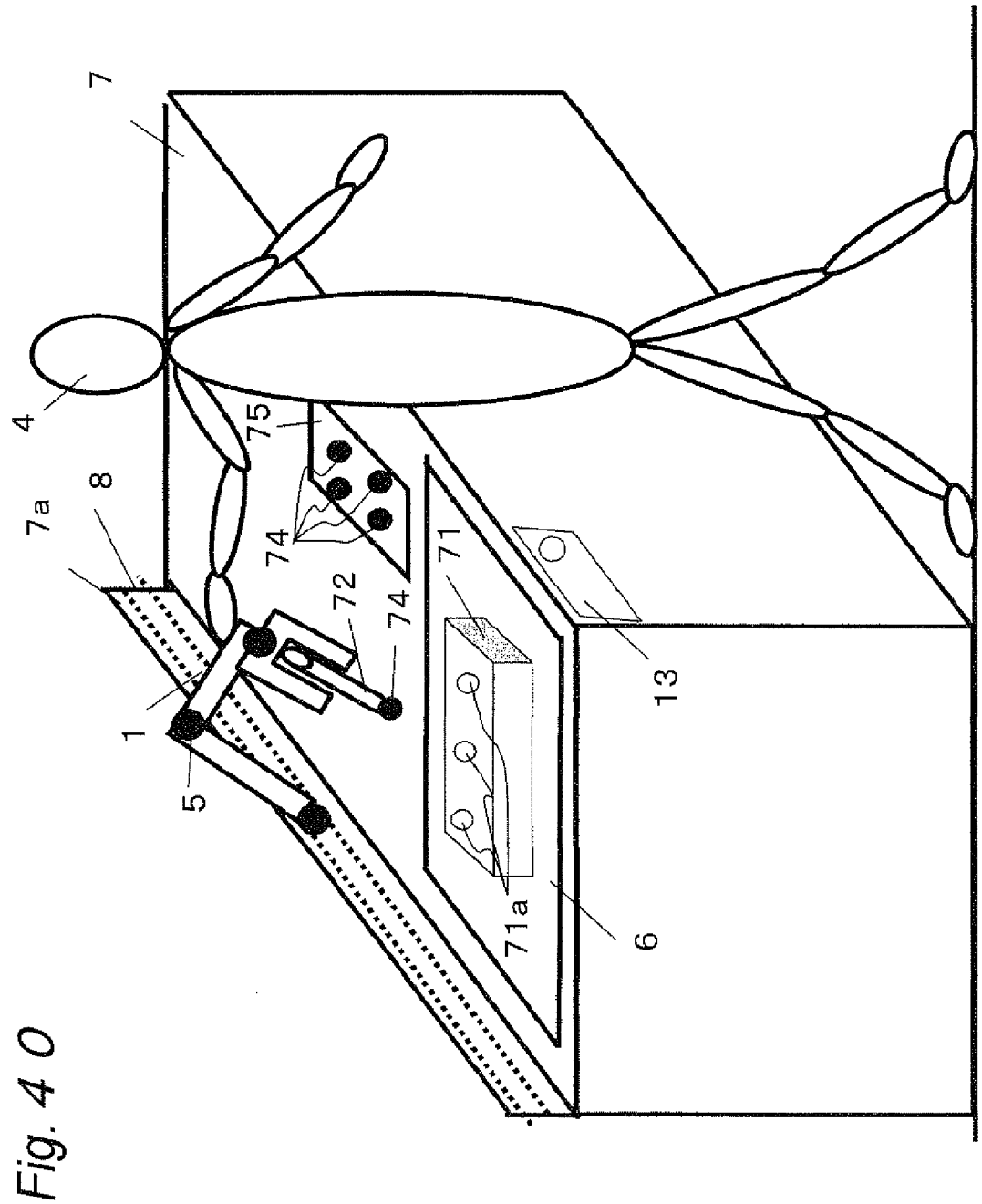
FIG. 40 is a view showing schematic structures of a control apparatus for a robot arm and the robot arm to be controlled that form a robot system in a seventh embodiment of the present invention.

In the seventh embodiment, as shown in FIG. 40, the following description will be given by exemplifying a system in which screws 73 are attached to an electric apparatus, such as a television or a DVD recorder in a factory for producing cells.

As shown in FIG. 40, the robot arm 5 of the robot system 1 is attached to a wall surface 7a of a work bench 7, for example, such as a work bench table in a factory, and the base end of the robot arm 5 is shiftably supported on a rail 8 secured onto the wall surface 7a so that the robot arm 5 is allowed to move in lateral directions, for example, in horizontal directions, along the rail 8, by a force of a person 4.

The robot system 1 is a system for carrying out a job in a factory that is executed by the robot arm 5 and the person 4 in cooperation with each other, for example, a job for attaching screws 73 to a television or a DVD recorder by using the robot arm 5.

In the same manner as in the first embodiment, first, the person 4 directly grabs or pushes the robot arm 5 of the robot system 1 so that the person 4 applies a force to the robot arm 5. Thus, by the force applied to the robot arm 5 from the person 4, the robot arm 5 of the robot system 1 is allowed to move along the rail 8 so that the robot arm is directed to the vicinity of an apparatus 71 (in this example, corresponding to an electric apparatus, such as a television or a DVD recorder to which the screws are attached).

Next, the person 4 attaches a tool, such as an electric screw driver tool 72, for use in attaching the screws 73 to the electric apparatus, to the tip unit, that is, a hand 30 of the tip of the robot arm 5 of the robot system 1. The operations of the electric screw driver tool 72 are automatically controlled by the control parameter managing unit 21.

Next, the person 4, for example, pushes a button 13a of an operation panel 13 of the robot system 1, placed on a side surface or the like of a work bench for producing cells, so that a data input IF 26 is used; thus, the robot arm 5 is activated, and preliminarily selected jobs, that is, jobs for taking screws 73 out of a screw container 75 and for attaching the screws 73 to screw holes 71a of the tool 71, are started. The following description will discuss, for example, the attaching job of screws 73 carried out by the robot arm 5.

Next, when the robot arm 5 is carrying out the attaching job of the screws 73 by using the electric screw driver 72 grabbed by the hand 30, the person 4 confirms the attached state of the screws 73, and the person 4 adds a force to the robot arm 5 so as to allow the robot arm 5 to carry out a tightening process or a position-adjusting operation of the screws 73, or the like, so that, by utilizing information stored in the operation information database 17 by the operation storage unit 15, an operation selecting unit 27, which will be described later, is allowed to select an optimal attaching job for the screws 73, and in accordance with a correction process displayed on the display unit 2, which will be described later, the person 4 directly grabs or pushes the robot arm 5 of the robot system 1 so that a force is applied to the robot arm 5 in a desired direction to be corrected and the operation of the robot arm 5 of the robot system 1 is subsequently corrected.

In this case, the rail 8 is disposed on the wall surface 7a of the work bench 7; however, in the case of a work bench without wall surfaces, the rail 8 may be attached to a suitable place for a job, such as a ceiling surface or a side surface of a top plate of the work bench, in the same manner as in the first embodiment.

Moreover, although the operation panel 13 is secured to a side surface of the work bench 7, a remote control system capable of carrying out remote manipulations may be used in place of the operation panel 13.

Figure 41:
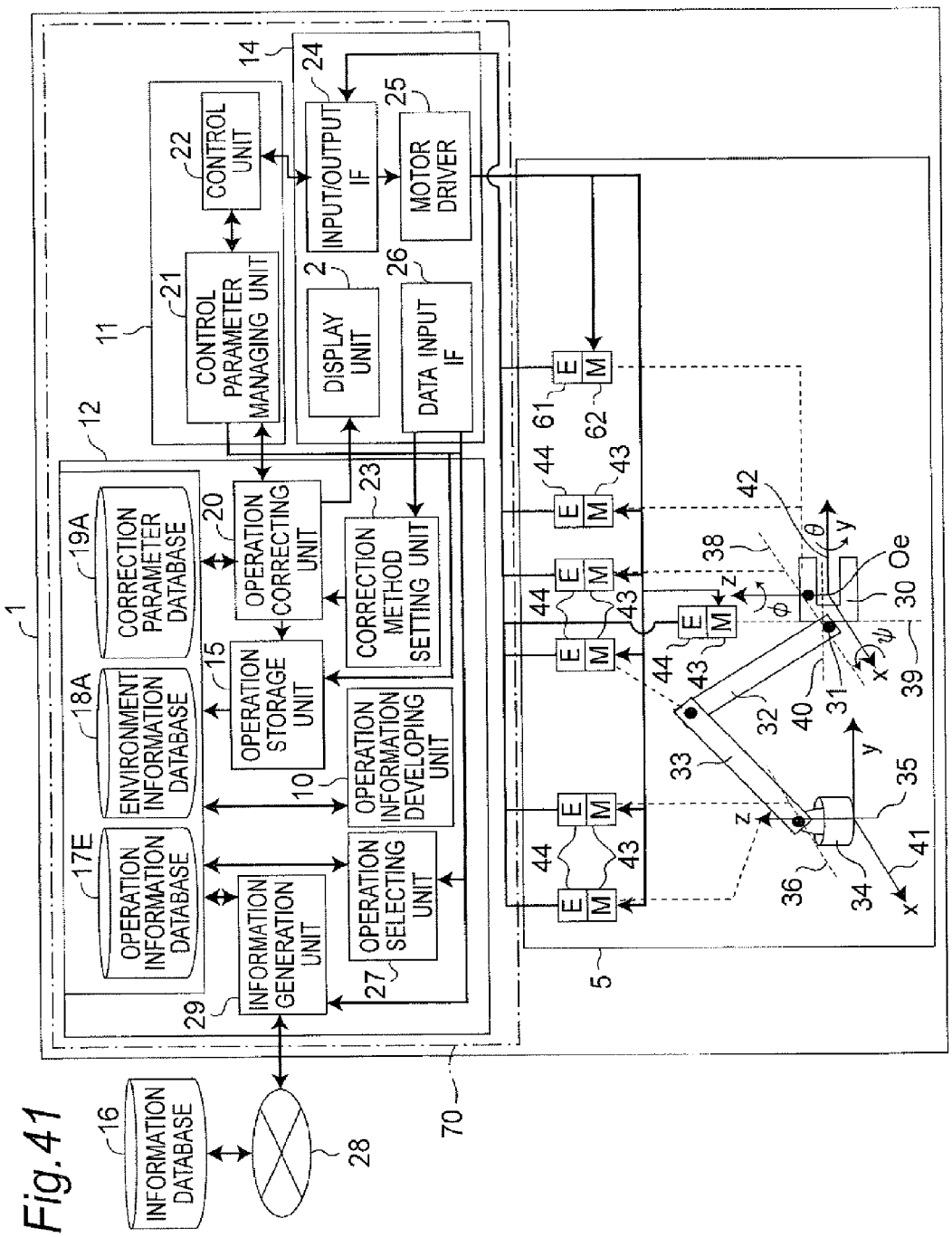
FIG. 41 is a view showing detailed structures of the control apparatus for a robot arm and the robot arm to be controlled that form the robot system in the seventh embodiment of the present invention.

FIG. 41 is a view showing detailed structures of the robot arm 5 to be controlled and the control apparatus 70 for the robot arm 5 that form a robot system 1.

As shown in FIG. 41 in detail, the control apparatus 70 of the robot arm 5 is provided with a control apparatus main body unit 11, an operation generating device 12 for generating operations of the robot arm 5, a peripheral apparatus 14 and a screw position detection device. In FIG. 41, since the robot arm 5, the peripheral apparatus 14, the control apparatus main body unit 11, the operation selecting unit 27 and the correction method setting unit 23 are the same as those of the first embodiment, the description thereof will not be given.

An operation information database 17E, shown in FIG. 42, corresponds to the operation information database 17 of the first embodiment or the operation information database 17A of the second embodiment, and information relating to operations, such as the tip position and orientation of the robot arm 5 at a certain point of time, generated by the information generation unit 29 to be described later is stored in the operation information database 17E.

Moreover, an environment information database 18A stores pieces of information relating to an environment of the robot arm 5 in the case where the robot arm 5 and the person 4 carry out a job in cooperation with each other, that is, for example, pieces of information relating to a tool 72, such as an electric screw driver, or an apparatus 71 such as an electric apparatus, and members such as screws 73, required for the robot arm 5 to carry out the job, and these pieces of environment information are generated in an information generation unit 29, which will be described later, and stored in the environment information database 18 by the information generation unit 29.

A correction parameter database 19A stores pieces of information relating to a type of parameters to be corrected upon correcting operation information of the operation information database 17E in the operation correction unit 20, which will be described later, and these pieces of information are generated by the information generation unit 29, and stored in the correction parameter database 19 by the information generation unit 29.

The following description will discuss the operation information database 17E in detail.

The operation information database 17E stores, for example, pieces of information relating to operations of the robot arm 5 shown in FIG. 42, and those pieces of information relating to the "job ID", "operation ID", "position and orientation", "force", "flag", "hand", "time", "correction parameter flag" and "progress information" are the same as those of the first embodiment and the second embodiment; therefore, the description thereof will not be given.

In the operation information database 17E of FIG. 42, "environment information ID" (codes used for identifying pieces of environment information) includes two kinds of "environment information IDs". Information relating to "ambient environment" indicated by one of the "environment information IDs" corresponds to information relating to the ambient environment in which the robot arm 5 is operated, and, for example, in the case where the robot arm 5 is carrying out an attaching job of screws 73, the information represents the apparatus 71 or the positions and sizes of screw holes 71*a* of the apparatus 71, or the like. Information relating to "grabbed object" indicated by the other "environment information ID" corresponds to information relating to an object grabbed by the robot arm 5, and, for example, in the case where the robot arm 5 is carrying out an attaching job of screws 73, the information represents the operation information of the electric screw driver 72 or the like grabbed by the robot arm 5. The respective "environment information IDs" are any of values included in "environment information IDs" shown in FIG. 43A, which will be described later, and correspond to pieces of information indicating under which environment the operation is carried out.

Figures 43A, 43B, 43C:
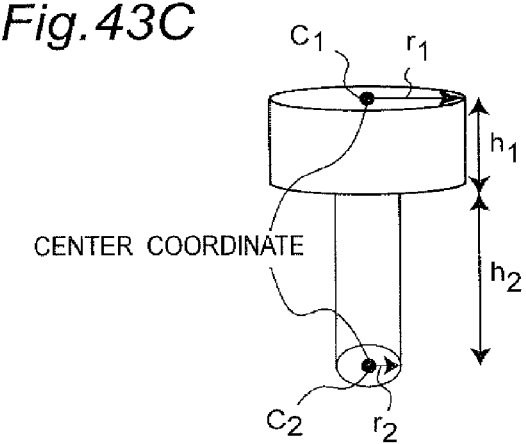
FIG. 43A is a view illustrating a list of environmental information of an environmental information database in the seventh embodiment of the present invention.
FIG. 43B is a view illustrating a list of environmental information of an environmental information database in the seventh embodiment of the present invention.
FIG. 43C is a view showing an object indicated by the environmental information of the environmental information database of FIG. 43B in the seventh embodiment of the present invention.

The environment information database 18 is designed to have pieces of information relating to operation environments of the robot arm 5, for example, shown in FIG. 43A, including "environment IDs" representing environment information ID numbers used for identifying environments, "types" representing the types of the pieces of environment information and "type IDs" used for identifying the respective types. The respective pieces of information are constituted by those pieces of information shown in FIG. 43B, FIG. 43D and FIG. 43F stored in accordance with the "types" of environmental information. That is, in the case where the "type" of the environment information of FIG. 43A is "1", the table of FIG. 43B is referred to, in the case where the "type" of the environment information of FIG. 43A is "2", the table of FIG. 43D is referred to, and in the case where the "type" of the environment information of FIG. 43A is "3", the table of FIG. 43F is referred to. For example, in the case where the "type" of the environment information of FIG. 43A is "1", with the "type ID" being set to "1", this corresponds to the case where the "type ID" of FIG. 43B is "1". Therefore, the coincided values (center coordinates $c_1$, radius $r_1$, height $h_1$, center coordinates $c_2$, radius $r_2$ and height $h_2$) are defined as the environment information of the "environment information ID".

For example, FIG. 43B shows information representing an object as shown in FIG. 43C, which can approximately indicate a screw 73, an electric screw driver 72, or the like.

In the case where the "type" of the environment information of FIG. 43A is "2", with the "type ID" being set to "1", this corresponds to the case where the "type ID" in the table of FIG. 43D is "1". Therefore, the coincided values (coordinates 1, coordinates 2, coordinates 3 and height) are defined as the environment information of the "environment information ID". FIG. 43E shows information representing a rectangular parallelepiped shape, which can approximately indicate an electric apparatus 71 such as a TV or a DVD recorder on the work bench 7, or a screw container 75 in which screws 73 are stored, or the work bench 7, or the like. More specifically, the upper surface of the rectangular parallelepiped shape is indicated by coordinates of certain one point on the upper surface (in FIG. 43E, "coordinates 2" of one corner of the upper surface) and coordinates of two points (in FIG. 43E, "coordinates 1" and "coordinates 3" of two corners adjacent to the corner portion "coordinates 2" on the upper surface) adjacent to the coordinates of the certain one point (in FIG. 43E, "coordinates 2" of the one corner of the upper surface), and to this information is further added information of a height in a direction perpendicular to the upper surface. In the case where the "type" of the environment information of FIG. 43A is "3", with the "type ID" being set to "1", this corresponds to the case where the "type ID" in the table of FIG. 43F is "1"; and therefore, the coincided values (center coordinates and a radius) are defined as the environment information of the "environment information ID". FIG. 43F shows information relating to a circle as shown in FIG. 43G, and this information can approximately indicate a screw hole 71*a* or the like, on the upper portion of, for example, a TV or a DVD recorder. More specifically, this information is constituted by pieces of information relating to center coordinates and a radius of a circle.

Referring to FIG. 41 again, reference numeral 29 represents the information generation unit. The information generation unit 29 generates the operation information of the operation information database 17E, the environment information of the environment information database 18A and the correction parameter of the correction parameter database 19A, based upon input information externally given (from the Internet 28 or the like), which will be described later, the input information from the data input IF 26 and the input information from the control parameter managing unit 21, and outputs the resulting data to the operation information database 17E, the environment information database 18A and the correction parameter database 19A respectively.

In the environment information database 18A, RFID tags are attached, for example, to the screws 73, the electric screw driver 72, the electric apparatus 71, such as a TV or a DVD recorder, the work bench 7 used for the job, and the like, and the positions of these objects are detected by a tag detector, respectively. Moreover, pieces of dimensional information of the objects are collected by the information generating unit 29 from the information database 16 located in the external web server through the Internet 28 and stored in the environment information database 18A.

As another example of the information generating unit 29, the environment may be photographed by using an image pickup device such as a camera, and a model-matching process may be carried out between the resulting image data and the preliminarily stored object images, so that the dimension of the object or the position of the object may be extracted, and may be stored in the environment information database 18A.

Moreover, as still another example of the information generating unit 29, by using an ultrasonic tag system, an ultrasonic transmitter may be attached to the object, and an ultrasonic wave emitted from the ultrasonic transmitter may be received by a plurality of ultrasonic wave receivers attached to the ceiling or the like, and based upon time differences of arrivals of the ultrasonic waves, a three-dimensional position (values of three-dimensional position coordinates) of the ultrasonic wave transmitter may be calculated, and the resulting data may be stored in the environment information database 18A.

The information relating to the tip unit position and orientation of the robot arm 5 of the operation information database 17E is generated by the operation information developing unit 10, which will be described later, based upon the environment information database 18, and is then used for forming pieces of information relating to the tip unit position, orientation and time of the robot arm 5, and the resulting data is stored in the operation information database 17E.

The operation information developing unit 10 generates pieces of operation information relating to the position, orientation and time of the operation information database 17E corresponding to the tip unit position of the robot arm 5 from the environment information database 18A. More specifically, there is generated a track through which a screw 73 is taken out of the screw container 75 of FIG. 40 and moved to a screw hole 71a on the electric apparatus 71 so that the screw 73 is pressed onto the screw hole 71a from above. The generated track (position and orientation) is stored in the operation information database 17E together with the time information.

Next, a description will be given by exemplifying a case in which the person 4 confirms the state of the attaching job of the screws 73, and corrects the operation so as to carry out the tightening operation more strongly.

In the same manner as in the second embodiment, the person 4 changes the flag relating to the presence or absence of correction from "0" to "1", by using the correction method setting unit 23 through the data input IF 26, and in order to correct only the force in the z-axis direction of the correction parameter, gives a control instruction for changing only the 8th bit of the correction parameter of FIG. 16 to "1" from the correction method setting unit 23 to the control parameter managing unit 21 through the operation correction unit 20. In the case where any of the 6th to 11th bits (force components) of the correction parameter is "1", the control parameter managing unit 21 gives to the control unit 22 such a control instruction as to carry out an operation in the high-rigidity position control mode, in the same manner as in the second embodiment.

In the case where this instruction is given to the control unit 22, since the high rigidity can be set during the positional control for each of the directions differently, the control parameter managing unit 21 gives to the control unit 22 such a control instruction as to operate the robot arm 5 in the high-rigidity position control mode only in the z-axis direction, with the robot arm 5 being operated in the normal position control mode in the other directions. Then, based upon the control instruction, the control unit 22 controls the attaching job of the screws 73, with the screw 73 being pressed onto the screw hole 71a by the electric screw driver 72 grabbed by the robot arm 5.

The force detected by the force detection unit 53 of the control unit 22 is transmitted to the operation correction unit 20 through the control parameter managing unit 21. The operation correction unit 20 replaces the force in the z-axis direction of the operation information database 17A with the force thus transmitted to the operation correction unit 20, and the resulting information is stored in the operation information database 17E by the operation storage unit 15; thereafter, by operating the robot arm 5 based upon the stored information, the operations of the robot arm 5 can be corrected so as to carry out an attaching job of the screws 73 more strongly.

In the case where, upon allowing the robot arm 5 to carry out the attaching job of the screws 73, an attempt is made so as to make the robot arm 5 carry out the tightening job of the screws 73 more strongly, the person 4 directly grabs the robot arm 5, and applies a force to be desirably applied to the screw 73 by the person 4 to the robot arm 5 that is carrying out the attaching job of the screw 73, downward to the screw hole 71a.

These operations can be applied to the case in which, in a recycling factory, screws are detached from a TV or an air conditioner, or the like. Moreover, in an attempt to tighten the screw more loosely, the correction can be made by applying a force weakly. Furthermore, in the case where, upon generating the environment information database 17E in the information generating unit 29, the detection precision for the respective pieces of environment information is poor, resulting in an erroneous operation of the robot arm 5 in which a screw is tightened at a place different from the screw hole, or the tip of the robot arm 5 collides with the screw container 75 to cause the stoppage of the robot arm 5, the person 4 is allowed to correct the tip unit position of the robot arm 5 in the same manner as in the first embodiment so that the erroneous operation can be easily avoided.

Note that, in the third embodiment and the like, although the information of the process of jobs is collected through the Internet 28, the information thereof may be collected from media, such as a memory like an SD card or a DVD, by the information generating unit 29.

Moreover, in the respective embodiments, descriptions have been given by exemplifying the robot arm 5; however, the present invention is not limited to an arm, and may be applied to a moving robot that is moved by wheels, or a walking robot with two legs, or a walking robot with multiple legs, or the like, and the same effects are exerted in relation to contact between the moving robot or the like and the human being.

Moreover, in the respective embodiments, with respect to the operation selecting unit 27, the operation storage unit 15, the operation correction unit 20, the correction method setting unit 23, the control parameter unit 21, the control unit 22, the information generating unit 29 and the operation information developing unit 10, each of these or any desired units thereof may be constituted by pieces of software. For example, these may be stored in a recording medium such as a storage device (a hard disk or the like) so as to be readable, as computer programs having the steps forming the respective control operations of the respective embodiments of the present specification, and by reading the computer programs into a temporary storage device (a semiconductor memory or the like) of a computer to be executed by using the CPU, the aforementioned respective steps may be carried out.

Upon carrying out an operation by a person and a robot in cooperation with each other safely based upon ISO 10218-1, the limitations of the speed, force, power or the like are standardized. In the present embodiments also, a limiting unit for limiting the speed, force or power in compliance with the standards may be prepared.

Moreover, in the respective embodiments, by detecting a force applied by a person by the use of a force detection unit, the robot arm 5 is operated; however, the applied force may be detected by using a contact sensor, or by detecting the tip unit position of the person by the use of a camera or the like, a manipulation track through which the person has carried out the manipulation is obtained, and the correction may be made thereon.

Furthermore, in the respective embodiments, the person directly grabs the robot arm, and carries out the manipulation;

however, for example, a remote control apparatus, such as a teaching pendant, or a manipulation robot arm for use in remote instruction, or the like, may be used to carry out the manipulation.

Moreover, among the above-mentioned various embodiments, desired embodiments may be combined with one another on demand, the respective effects can be exerted.

The present invention can be effectively utilized as a control apparatus and a control method for a robot arm, a control program for a robot arm and a controlling integrated electronic circuit for a robot and a robot arm that are used for controlling operations of a robot arm upon carrying out a job by a person and the robot in cooperation with each other, in an industrial robot or a house-service robot. Moreover, the present invention is not limited to the house-service robot, and can be applied to industrial robots, industrial robots used for disassembling operations in a recycling factory, robots that are used in a factory for producing cells, a control apparatus and a control method for a robot arm used for a movable mechanism in a production facility or the like, a robot having a control apparatus for a robot arm and a control program for a robot arm.

While the invention has been described on preferred embodiments thereof in detail with reference to attached drawings, it will be apparent to those skilled in the art that various changes and modifications can be made therein. Such variations are not to be regarded as a departure from the scope of the invention, and all such modifications are intended to be included within the scope of the following claims.

The invention claimed is:

1. A control apparatus for a robot arm, which controls an operation of the robot arm so as to execute a job including a plurality of operations by the robot arm, comprising:
   a force control unit configured to carry out the control while pressing an object with a force corresponding to the operation information acquired from the operation information database in which forces to be applied to the object by the robot arm corresponding to the operations are stored as pieces of time-sequential operation information;
   a correction method setting unit configured to set presence or absence of correction of the operation information;
   a control parameter managing unit configured to switch modes between (i) a force hybrid impedance control mode for automatically force-controlling the robot arm based upon operation information stored in the operation information database, which is used when the correction method setting unit determines that no correction is required for the operation information, and (ii) a high-rigidity position control mode for allowing a person to hold the robot arm and perform teaching of a force to be applied to the robot arm, which is used when the correction method setting unit determines that a correction is required for the operation information;
   an information acquiring unit configured to acquire correction operation information relating to the force to be applied to the robot arm, upon correcting the operation of the robot arm, by allowing the person to hold the robot arm and apply a force thereto in the high-rigidity position control mode; and
   an operation correction unit configured to correct the operation information in accordance with the correction operation information, at each point of time acquired by the information acquiring unit,
   wherein the operation information database has a correction parameter flag used for specifying a direction of a force that corresponds to the operation information,
   after the control parameter managing unit has made a switch to the high-rigidity position control mode, midway during the automatic force control of the robot arm in the hybrid impedance control mode, the information acquiring unit acquires the correction operation information of the robot arm made by the person, relating to a direction of the force specified by the correction parameter flag,
   the operation correction unit corrects the operation information in accordance with the correction operation information,
   the force control unit force-controls the robot arm based upon the corrected operation information, and
   the correction method setting unit is configured to set a method for correcting the operation information by the operation correction unit, and in accordance with the correction method set by the correction method setting unit, the operation information is corrected by the operation correction unit, and
   wherein in a case where, after the correction in the operation correction unit based upon the setting that the correction of the operation information is required, a setting is made so that the correction of the operation information is not required, the correction method setting unit sets a correction method as to whether the corrected operation is carried out or the operation is returned to a previous operation before the correction, and in a case where, after the correction in the operation correction unit based upon the setting that the correction of the operation information is required, referring to the correction method set by the correction method setting unit, by the operation correction unit, a setting is made so that the correction of the operation information is not required, the correction method setting unit switches the operation as to whether the corrected operation is carried out or the operation is returned to a previous operation before the correction, and
   in a case where, after the correction in the operation correction unit carried out by controlling the operation of the robot arm based upon the operation information corrected by the operation correction unit, a setting is made so that the correction of the operation information is not required, the operation of the robot arm is controlled in accordance with the operation switched by the correction method set in the correction method setting unit.

2. A control apparatus for a robot arm, which controls an operation of the robot arm so as to execute a job including a plurality of operations by the robot arm, comprising:
   a force control unit configured to carry out the control while pressing an object with a force corresponding to the operation information acquired from the operation information database in which forces to be applied to the object by the robot arm corresponding to the operations are stored as pieces of time-sequential operation information;
   a correction method setting unit configured to set presence or absence of correction of the operation information;
   a control parameter managing unit configured to switch modes between (i) a force hybrid impedance control mode for automatically force-controlling the robot arm based upon operation information stored in the operation information database, which is used when the correction method setting unit determines that no correction is required for the operation information, and (ii) a high-rigidity position control mode for allowing a person to hold the robot arm and perform teaching of a force to be applied to the robot arm, which is used when the correction method setting unit determines that a correction is required for the operation information;
an information acquiring unit configured to acquire correction operation information relating to the force to be applied to the robot arm, upon correcting the operation of the robot arm, by allowing the person to hold the robot arm and apply a force thereto in the high-rigidity position control mode; and
an operation correction unit configured to correct the operation information in accordance with the correction operation information, at each point of time acquired by the information acquiring unit,
wherein the operation information database has a correction parameter flag used for specifying a direction of a force that corresponds to the operation information,
after the control parameter managing unit has made a switch to the high-rigidity position control mode, midway during the automatic force control of the robot arm in the hybrid impedance control mode, the information acquiring unit acquires the correction operation information of the robot arm made by the person, relating to a direction of the force specified by the correction parameter flag,
the operation correction unit corrects the operation information in accordance with the correction operation information,
the force control unit force-controls the robot arm based upon the corrected operation information, and
the correction method setting unit is configured to set a method for correcting the operation information by the operation correction unit, and in accordance with the correction method set by the correction method setting unit, the operation information is corrected by the operation correction unit, and
wherein the correction method setting unit sets a method for correction as to whether an operation after corrected by the operation correction unit is operated after having been overwritten on the previous operation before the correction or the operation after corrected by the operation correction unit is operated after having been inserted, and referring to the correction method set by the correction method setting unit, by the operation correction unit, the correction method setting unit switches an operation as to whether the operation after corrected by the operation correction unit is operated after having been overwritten on the previous operation before the correction or the operation after corrected by the operation correction unit is operated after having been inserted, and
after the correction in the operation correction unit carried out by controlling the operation of the robot arm based upon the operation information corrected by the operation correction unit, the operation of the robot arm is controlled by the operation switched by the correction method set by the correction method setting unit.

3. The control apparatus for a robot arm according to claim 2, wherein
in a case where the setting is made in the correction method in the correction method setting unit so that the operation after corrected by the operation correction unit is carried out after having been overwritten on the previous operation before the correction, upon inserting the operation information after the correction to the operation information before the correction, the operation correction unit corrects the operation at a connected portion between the operations before and after the correction in such a manner so that the connected portion after the correction is carried out at a lower speed than a portion other than the connected portion or so as to be stopped.

4. A control apparatus for a robot arm, which controls an operation of the robot arm so as to execute a job including a plurality of operations by the robot arm, comprising:
a force control unit configured to carry out the control while pressing an object with a force corresponding to the operation information acquired from the operation information database in which forces to be applied to the object by the robot arm corresponding to the operations are stored as pieces of time-sequential operation information;
a correction method setting unit configured to set presence or absence of correction of the operation information;
a control parameter managing unit configured to switch modes between (i) a force hybrid impedance control mode for automatically force-controlling the robot arm based upon operation information stored in the operation information database, which is used when the correction method setting unit determines that no correction is required for the operation information, and (ii) a high-rigidity position control mode for allowing a person to hold the robot arm and perform teaching of a force to be applied to the robot arm, which is used when the correction method setting unit determines that a correction is required for the operation information;
an information acquiring unit configured to acquire correction operation information relating to the force to be applied to the robot arm, upon correcting the operation of the robot arm, by allowing the person to hold the robot arm and apply a force thereto in the high-rigidity position control mode; and
an operation correction unit configured to correct the operation information in accordance with the correction operation information, at each point of time acquired by the information acquiring unit,
wherein the operation information database has a correction parameter flag used for specifying a direction of a force that corresponds to the operation information,
after the control parameter managing unit has made a switch to the high-rigidity position control mode, midway during the automatic force control of the robot arm in the hybrid impedance control mode, the information acquiring unit acquires the correction operation information of the robot arm made by the person, relating to a direction of the force specified by the correction parameter flag,
the operation correction unit corrects the operation information in accordance with the correction operation information,
the force control unit force-controls the robot arm based upon the corrected operation information, and
the correction method setting unit is configured to set a method for correcting the operation information by the operation correction unit, and in accordance with the correction method set by the correction method setting unit, the operation information is corrected by the operation correction unit, and
wherein when a person directly grabs the robot arm and manipulates the robot arm so as to switch the operation to a corrected operation, the correction method setting unit sets a method for correction as to whether or not the operation is carried out at a speed lower than a speed of the operation before the switching, when the person directly grabs the robot arm and manipulates the robot arm, the switching is made as to whether or not the operation of the robot arm is carried out at a speed lower than the speed of the operation before the manipulation, referring to the correction method set in the correction method setting unit, by the operation correction unit, and upon controlling the operation of the robot arm based upon the operation information corrected by the operation correction unit, the operation of the robot arm is controlled by the operation switched by the correction method set by the correction method setting unit, when the person directly grabs the robot arm and manipulates the robot arm.

5. A control apparatus for a robot arm, which controls an operation of the robot arm so as to execute a job including a plurality of operations by the robot arm, comprising:

a force control unit configured to carry out the control while pressing an object with a force corresponding to the operation information acquired from the operation information database in which forces to be applied to the object by the robot arm corresponding to the operations are stored as pieces of time-sequential operation information;

a correction method setting unit configured to set presence or absence of correction of the operation information;

a control parameter managing unit configured to switch modes between (i) a force hybrid impedance control mode for automatically force-controlling the robot arm based upon operation information stored in the operation information database, which is used when the correction method setting unit determines that no correction is required for the operation information, and (ii) a high-rigidity position control mode for allowing a person to hold the robot arm and perform teaching of a force to be applied to the robot arm, which is used when the correction method setting unit determines that a correction is required for the operation information;

an information acquiring unit configured to acquire correction operation information relating to the force to be applied to the robot arm, upon correcting the operation of the robot arm, by allowing the person to hold the robot arm and apply a force thereto in the high-rigidity position control mode;

an operation correction unit configured to correct the operation information in accordance with the correction operation information, at each point of time acquired by the information acquiring unit;

a force detection unit configured to detect a force of the person applied to the robot arm, wherein the operation information database has a correction parameter flag used for specifying a direction of a force that corresponds to the operation information, after the control parameter managing unit has made a switch to the high-rigidity position control mode, midway during the automatic force control of the robot arm in the hybrid impedance control mode, the information acquiring unit acquires the correction operation information of the robot arm made by the person, relating to a direction of the force specified by the correction parameter flag, the operation correction unit corrects the operation information in accordance with the correction operation information, and the force control unit force-controls the robot arm based upon the corrected operation information, and the correction method setting unit is configured to set a method for correcting the operation information by the operation correction unit, and in accordance with the correction method set by the correction method setting unit, the operation information is corrected by the operation correction unit, and wherein in a case where, after the correction in the operation correction unit, the force of the person detected by the force detection unit becomes smaller than a threshold value, the correction method setting unit sets a correction method as to whether the corrected operation is carried out or the operation is returned to a previous operation before the correction, and in a case where, after the correction by the operation correction unit referring to the correction method set by the correction method setting unit, the force of the person detected by the force detection unit becomes smaller than the threshold value, the operation correction unit switches the operation as to whether the corrected operation is carried out or the operation is returned to a previous operation before the correction, and in a case where, after the correction in the operation correction unit carried out by controlling the operation of the robot arm based upon the operation information corrected by the operation correction unit, the force of the person detected by the force detection unit becomes smaller than the threshold value, the operation of the robot arm is controlled in accordance with the operation switched by the correction method set in the correction method setting unit.

6. A control method for a robot arm, which controls an operation of the robot arm so as to execute a job including a plurality of operations by the robot arm, comprising:

a force control step of carrying out the control while pressing an object with a force corresponding to the operation information acquired from the operation information database in which forces to be applied to the object by the robot arm corresponding to the operations are stored as pieces of time-sequential operation information;

a correction method setting step of setting presence or absence of correction of the operation information;

a control parameter managing step of switching modes between (i) a force hybrid impedance control mode for automatically force-controlling the robot arm based upon operation information stored in the operation information database, which is used when the correction method setting step determines that no correction is required for the operation information, and (ii) a high-rigidity position control mode for allowing a person to hold the robot arm and perform teaching of a force to be applied to the robot arm, which is used when the correction method setting step determines that a correction is required for the operation information;

an information acquiring step of acquiring correction operation information relating to the force to be applied to the robot arm, upon correcting the operation of the robot arm, by allowing the person to hold the robot arm and apply a force thereto in the high-rigidity position control mode; and an operation correction step of correcting the operation information in accordance with the correction operation information, at each point of time acquired by the information acquiring step, wherein the operation information database has a correction parameter flag used for specifying a direction of a force that corresponds to the operation information, after the control parameter managing step has made a switch to the high-rigidity position control mode, midway during the automatic force control of the robot arm in the hybrid impedance control mode, the information acquiring step acquires the correction operation information of the robot arm made by the person, relating to a direction of the force specified by the correction parameter flag, the operation correction step corrects the operation information in accordance with the correction operation information, the force control step force-controls the robot arm based upon the corrected operation information, and the correction method setting step sets a method for correcting the operation information by the operation correction step, and in accordance with the correction method set by the correction method setting step, the operation information is corrected by the operation correction step, and wherein in a case where, after the correction in the operation correction step based upon the setting that the correction of the operation information is required, a setting is made so that the correction of the operation information is not required, the correction method setting step sets a correction method as to whether the corrected operation is carried out or the operation is returned to a previous operation before the correction, and in a case where, after the correction in the operation correction step based upon the setting that the correction of the operation information is required, referring to the correction method set by the correction method setting step, by the operation correction step, a setting is made so that the correction of the operation information is not required, the correction method setting step switches the operation as to whether the corrected operation is carried out or the operation is returned to a previous operation before the correction, and in a case where, after the correction in the operation correction step carried out by controlling the operation of the robot arm based upon the operation information corrected by the operation correction step, a setting is made so that the correction of the operation information is not required, the operation of the robot arm is controlled in accordance with the operation switched by the correction method set in the correction method setting step.

7. A control method for a robot arm, which controls an operation of the robot arm so as to execute a job including a plurality of operations by the robot arm, comprising:

a force control step of carrying out the control while pressing an object with a force corresponding to the operation information acquired from the operation information database in which forces to be applied to the object by the robot arm corresponding to the operations are stored as pieces of time-sequential operation information;

a correction method setting step of setting presence or absence of correction of the operation information;

a control parameter managing step of switching modes between (i) a force hybrid impedance control mode for automatically force-controlling the robot arm based upon operation information stored in the operation information database, which is used when the correction method setting step determines that no correction is required for the operation information, and (ii) a high-rigidity position control mode for allowing a person to hold the robot arm and perform teaching of a force to be applied to the robot arm, which is used when the correction method setting step determines that a correction is required for the operation information;

an information acquiring step of acquiring correction operation information relating to the force to be applied to the robot arm, upon correcting the operation of the robot arm, by allowing the person to hold the robot arm and apply a force thereto in the high-rigidity position control mode; and an operation correction step of correcting the operation information in accordance with the correction operation information, at each point of time acquired by the information acquiring step, wherein the operation information database has a correction parameter flag used for specifying a direction of a force that corresponds to the operation information, after the control parameter managing step has made a switch to the high-rigidity position control mode, midway during the automatic force control of the robot arm in the hybrid impedance control mode, the information acquiring step acquires the correction operation information of the robot arm made by the person, relating to a direction of the force specified by the correction parameter flag, the operation correction step corrects the operation information in accordance with the correction operation information, the force control step force-controls the robot arm based upon the corrected operation information, and the correction method setting step sets a method for correcting the operation information by the operation correction step, and in accordance with the correction method set by the correction method setting step, the operation information is corrected by the operation correction step, and wherein the correction method setting step sets a method for correction as to whether an operation after corrected by the operation correction step is operated after having been overwritten on the previous operation before the correction or the operation after corrected by the operation correction step is operated after having been inserted, and referring to the correction method set by the correction method setting step, by the operation correction step, the correction method setting step switches an operation as to whether the operation after corrected by the operation correction step is operated after having been overwritten on the previous operation before the correction or the operation after corrected by the operation correction step is operated after having been inserted, and after the correction in the operation correction step carried out by controlling the operation of the robot arm based upon the operation information corrected by the operation correction step, the operation of the robot arm is controlled by the operation switched by the correction method set by the correction method setting step.

8. A control method for a robot arm, which controls an operation of the robot arm so as to execute a job including a plurality of operations by the robot arm, comprising:

a force control step of carrying out the control while pressing an object with a force corresponding to the operation information acquired from the operation information database in which forces to be applied to the object by the robot arm corresponding to the operations are stored as pieces of time-sequential operation information;

a correction method setting step of setting presence or absence of correction of the operation information;

a control parameter managing step of switching modes between (i) a force hybrid impedance control mode for automatically force-controlling the robot arm based upon operation information stored in the operation information database, which is used when the correction method setting step determines that no correction is required for the operation information, and (ii) a high-rigidity position control mode for allowing a person to hold the robot arm and perform teaching of a force to be applied to the robot arm, which is used when the correction method setting step determines that a correction is required for the operation information;

an information acquiring step of acquiring correction operation information relating to the force to be applied to the robot arm, upon correcting the operation of the robot arm, by allowing the person to hold the robot arm and apply a force thereto in the high-rigidity position control mode; and an operation correction step of correcting the operation information in accordance with the correction operation information, at each point of time acquired by the information acquiring step, wherein the operation information database has a correction parameter flag used for specifying a direction of a force that corresponds to the operation information, after the control parameter managing step has made a switch to the high-rigidity position control mode, midway during the automatic force control of the robot arm in the hybrid impedance control mode, the information acquiring step acquires the correction operation information of the robot arm made by the person, relating to a direction of the force specified by the correction parameter flag, the operation correction step corrects the operation information in accordance with the correction operation information, the force control step force-controls the robot arm based upon the corrected operation information, and the correction method setting step sets a method for correcting the operation information by the operation correction step, and in accordance with the correction method set by the correction method setting step, the operation information is corrected by the operation correction step, and wherein when a person directly grabs the robot arm and manipulates the robot arm so as to switch the operation to a corrected operation, the correction method setting step sets a method for correction as to whether or not the operation is carried out at a speed lower than a speed of the operation before the switching, when the person directly grabs the robot arm and manipulates the robot arm, the switching is made as to whether or not the operation of the robot arm is carried out at a speed lower than the speed of the operation before the manipulation, referring to the correction method set in the correction method setting step, by the operation correction step, and upon controlling the operation of the robot arm based upon the operation information corrected by the operation correction step, the operation of the robot arm is controlled by the operation switched by the correction method set by the correction method setting step, when the person directly grabs the robot arm and manipulates the robot arm.

9. A control method for a robot arm, which controls an operation of the robot arm so as to execute a job including a plurality of operations by the robot arm, comprising:

a force control step of carrying out the control while pressing an object with a force corresponding to the operation information acquired from the operation information database in which forces to be applied to the object by the robot arm corresponding to the operations are stored as pieces of time-sequential operation information;

a correction method setting step of setting presence or absence of correction of the operation information;

a control parameter managing step of switching modes between (i) a force hybrid impedance control mode for automatically force-controlling the robot arm based upon operation information stored in the operation information database, which is used when the correction method setting step determines that no correction is required for the operation information, and (ii) a high-rigidity position control mode for allowing a person to hold the robot arm and perform teaching of a force to be applied to the robot arm, which is used when the correction method setting step determines that a correction is required for the operation information;

an information acquiring step of acquiring correction operation information relating to the force to be applied to the robot arm, upon correcting the operation of the robot arm, by allowing the person to hold the robot arm and apply a force thereto in the high-rigidity position control mode;

an operation correction step of correcting the operation information in accordance with the correction operation information, at each point of time acquired by the information acquiring step; and a force detection step of detecting a force of the person applied to the robot arm, wherein the operation information database has a correction parameter flag used for specifying a direction of a force that corresponds to the operation information, after the control parameter managing step has made a switch to the high-rigidity position control mode, midway during the automatic force control of the robot arm in the hybrid impedance control mode, the information acquiring step acquires the correction operation information of the robot arm made by the person, relating to a direction of the force specified by the correction parameter flag, the operation correction step corrects the operation information in accordance with the correction operation information, the force control step force-controls the robot arm based upon the corrected operation information, and the correction method setting step sets a method for correcting the operation information by the operation correction step, and in accordance with the correction method set by the correction method setting step, the operation information is corrected by the operation correction step, and wherein in a case where, after the correction in the operation correction step, the force of the person detected by the force detection step becomes smaller than a threshold value, the correction method setting step sets a correction method as to whether the corrected operation is carried out or the operation is returned to a previous operation before the correction, and in a case where, after the correction by the operation correction step referring to the correction method set by the correction method setting step, the force of the person detected by the force detection step becomes smaller than the threshold value, the operation correction step switches the operation as to whether the corrected operation is carried out or the operation is returned to a previous operation before the correction, and in a case where, after the correction in the operation correction step carried out by controlling the operation of the robot arm based upon the operation information corrected by the operation correction step, the force of the person detected by the force detection step becomes smaller than the threshold value, the operation of the robot arm is controlled in accordance with the operation switched by the correction method set in the correction method setting step.

* * * * *